(12) United States Patent
Weerasooriya et al.

(10) Patent No.: US 8,822,391 B2
(45) Date of Patent: Sep. 2, 2014

(54) ALKOXY CARBOXYLATE SURFACTANTS

(75) Inventors: Upali P. Weerasooriya, Austin, TX (US); Gary A. Pope, Cedar Park, CA (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 13/220,670

(22) Filed: Aug. 29, 2011

(65) Prior Publication Data

US 2012/0101010 A1    Apr. 26, 2012

Related U.S. Application Data

(60) Provisional application No. 61/377,738, filed on Aug. 27, 2010, provisional application No. 61/394,662, filed on Oct. 19, 2010, provisional application No. 61/478,441, filed on Apr. 22, 2011.

(51) Int. Cl.
*C09K 8/584* (2006.01)
*C07C 59/125* (2006.01)

(52) U.S. Cl.
USPC .................. 507/259; 507/267; 562/587

(58) Field of Classification Search
None
See application file for complete search history.

(56) References Cited

U.S. PATENT DOCUMENTS

| 4,265,264 | A |   | 5/1981  | Sifferman |           |
|-----------|---|---|---------|-----------|-----------|
| 4,770,199 | A | * | 9/1988  | Balzer    | 137/13    |
| 4,886,120 | A |   | 12/1989 | Shupe     |           |
| 5,076,363 | A | * | 12/1991 | Kalpakci et al. | 166/270.1 |
| 5,843,317 | A | * | 12/1998 | Dahanayake et al. | 210/651 |
| 6,225,267 | B1|   | 5/2001  | Eckard et al. |       |
| 7,055,602 | B2| * | 6/2006  | Shpakoff et al. | 166/268 |
| 7,629,299 | B2|   | 12/2009 | Berger et al. |       |
| 2007/0049500 | A1 | * | 3/2007 | Mueller et al. | 507/136 |
| 2007/0191633 | A1 |   | 8/2007 | Berger et al. |       |
| 2008/0277620 | A1 | * | 11/2008 | Kesavan et al. | 252/175 |
| 2009/0053161 | A1 |   | 2/2009 | Nguyen |       |
| 2009/0183877 | A1 | * | 7/2009 | Quintero et al. | 166/300 |
| 2010/0048432 | A1 |   | 2/2010 | Costello et al. |       |
| 2010/0081716 | A1 |   | 4/2010 | Matsunaga et al. |       |

FOREIGN PATENT DOCUMENTS

| EP | 0207312 A2      | 1/1987  |
|----|-----------------|---------|
| EP | 0780509 A1      | 6/1997  |
| EP | 1661547 A1      | 5/2006  |
| JP | 06-0346259      | 12/1994 |
| WO | WO 2007/141067 A1 | 12/2007 |
| WO | WO 2011/037954 A2 | 3/2011  |
| WO | WO 2011/130310 A1 | 10/2011 |

OTHER PUBLICATIONS

Anton, R.E. et al., "Practical surfactant mixing rules based on the attainment of microemulsion-oil-water three-phase behavior systems", Adv. Polym. Sci. (2008) 218:83-113.
International Search Report and Written Opinion dated Dec. 2, 2011 for International PCT Application No. PCT/US2011/049617, 16 pages.
English abstract of the U.S. equivalent for EP Publication No. 0207312, 1 page.

* cited by examiner

*Primary Examiner* — Randy Gulakowski
*Assistant Examiner* — Jeffrey Washville
(74) *Attorney, Agent, or Firm* — Kilpatrick Townsend & Stockton LLP

(57) ABSTRACT

Provided herein are inter alia novel compositions and methods having application in a variety of fields including the field of enhanced oil recovery, the cleaning industry as well as groundwater remediation. In particular, the alkoxy carboxylate compounds and mixtures thereof presented herein can be used, inter alia, for the recovery of a large range of crude oil compositions from challenging reservoirs.

45 Claims, 33 Drawing Sheets

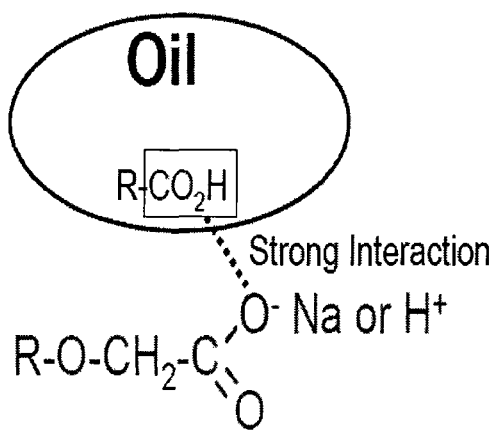
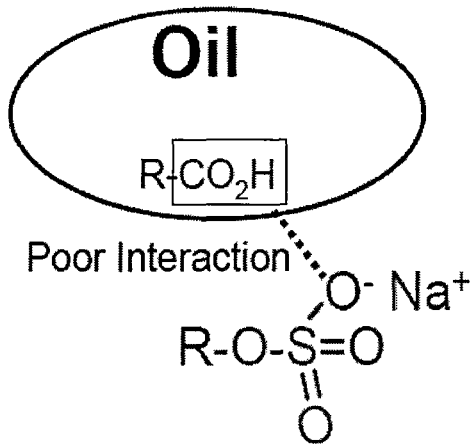
FIG. 1A                                    FIG. 1B

| Experiment | | | | 0.5% C32-7PO-32EO-Carboxylate, 0.5% C19-23 IOS | | | | | | | |
|---|---|---|---|---|---|---|---|---|---|---|---|
| Hydrocarbon | | | | | | | | | | | |
| Surfactant | C32-7PO-32EO Carboxylate | | | Hydrocarbon Density | | g/cc | Typical hydrocarbon Densities: | | | | |
| Co-Surfactant(1) | C19-23 IOS | | | Total Surfactant Conc. | 1 | wt % | Octane | | | | |
| Co-Solvent | | | | Total Alcohol Conc. | | wt % | Decane | | | | |
| Surfactant Conc. | 0.5 | wt % | | Polymer Conc. | 0 | wt % | | | | | |
| Co-surf(1) Conc. | 0.5 | wt % | | Na2CO3 Conc. | 0 | wt % | | | | | |
| t-pent Conc. | | wt % | | WOR | 1 | | Mixed | 7/26/2010 | | Extended scan | |
| Neodol 25-12 | | wt % | | | | | | | | | |
| NaCl:CaCl Ratio | | | | Temperature | 100 | Celcius | | | | | |
| | | | | Tube Size | 5 | mL | | | | | |

| Salinity (% of SUTIB) | TDS in ppm | Aqueous Level | Hydrocarbon Level | Top of emulsion | Top Interface | Bottom Interface | Bottom of emulsion | Type | Volume of Oil Solubized (cc) | Volume of Water Solubized (cc) | Oil Sol. Ratio (cc/cc) | Water Sol. Ratio (cc/cc) | HC Sol. (mg/L) | Volume Fraction of Oil ($V_o$) | Volume Fraction of Microemulsion ($V_{me}$) | Volume Fraction of Water ($V_w$) | $V_o + V_{me}$ | Notes |
|---|---|---|---|---|---|---|---|---|---|---|---|---|---|---|---|---|---|---|
| | | 8/24/2010 | 27 | days | | | | | | | | | | | | | | |
| 40.00% | 23127 | 2.9 | 0.9 | | 2.80 | | | I | 0.10 | | 4.8 | | 0 | 0.463 | 0.537 | 0.000 | 0.537 | |
| 50.00% | 28909 | 2.89 | 0.9 | | 2.75 | 3.15 | | II | 0.14 | 0.26 | 6.6 | 12.3 | 0 | 0.451 | 0.110 | 0.439 | 0.549 | |
| 60.00% | 34630 | 2.93 | 0.9 | | 2.75 | 3.20 | | II | 0.18 | 0.27 | 8.7 | 13.0 | 0 | 0.451 | 0.110 | 0.439 | 0.549 | |
| 70.00% | 40472 | 2.95 | 0.9 | | 2.52 | 3.30 | | II | 0.43 | 0.35 | 21.0 | 17.1 | 0 | 0.395 | 0.190 | 0.415 | 0.605 | |
| 80.00% | 46254 | 2.95 | 0.9 | | 2.25 | 3.10 | | II | 0.70 | 0.15 | 34.1 | 7.3 | 0 | 0.329 | 0.207 | 0.463 | 0.671 | |
| 90.00% | 52035 | 2.95 | 0.9 | | | 3.05 | | I | 2.35 | 0.10 | | 4.9 | NA | 0 | 0.524 | 0.476 | 1.000 | |
| 100.00% | 57817 | 2.91 | 0.9 | | | 3.00 | | I | 2.91 | 0.09 | | 4.3 | NA | 0 | 0.512 | 0.488 | 1.000 | |
| 110.00% | 63599 | 2.90 | 0.9 | | | 2.97 | | I | 2.90 | 0.07 | | 3.3 | NA | 0 | 0.505 | 0.495 | 1.000 | |
| 120.00% | 69380 | 2.87 | 0.9 | | | 2.90 | | I | 2.87 | 0.03 | | 1.4 | NA | 0 | 0.488 | 0.512 | 1.000 | |
| 130.00% | 75162 | 2.97 | 0.9 | | | 2.95 | | I | 2.97 | -0.02 | | | NA | 0 | 0.500 | 0.500 | 1.000 | |

FIG. 2B

| Experiment | | | | | | | 0.7% C28-25PO-55EO-Carboxylate, 0.3% A225-Na | | | | | | | | | |
|---|---|---|---|---|---|---|---|---|---|---|---|---|---|---|---|---|

| Hydrocarbon | | | | | | | | | |
|---|---|---|---|---|---|---|---|---|---|
| Surfactant | C28-25PO-55EO Carboxylate | | | Hydrocarbon Density | | g/cc | Typical hydrocarbon Densities: | | |
| Co-Surfactant(1) | A225-Na | | | Total Surfactant Conc. | 1 | wt % | Octane | | |
| Co-Solvent | | | | Total Alcohol Conc. | | wt % | Decane | | |
| Surfactant Conc. | 0.7 | wt % | | Polymer Conc. | 0 | wt % | | | |
| Co-surf(1) Conc. | 0.3 | wt % | | Na2CO3 Conc. | 0 | wt % | | | |
| t-pent Conc. | | wt % | | WOR | 1 | | Mixed: | 11/23/2010 | Extended scan |
| Neodol 25-12 | | wt % | | | | | | | |
| NaCl:CaCl Ratio | | | | Temperature | 100 | Celcius | | | |
| | | | | Tube Size | 5 | mL | | | |

| Salinity (% of SUTIB) | TDS in ppm | Aqueous Level | Hydrocarbon Level | Top of emulsion | Top Interface | Bottom Interface | Bottom of emulsion | Type | Volume of Oil Solublized (cc) | Volume of Water Solublized (cc) | Oil Sol. Ratio (cc/cc) | Water Sol. Ratio (cc/cc) | HC Sol. (mg/L) | Volume Fraction of Oil ($V_o$) | Volume Fraction of Microemulsion ($V_{me}$) | Volumn Fraction of Water ($V_w$) | $V_v + V_{me}$ |
|---|---|---|---|---|---|---|---|---|---|---|---|---|---|---|---|---|---|
| | | 12/7/2010 | 14 | days | | | | | | | | | | | | | |
| 10.00% | 5782 | 2.95 | 0.9 | | 2.85 | | | I | 0.10 | | 4.9 | | 0 | 0.476 | 0.524 | 0.000 | 0.524 |
| 15.00% | 8673 | 2.95 | 0.9 | | 2.80 | | | I | 0.15 | | 7.3 | | 0 | 0.463 | 0.537 | 0.000 | 0.537 |
| 20.00% | 11563 | 2.95 | 0.9 | | 2.80 | | | I | 0.15 | | 7.3 | | 0 | 0.463 | 0.537 | 0.000 | 0.537 |
| 25.00% | 14454 | 2.98 | 0.9 | | 2.80 | | | I | 0.18 | | 8.9 | | 0 | 0.463 | 0.537 | 0.000 | 0.537 |
| 30.00% | 17345 | 2.98 | 0.9 | | 2.78 | | | I | 0.20 | | 9.9 | | 0 | 0.459 | 0.541 | 0.000 | 0.541 |
| 35.00% | 20236 | 2.92 | 0.9 | | 2.70 | | | I | 0.22 | | 10.6 | | 0 | 0.439 | 0.561 | 0.000 | 0.561 |
| 40.00% | 23127 | 2.95 | 0.9 | | 2.60 | 3.48 | | III | 0.35 | 0.53 | 17.1 | 25.9 | 0 | 0.415 | 0.215 | 0.371 | 0.585 |
| 45.00% | 26018 | 2.95 | 0.9 | | 2.35 | 3.40 | | III | 0.60 | 0.45 | 29.3 | 22.0 | 0 | 0.354 | 0.256 | 0.390 | 0.646 |
| 50.00% | 28909 | 2.98 | 0.9 | | 1.60 | 3.15 | | III | 1.38 | 0.17 | 68.3 | 8.4 | 0 | 0.171 | 0.378 | 0.451 | 0.829 |
| 55.00% | 31799 | 2.95 | 0.9 | | | 3.00 | | II | 2.95 | 0.05 | | 2.4 | NA | 0 | 0.512 | 0.488 | 1.000 |

FIG. 5

Hydrophobe Carbon Number Equation $$N_c = a_1 N_{PO} + a_2 N_{EO} + a_3(T-T_{ref}) + a_4 \log S^* + a_5 E_O$$

Where $a_1, a_2, a_3, a_4, a_5$ are regression coefficients and $N_c$ – Mole average number of Carbons in hydrophobe
$N_{PO}$ – Mole average number of POs
$N_{EO}$ – Mole average number of EOs
T – Reservoir temperature and $T_{ref}$=21 °C
$S^*$ – Optimum Salinity
$E_O$ – Oil EACN

FIG. 8

Regression Data Set

| Formulation | Mole fraction average $N_C$ | Mole fraction average $N_{PO}$ | Mole fraction average $N_{EO}$ | $T-T_{ref}-21$ °C | Log Optimum salinity, (TDS, ppm) | Oil EACN |
|---|---|---|---|---|---|---|
| 0.25% C32-7PO-6EO-SO4-, 0.25% C20-24 IOS | 24.5 | 1.8 | 1.5 | 64 | 4.5485 | 16 |
| 1.33% C24-28 IOS, 0.67% C30 OXS | 27.1 | 0.0 | 0.0 | 64 | 4.5782 | 16 |
| 2% C16-7PO-SO4- | 16.0 | 7.0 | 0.0 | 64 | 4.5485 | 16 |
| 2% C13-13PO-SO4- | 13.0 | 13.0 | 0.0 | 64 | 4.2395 | 16 |
| 0.5% C16-7PO-SO4-, 0.5% C14-9PO SO4- | 15.1 | 7.9 | 0.0 | 64 | 4.5167 | 16 |
| 0.75% C16-7PO-SO4-, 0.25% C24-28 IOS | 19.4 | 4.6 | 0.0 | 64 | 4.4894 | 16 |
| 1% C20-6EO-SO4-, 1% C20-10EO SO4- | 20.0 | 0.0 | 7.8 | 64 | 4.5423 | 16 |
| 1.8% C24-10EO-SO4-, 0.2% C13-12EO SO4- | 22.8 | 0.0 | 10.2 | 64 | 4.2003 | 16 |
| 0.5% C28-7PO-2EO-SO4-, 0.5% C20-24 IOS | 23.8 | 2.0 | 0.6 | 64 | 4.5167 | 16 |
| 0.3% C28-7PO-2EO-SO4-, 0.3% C20-2EO SO4- | 22.6 | 2.3 | 2.0 | 64 | 4.5167 | 16 |
| 1.5% C16-7PO-SO4-, 0.5% C15-18 IOS | 16.0 | 4.0 | 0.0 | 4 | 4.5157 | 9.9 |
| 0.5% C28-25PO-25EO COO-, 0.5% C15-18 IOS | 17.2 | 2.4 | 2.4 | 84 | 4.6532 | 11.6 |
| 0.5% C28-25PO-35EO COO-, 0.5% C15-18 IOS | 17.0 | 2.2 | 3.0 | 84 | 4.7782 | 11.6 |
| 0.5% C28-25PO-45EO COO-, 0.5% C15-18 IOS | 16.9 | 1.9 | 3.5 | 84 | 4.9085 | 11.6 |
| 0.25% C28-25PO-15EO-COO-, 0.20% C20-24 IOS, 0.05% C15-18 IOS | 21.5 | 3.3 | 2.0 | 55 | 4.4771 | 12 |
| 0.1% C20-24 IOS, 0.1% TDA-13PO-SO4-, 0.1% C9-11-8EO | 16.3 | 2.4 | 2.7 | 0 | 4.8451 | 13.6 |
| 0.25% C24-25PO-18EO COO-, 0.25% C13-13PO SO4-, 0.25% C12 ABS | 13.3 | 5.2 | 1.6 | 9 | 4.6532 | 11.7 |
| 0.25% C32-7PO-14EO SO4-, 0.25% C20-24 IOS | 24.1 | 1.4 | 2.9 | 79 | 4.4771 | 14 |
| 0.25% C32-7PO-18EO SO4-, 0.25% C20-24 IOS | 23.9 | 1.3 | 3.4 | 79 | 4.4771 | 14 |
| 0.5% C32-7PO-6EO SO4-, 0.33% C16-7PO SO4-, 0.17% C20-24 IOS | 23.1 | 4.7 | 1.9 | 79 | 4.3979 | 14 |
| 0.75% C16-7PO SO4-, 0.25% C15-18 IOS | 16.0 | 4.0 | 0.0 | 14 | 4.5440 | 12 |
| C13-13PO SO4-, 0.1% C15-18 IOS | 14.3 | 7.2 | 0.0 | 14 | 4.5440 | 12 |
| 0.5% C24-25PO-56EO COO-, 0.5% C15-18 IOS | 21.3 | 2.1 | 4.7 | 79 | 4.5798 | 15 |
| 0.5% C28-25PO-25EO COO-, 0.5% C15-18 IOS | 17.2 | 2.4 | 2.4 | 79 | 4.8388 | 15 |
| 0.5% C28-25PO-45EO COO-, 0.5% C15-18 IOS | 19.5 | 3.6 | 0.0 | 17 | 4.3086 | 11 |
| 0.25% C20-24 IOS, 0.75% C13-13PO SO4- | 17.2 | 7.0 | 0.0 | 0 | 4.3010 | 10 |
| 0.5% C32-7PO-32EO COO-, 0.5% C19-23 IOS | 22.6 | 1.0 | 4.7 | 79 | 4.6021 | 11.4 |
| 0.5% C28-25PO-45EO COO-, 0.5% C15-18 IOS | 16.9 | 1.9 | 3.5 | 79 | 4.5563 | 6.9 |
| 0.5% C24-28 IOS | 26.0 | 0.0 | 0.0 | 79 | 4.2430 | 11.4 |
| 0.33% C32-7PO-18EO SO4-, 0.33% C16-7PO SO4-, 0.33% C15-18 IOS | 18.0 | 2.2 | 2.3 | 79 | 4.6675 | 11.4 |
| 0.33% C32-7PO-18EO SO4-, 0.33% C16-7PO-2EO SO4-, 0.33% C15-18 IOS | 17.9 | 2.6 | 2.6 | 79 | 4.7160 | 11.4 |
| 0.33% C32-7PO-18EO SO4-, 0.33% C16-7PO-6EO SO4-, 0.33% C15-18 IOS | 18.0 | 2.4 | 3.5 | 79 | 4.7559 | 11.4 |
| 0.7% C28-25PO-55EO COO-, 0.3% C11 ABS | 13.6 | 3.8 | 8.4 | 79 | 4.4160 | 6.9 |

FIG. 9

Summary of Carboxylate Formulations with Active and Non-active Oils

| Reservoir Temperature (°C) | Oil Viscosity at Res. T (cP) | Surfactant Formulation | Optimum Solubilization Ratio (cc/cc) for 50% Oil |
|---|---|---|---|
| 105 | 1.5 | 0.5% C28-25PO-25EO Carboxylate, 0.5% C15-18 IOS | 30 |
| 100 | 21 | 0.5% C24-25PO-56EO Carboxylate, 0.5% C19-23 IOS | 30 |
| 100 | 0.5 | 0.7% C28-25PO-55EO Carboxylate, 0.3% C11 ABS | 22 |
| 85 | 3.4 | 0.25% C24-35PO-20EO Carboxylate, 0.25% C20-24 IOS | 25 |
| 55 | 9 | 0.35% C-28-25PO-15EO Carboxylate 0.05% C15-18 IOS, 0.2% C20-24 IOS | 15 |
| 55 | 80 | 0.25% C28-25PO-15EO Carboxylate, 0.15% C15-18 IOS, 0.1%C20-24 IOS | 15 |
| 46 | 16 | 0.25% C28-25PO-15EO Carboxylate, 0.20% C20-24 IOS, 0.05%C15-18 IOS | 20 |
| 46 | 19.9 | 0.25%C28-35PO-10EO Carboxylate, 0.25% C12 ABS, 0.25%C13-13PO Sulfate, 0.25% TEGBE | 15 |
| 44 | 35 | 0.45% C28-35PO-10EO Carboxylate, 0.4% C20-24 IOS, 0.15% C13-13PO-Sulfate, 1% TEGBE | 30 |
| 30 | 20 | 0.25% C24-25PO-18EO Carboxylate, 0.25% C12 ABS, 0.25% C13-13PO Sulfate, 0.25% TEGBE | 25 |
| 30 | 83 | 0.25% C28-25PO-15EO Carboxylate, 0.15% C15-18 IOS, 0.10% C20-24 IOS | >20 |

FIG. 16

SP Flood in an Ottawa F95 Sand Pack with Oil #4 at 30 °C

SP Slug
0.5 PV (PV*C: 25)
0.25% C28-25PO-15EO Carboxylate
0.15% C15-18 IOS
0.1% C20-24 IOS
18,300 ppm TDS Hard Brine
3800 ppm FP 3630s

Polymer Drive
1.5 PV
18,300 ppm TDS Hard Brine
3800 ppm FP 3630s

FIG. 22

SP Sand Pack Flood Results

|  | Flood #1 | Flood #2 |
|---|---|---|
| Rate | 0.29 ft/day | 1 ft/day |
| Residence Time | ~3.5 days | 1 day |
| $S_o$ After Water Flood | 0.378 | 0.419 |
| Oil Recovery | 97.2% | 99.2% |
| $S_{orc}$ | 0.014 | 0.005 |
| Surfactant Retention / Injected (mg/g Rock) | 0.124 / 0.520 | - |

- Low reservoir temperature and high oil viscosity result in <u>slow equilibration time</u> for phase behavior tubes (weeks)
  - Lots of mixing required to mobilize the Carboxylic Acid in the oil
- In-situ mixing in core is much more efficient than in tubes
  - Can have much shorter residence time

FIG. 24

SP Core Flood in Silurian Dolomite with Oil #1 at 100 °C

SP Slug
0.25 PV (PV*C: 50)
1% C32-7PO-32EO Carboxylate
1% C19-23 IOS
40,000 ppm TDS Hard Brine
4500 ppm FP 3330s
Frontal Velocity: ~2 ft/day Polymer Drive
~3.5 PV
25,000 ppm TDS Hard Brine
4500 ppm FP 3330s
Frontal Velocity: ~2 ft/day

FIG. 26

Dilute SP Core Flood in Estillades Carbonate with Oil #1 at 100 °C

SP Slug
1 PV (PV*C: 30)
0.15% C28-25PO-45EO Carboxylate
0.15% C15-18 IOS
36,000 ppm TDS Brine
4500 ppm FP 3330s
Frontal Velocity: 2 ft/day

Polymer Drive
~1 PV
20,000 ppm TDS Brine
4500 ppm FP 3330s
Frontal Velocity: 2 ft/day

FIG. 31

ALKOXY CARBOXYLATE SURFACTANTS

CROSS-REFERENCES TO RELATED APPLICATIONS

This application claims the benefit of U.S. Provisional Application No. 61/377,738 filed Aug. 27, 2010, U.S. Provisional Application No. 61/394,662 filed Oct. 19, 2010, and U.S. Provisional Application No. 61/478,441 filed Apr. 22, 2011, all of which are hereby incorporated in their entirety and for all purposes.

BACKGROUND OF THE INVENTION

Enhanced Oil Recovery (abbreviated EOR) refers to techniques for increasing the amount of unrefined petroleum, or crude oil, that may be extracted from an oil reservoir (e.g. an oil field). Using EOR, 40-60% of the reservoir's original oil can typically be extracted compared with only 20-40% using primary and secondary recovery (e.g. by water injection or natural gas injection). Enhanced oil recovery may also be referred to as improved oil recovery or tertiary recovery (as opposed to primary and secondary recovery).

Enhanced oil recovery may be achieved by a variety of methods including miscible gas injection (which includes carbon dioxide flooding), chemical injection (which includes polymer flooding, alkaline flooding and surfactant flooding), microbial injection, or thermal recovery (which includes cyclic steam, steam flooding, and fire flooding). The injection of various chemicals, usually as dilute aqueous solutions, has been used to improve oil recovery. Injection of alkaline or caustic solutions into reservoirs with oil that has organic acids naturally occurring in the oil (also referred to herein as "unrefined petroleum acids") will result in the production of soap that may lower the interfacial tension enough to increase production. Injection of a dilute solution of a water soluble polymer to increase the viscosity of the injected water can increase the amount of oil recovered from geological formations. Aqueous solutions of surfactants such as petroleum sulfonates may be injected to lower the interfacial tension or capillary pressure that impedes oil droplets from moving through a reservoir. Special formulations of oil, water and surfactant microemulsions, have also proven useful. Application of these methods is usually limited by the cost of the chemicals and their adsorption and loss onto the rock of the oil containing formation.

Some unrefined petroleum contains carboxylic acids having, for example, $C_{11}$ to $C_{20}$ alkyl chains, including napthenic acid mixtures (also referred to herein as "unrefined petroleum acids"). The recovery of such "reactive" oils may be performed using alkali (e.g. NaOH or $Na_2CO_3$) in a surfactant composition. The alkali reacts with the acid (unrefined petroleum acid) in the reactive oil to form soap. These soaps serve as an additional source of surfactants enabling the use of much lower level of surfactants initially added to effect enhanced oil recovery (EOR). However, when the available water supply is hard, the added alkali causes precipitation of cations, such as $Ca^{+2}$ or $Mg^{+2}$. In order to prevent such precipitation an expensive chelant such as EDTA may be required in the surfactant composition. Alternatively, expensive water softening processes may be used.

Therefore, there is a need in the art for cost effective methods for enhanced oil recovery using chemical injection. Provided herein are methods and compositions addressing these and other needs in the art.

BRIEF DESCRIPTION OF THE DRAWINGS

FIG. 1. (A) Schematic representations of the interaction of the alkoxy(ether)carboxylate and (B) the alkoxy(ether)sulfate surfactants with the carboxylic acid in a reactive oil.

FIG. 5. Data recording for microemulsion phase behavior data shown in FIG. 4 with no alkali and no co-solvents.

FIG. 8. Regression equation relating the condition variables with the optimum surfactant structure under those conditions.

FIG. 9. Regression data set for optimum surfactant formulations.

FIG. 16. Summary of carboxylate formulations with active and non-active oils.

FIG. 22. Surfactant-polymer (SP) flood conditions in an Ottawa F95 sand pack with Oil #4 at 30° C.

FIG. 24. Summary of oil recovery and surfactant retention results from two sand pack experiments.

FIG. 26. Surfactant-polymer (SP) core flood conditions in Silurian dolomite rock with Oil #1 at 100° C.

FIG. 31. Dilute surfactant-polymer core flood conditions in Estillades carbonate with Oil #1 at 100° C.

BRIEF SUMMARY OF THE INVENTION

Figure 2A:
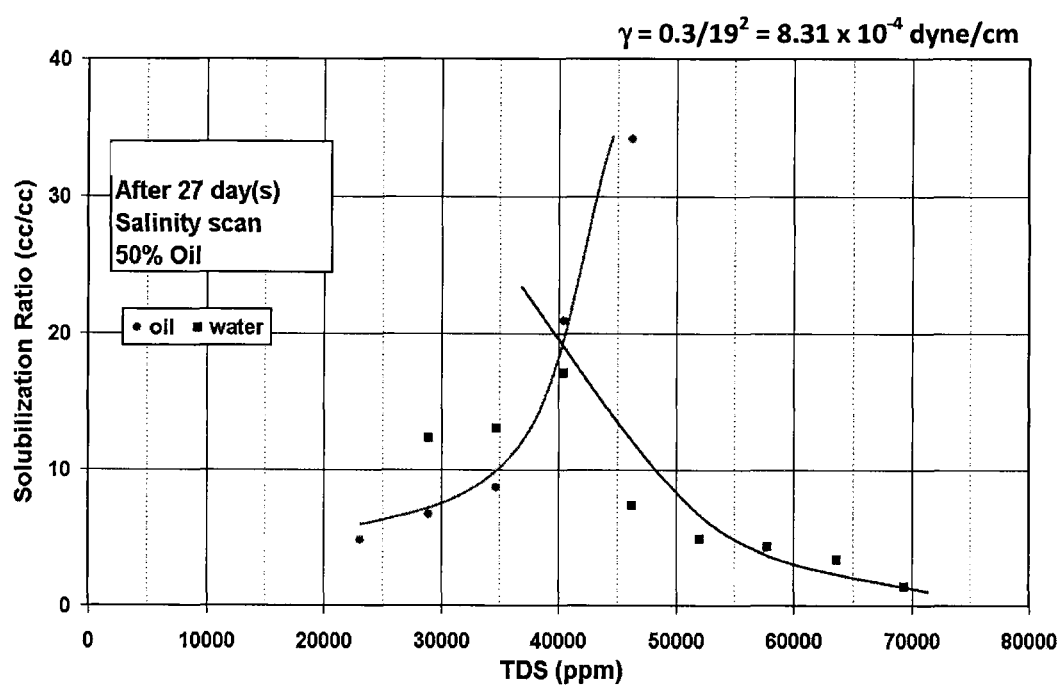
FIG. 2. (A) Solubilization ratios for light crude oil using the surfactant formulation 0.5% C32-7PO-32EO Carboxylate, 0.5% C19-23 IOS as a function of the total dissolved solids in the hard brine. (B) Phase behavior data recording sheet corresponding to the plot shown in (A) for the system comprising 0.5% C32-7PO-32 EO Carboxylate, 0.5% C19-23 IOS (hard injection sea brine salinity scan).
Figure 3:
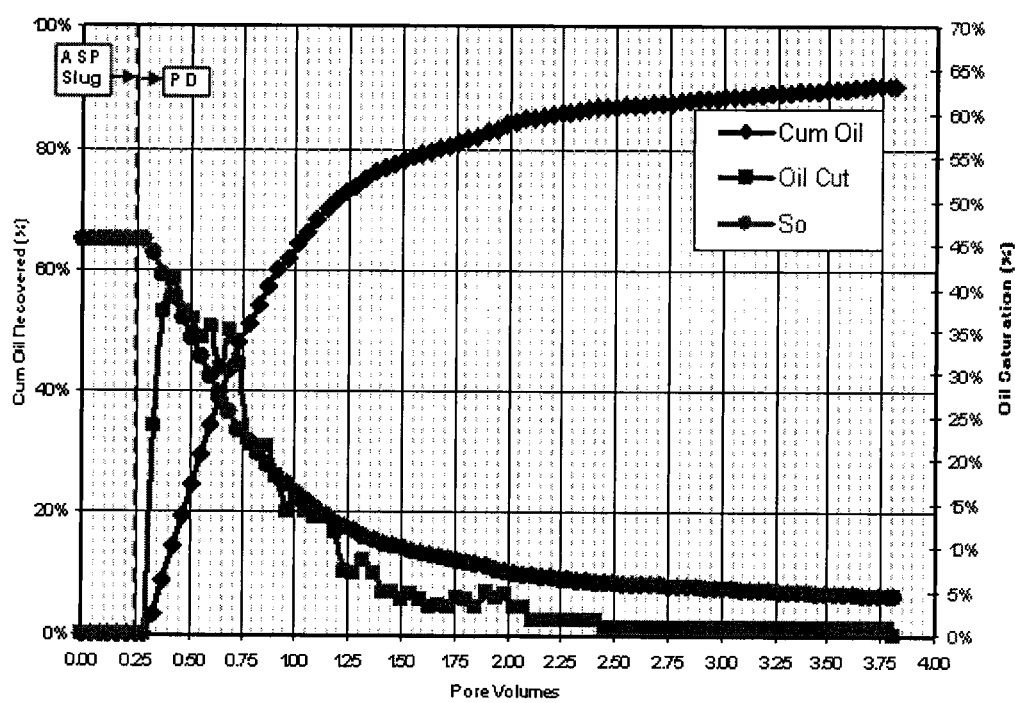
FIG. 3 Oil recovery from a surfactant flood of a laboratory core using the blend of carboxylate and IOS surfactants of FIG. 2.

In a first aspect, the present invention provides a compound having the formula:

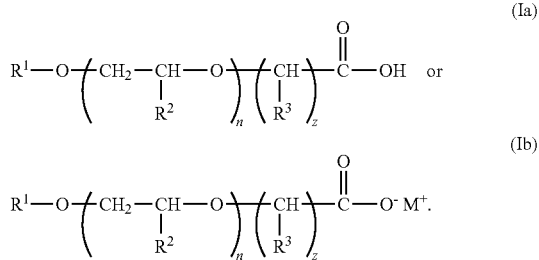

In formula (Ia) or (Ib), $R^1$ is $R^{10}$-substituted or unsubstituted $C_8$-$C_{150}$ alkyl, $R^4$-substituted or unsubstituted aryl or $R^4$-substituted or unsubstituted cycloalkyl. $R^2$ is independently hydrogen or unsubstituted $C_1$-$C_6$ alkyl. $R^3$ is independently hydrogen or unsubstituted $C_1$-$C_6$ alkyl. $R^4$ is independently an $R^5$-substituted or unsubstituted $C_1$-$C_{50}$ alkyl, $R^5$-substituted or unsubstituted aryl or $R^5$-substituted or unsubstituted cycloalkyl. $R^5$ is independently $R^6$-substituted or unsubstituted $C_1$-$C_{50}$ alkyl, $R^6$-substituted or unsubstituted aryl or $R^6$-substituted or unsubstituted cycloalkyl. $R^6$ is independently $R^7$-substituted or unsubstituted $C_1$-$C_{50}$ alkyl, $R^7$-substituted or unsubstituted aryl or $R^7$-substituted or unsubstituted cycloalkyl. $R^7$ is independently $R^8$-substituted or unsubstituted $C_1$-$C_{50}$ alkyl, $R^8$-substituted or unsubstituted aryl or $R^8$-substituted or unsubstituted cycloalkyl. $R^8$ is independently $R^9$-substituted or unsubstituted $C_1$-$C_{50}$ alkyl, $R^9$-substituted or unsubstituted aryl or $R^9$-substituted or unsubstituted cycloalkyl. $R^9$ is independently unsubstituted $C_1$-$C_{50}$ alkyl, unsubstituted aryl or unsubstituted cycloalkyl. $R^{10}$ is independently unsubstituted aryl or unsubstituted cycloalkyl. The symbol n is an integer from 2 to 210, z is an integer from 1 to 6, and $M^+$ is a monovalent, divalent or trivalent cation.

In another aspect, an aqueous composition is provided including a co-surfactant and a compound described herein (e.g. a compound of formula (Ia), (Ib), (IIa), (IIb), (IIIa), (IIIb), (IVa), ((IVb)) or (V)).

In another aspect, an emulsion composition including an unrefined petroleum phase and an aqueous phase is provided. The aqueous phase includes a compound described herein (e.g. a compound of formula (Ia), (Ib), (IIa), (IIb), (IIIa), (IIIb), (IVa), ((IVb)) or (V)).

In another aspect, a method of displacing a hydrocarbon material in contact with a solid material is provided. The method includes contacting a hydrocarbon material with a compound described herein (e.g. a compound of formula (Ia), (Ib), (IIa), (IIb), (IIIa), (IIIb), (IVa), ((IVb)) or (V)), wherein the hydrocarbon material is in contact with the solid material. The hydrocarbon material is allowed to separate from the solid material thereby displacing the hydrocarbon material in contact with the solid material.

In another aspect, a method of converting an unrefined petroleum acid into a surfactant is provided. The method includes contacting a petroleum material with an aqueous composition thereby forming an emulsion in contact with the petroleum material, wherein the aqueous composition includes a compound described herein (e.g. a compound of formula (Ia), (Ib), (IIa), (IIb), (IIIa), (IIIb), (IVa), ((IVb)) or (V)) and a co-surfactant. An unrefined petroleum acid within the unrefined petroleum material is allowed to enter the emulsion, thereby converting the unrefined petroleum acid into a surfactant.

DEFINITIONS

The abbreviations used herein have their conventional meaning within the chemical and biological arts.

Where substituent groups are specified by their conventional chemical formulae, written from left to right, they equally encompass the chemically identical substituents that would result from writing the structure from right to left, e.g., —CH₂O— is equivalent to —OCH₂—.

The term "alkyl," by itself or as part of another substituent, means, unless otherwise stated, a straight (i.e. unbranched) or branched chain which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl". An alkoxy is an alkyl attached to the remainder of the molecule via an oxygen linker (—O—).

The term "alkylene" by itself or as part of another substituent means a divalent radical derived from an alkyl, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The term "heteroalkyl," by itself or in combination with another term, means, unless otherwise stated, a stable straight or branched chain or combinations thereof, consisting of at least one carbon atom and at least one heteroatom selected from the group consisting of O, N, P, Si and S, and wherein the nitrogen and sulfur atoms may optionally be oxidized, and the nitrogen heteroatom may optionally be quaternized. The heteroatom(s) O, N, P and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$—S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, —CH=CH—N(CH$_3$)—CH$_3$, O—CH$_3$, —O—CH$_2$—CH$_3$, and —CN. Up to two heteroatoms may be consecutive, such as, for example, —CH$_2$—NH—OCH$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent means a divalent radical derived from a cycloalkyl and heterocycloalkyl, respectively.

The term "aryl" means, unless otherwise stated, a polyunsaturated, aromatic, hydrocarbon substituent which can be a single ring or multiple rings (preferably from 1 to 3 rings) which are fused together (i.e. a fused ring aryl) or linked covalently. A fused ring aryl refers to multiple rings fused together wherein at least one of the fused rings is an aryl ring. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. Thus, the term "heteroaryl" includes fused ring heteroaryl groups (i.e. multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent means a divalent radical derived from an aryl and heteroaryl, respectively.

The term "oxo" as used herein means an oxygen that is double bonded to a carbon atom.

Where a substituent of a compound provided herein is "R-substituted" (e.g. $R^7$-substituted), it is meant that the substituent is substituted with one or more of the named R groups (e.g. $R^7$) as appropriate. In some embodiments, the substituent is substituted with only one of the named R groups.

The symbol "⌇" denotes the point of attachment of a chemical moiety to the remainder of a molecule or chemical formula.

Each R-group as provided in the formulae provided herein can appear more than once. Where a R-group appears more than once each R group can be optionally different.

The term "contacting" as used herein, refers to materials or compounds being sufficiently close in proximity to react or interact. For example, in methods of contacting a hydrocarbon material bearing formation and/or a well bore, the term "contacting" includes placing an aqueous composition (e.g. chemical, surfactant or polymer) within a hydrocarbon material bearing formation using any suitable manner known in the art (e.g., pumping, injecting, pouring, releasing, displacing, spotting or circulating the chemical into a well, well bore or hydrocarbon bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e. organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) and market price in comparison to light (or sweet) crude oils. Crude oil may also be characterized by its Equivalent Alkane Carbon Number (EACN).

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified intro three groups, according to the nature of the hydrocarbons they contain. (i) Paraffin based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil as referred to herein is crude oil containing natural organic acidic components. More terms used interchangeably for oil throughout this disclosure are hydrocarbon material or petroleum material. An "oil bank" or "oil cut" as referred to herein, is the crude oil that does not contain the injected chemicals and is pushed by the injected fluid during an enhanced oil recovery process.

The term "polymer" refers to a molecule having a structure that essentially includes the multiple repetitions of units derived, actually or conceptually, from molecules of low relative molecular mass. In some embodiments, the polymer is an oligomer.

The term "bonded" refers to having at least one of covalent bonding, hydrogen bonding, ionic bonding, Van Der Waals interactions, pi interactions, London forces or electrostatic interactions.

The term "productivity" as applied to a petroleum or oil well refers to the capacity of a well to produce hydrocarbons (e.g. unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "oil solubilization ratio" is defined as the volume of oil solubilized divided by the volume of surfactant in microemulsion. All the surfactant is presumed to be in the microemulsion phase. The oil solubilization ratio is applied for Winsor type I and type III behavior. The volume of oil solubilized is found by reading the change between initial aqueous level and excess oil (top) interface level. The oil solubilization ratio is calculated as follows:

$$\sigma_o = \frac{V_o}{V_s},$$

wherein
$\sigma_o$=oil solubilization ratio;
$V_o$=volume of oil solubilized;
$V_s$=volume of surfactant.

The term "water solubilization ratio" is defined as the volume of water solubilized divided by the volume of surfactant in microemulsion. All the surfactant is presumed to be in the microemulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_w = \frac{V_w}{V_s},$$

wherein
$\sigma_w$=water solubilization ratio;
$V_w$=volume of water solubilized.

The optimum solubilization ratio occurs where the oil and water solubilization ratios are equal. The coarse nature of phase behavior screening often does not include a data point at optimum, so the solubilization ratio curves are drawn for the oil and water solubilization ratio data and the intersection of these two curves is defined as the optimum. The following is true for the optimum solubilization ratio:

$$\sigma_O = \sigma_W = \sigma^*;$$

$\sigma^*$=optimum solubilization ratio.

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g. precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its ease of fluidity.

The term "salinity" as used herein, refers to concentration of salt dissolved in a aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

The term "aqueous solution or aqueous formulation" refers to a solution in which the solvent is water. The term "emulsion, emulsion solution or emulsion formulation" refers to a mixture of two or more liquids which are normally immiscible. A non-limiting example for an emulsion is a mixtures of oil and water

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not limit the scope of the invention.

Provided herein, inter alia, are large hydrophobe alkoxy carboxylate compounds and methods of using the same for a variety of applications including enhanced oil recovery. The compounds provided herein may be used with broad oil concentrations, at a wide range of salinities and are surprisingly effective even in the absence of alkali. They may be functional at high reservoir temperatures and over a broad pH range. Further, by using the compounds of the present invention enhanced oil recovery may be performed in the absence of water softening. Furthermore, compared to sulfate or sulfonate surfactants, the carboxylate surfactants provided herein may form a surprisingly stronger interaction with the carboxylic acids in reactive crude oils thereby increasing the efficiency of oil recovery without the use of alkali. The alkoxy carboxylate compounds may also significantly improve the effectiveness of co-surfactant sulfonate compounds such as ABS or IOS to a surprising degree. Where these sulfonate compounds are combined with the compounds provided herein, the combination may be more stable and effective when compared to the stability and effectiveness of the sulfonate compounds in the absence of the compounds provided herein (e.g. a compound of formula (Ia), (Ib), (IIa), (IIb), (IIIa), (IIIb), (IVa), ((IVb)) or (V)).

In a first aspect, the present invention provides a compound having the formula:

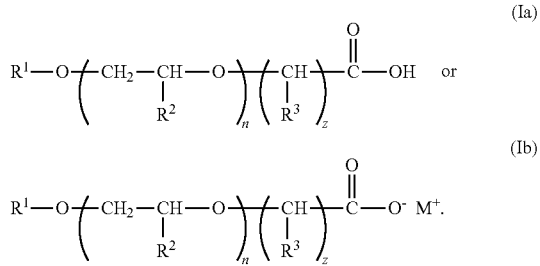

In formula (Ia) and (Ib), $R^1$ is $R^{10}$-substituted or unsubstituted $C_8$-$C_{150}$ alkyl, $R^4$-substituted or unsubstituted aryl or $R^4$-substituted or unsubstituted cycloalkyl. $R^2$ is independently hydrogen or unsubstituted $C_1$-$C_6$ alkyl. $R^3$ is independently hydrogen or unsubstituted $C_1$-$C_6$ alkyl. $R^4$ is an $R^5$-substituted or unsubstituted $C_1$-$C_{50}$ alkyl, $R^5$-substituted or unsubstituted aryl or $R^5$-substituted or unsubstituted cycloalkyl. $R^5$ is $R^6$-substituted or unsubstituted $C_1$-$C_{50}$ alkyl, $R^6$-substituted or unsubstituted aryl or $R^6$-substituted or unsubstituted cycloalkyl. $R^6$ is $R^7$-substituted or unsubstituted $C_1$-$C_{50}$ alkyl, $R^7$-substituted or unsubstituted aryl or $R^7$-substituted or unsubstituted cycloalkyl. $R^7$ is $R^8$-substituted or unsubstituted $C_1$-$C_{50}$ alkyl, $R^8$-substituted or unsubstituted aryl or $R^8$-substituted or unsubstituted cycloalkyl. $R^8$ is $R^9$-substituted or unsubstituted $C_1$-$C_{50}$ alkyl, $R^9$-substituted or unsubstituted aryl or $R^9$-substituted or unsubstituted cycloalkyl. $R^9$ is unsubstituted $C_1$-$C_{50}$ alkyl, unsubstituted aryl or unsubstituted cycloalkyl. $R^{10}$ is unsubstituted aryl or unsubstituted cycloalkyl. Where $R^4$-$R^{10}$ are each alkyls, the total number of carbons does not exceed 150. The symbol n is an integer from 2 to 210, z is an integer from 1 to 6, and $M^+$ is a monovalent, divalent or trivalent cation. In some embodiments, z is 1 to 3. In other embodiments, z is 1 or 2. In formula (Ia) and (Ib) each of $R^2$, $R^3$, $R^4$, $R^5$, $R^6$, $R^7$, $R^8$, $R^9$ and $R^{10}$ can appear more than once and can be optionally different. For example, in some embodiments where n is 2, $R^2$ appears twice and can be optionally different. In other embodiments, where z is 5, $R^3$ appears five times and can be optionally different.

In other embodiments, the symbol n is an integer from 25 to 210. In other embodiments, the symbol n is an integer from 30 to 210. In other embodiments, the symbol n is an integer from 35 to 210. In other embodiments, the symbol n is an integer from 40 to 210. In other embodiments, the symbol n is an integer from 45 to 210. In other embodiments, the symbol n is an integer from 50 to 210. In other embodiments, the symbol n is an integer from 55 to 210. In other embodiments, the symbol n is an integer from 60 to 210. In other embodiments, the symbol n is an integer from 25 to 100. In other embodiments, the symbol n is an integer from 30 to 100. In other embodiments, the symbol n is an integer from 35 to 100. In other embodiments, the symbol n is an integer from 40 to 100. In other embodiments, the symbol n is an integer from 45 to 100. In other embodiments, the symbol n is an integer from 50 to 100. In other embodiments, the symbol n is an integer from 55 to 100. In other embodiments, the symbol n is an integer from 60 to 100. In some embodiments, n is 5 to 180. In other embodiments, n is 10 to 100. In some embodiments, n is 15 to 60. In other embodiments, n is 20 to 50. In some embodiments, n is 25. In other embodiments, n is 35. In some related embodiments, $R^1$ is $R^{10}$-substituted or unsubstituted $C_{20}$-$C_{150}$ alkyl. In other related embodiments, $R^1$ is $R^{10}$-substituted or unsubstituted $C_{22}$-$C_{150}$ alkyl. In other related embodiments, $R^1$ is $R^{10}$-substituted or unsubstituted $C_{24}$-$C_{150}$ alkyl. In other related embodiments, $R^1$ is $R^{10}$-substituted or unsubstituted $C_{20}$-$C_{50}$ alkyl. In other related embodiments, $R^1$ is $R^{10}$-substituted or unsubstituted $C_{22}$-$C_{50}$ alkyl. In other related embodiments, $R^1$ is $R^{10}$-substituted or unsubstituted $C_{24}$-$C_{50}$ alkyl.

In some embodiments, $R^1$ is branched unsubstituted $C_8$-$C_{150}$ alkyl or $R^4$-substituted phenyl. In other embodiments, $R^1$ is branched or linear unsubstituted $C_8$-$C_{150}$ alkyl or $R^4$-substituted phenyl. In some embodiments, $R^1$ is branched or linear unsubstituted $C_{12}$-$C_{100}$ alkyl, $(C_6H_5$—$CH_2CH_2)_3C_6H_2$— (TSP), $(C_6H_5$—$CH_2CH_2)_2C_6H_3$— (DSP), $(C_6H_5$—$CH_2CH_2)_1C_6H_4$— (MSP), or $R^4$-substituted or unsubstituted naphthyl. In some embodiments, the naphthyl is a mono-, di-, or tri-alkyl naphthyl or any combination thereof. In some related embodiments, the alkyl is a saturated alkyl. In other related embodiments, n is as defined in an embodiment above (e.g. n is at least 25; or at least 35, e.g. 35 to 100).

$R^1$ may be linear or branched unsubstituted alkyl. In some embodiments, $R^1$ is $R^{10}$-substituted or unsubstituted $C_{10}$-$C_{150}$ alkyl. In some embodiments, $R^1$ is $R^{10}$-substituted or unsubstituted $C_{12}$-$C_{150}$ alkyl. In some embodiments, $R^1$ is $R^{10}$-substituted or unsubstituted $C_{14}$-$C_{150}$ alkyl. In some embodiments, $R^1$ is $R^{10}$-substituted or unsubstituted $C_{16}$-$C_{150}$ alkyl. In some embodiments, $R^1$ is $R^{10}$-substituted or unsubstituted $C_{18}$-$C_{150}$ alkyl. In some embodiments, $R^1$ is $R^{10}$-substituted or unsubstituted $C_{20}$-$C_{150}$ alkyl. In some embodiments, $R^1$ is $R^{10}$-substituted or unsubstituted $C_{22}$-$C_{150}$ alkyl. In some embodiments, $R^1$ is $R^{10}$-substituted or unsubstituted $C_{24}$-$C_{150}$ alkyl. In some embodiments, $R^1$ is $R^{10}$-substituted or unsubstituted $C_{10}$-$C_{100}$ alkyl. In some embodiments, $R^1$ is $R^{10}$-substituted or unsubstituted $C_{12}$-$C_{100}$ alkyl. In some embodiments, $R^1$ is $R^{10}$-substituted or unsubstituted $C_{14}$-$C_{100}$ alkyl. In some embodiments, $R^1$ is $R^{10}$-substituted or unsubstituted $C_{16}$-$C_{100}$ alkyl. In some embodiments, $R^1$ is $R^{10}$-substituted or unsubstituted $C_{18}$-$C_{100}$ alkyl. In some embodiments, $R^1$ is $R^{10}$-substituted or unsubstituted $C_{10}$-$C_{100}$ alkyl. In some embodiments, $R^1$ is $R^{10}$-substituted or unsubstituted $C_{22}$-$C_{100}$ alkyl. In some embodiments, $R^1$ is $R^{10}$-substituted or unsubstituted $C_{24}$-$C_{100}$ alkyl. In some embodiments, $R^1$ is $R^{10}$-substituted or unsubstituted $C_{10}$-$C_{50}$ alkyl. In some embodiments, $R^1$ is $R^{10}$-substituted or unsubstituted $C_{12}$-$C_{50}$ alkyl. In some embodiments, $R^1$ is $R^{10}$-substituted or unsubstituted $C_{14}$-$C_{50}$ alkyl. In some embodiments, $R^1$ is $R^{10}$-substituted or unsubstituted $C_{16}$-$C_{50}$ alkyl. In some embodiments, $R^1$ is $R^{10}$-substituted or unsubstituted $C_{18}$-$C_{50}$ alkyl. In some embodiments, $R^1$ is $R^{10}$-substituted or unsubstituted $C_{20}$-$C_{50}$ alkyl. In some embodiments, $R^1$ is $R^{10}$-substituted or unsubstituted $C_{22}$-$C_{50}$ alkyl. In some embodiments, $R^1$ is $R^{10}$-substituted or unsubstituted $C_{24}$-$C_{50}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is $R^{10}$-substituted or unsubstituted $C_{10}$-$C_{40}$ alkyl. In some embodiments, $R^1$ is $R^{10}$-substituted or unsubstituted $C_{12}$-$C_{40}$ alkyl. In some embodiments, $R^1$ is $R^{10}$-substituted or unsubstituted $C_{14}$-$C_{40}$ alkyl. In some embodiments, $R^1$ is $R^{10}$-substituted or unsubstituted $C_{16}$-$C_{40}$ alkyl. In some embodiments, $R^1$ is $R^{10}$-substituted or unsubstituted $C_{18}$-$C_{40}$ alkyl. In some embodiments, $R^1$ is $R^{10}$-substituted or unsubstituted $C_{20}$-$C_{40}$ alkyl. In some embodiments, $R^1$ is $R^{10}$-substituted or unsubstituted $C_{22}$-$C_{40}$ alkyl. In some embodiments, $R^1$ is $R^{10}$-substituted or unsubstituted $C_{24}$-$C_{40}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is $R^{10}$-substituted or unsubstituted $C_{10}$-$C_{36}$ alkyl. In some embodiments, $R^1$ is $R^{10}$-substituted or unsubstituted $C_{12}$-$C_{36}$ alkyl. In some embodiments, $R^1$ is $R^{10}$-substituted or unsubstituted $C_{14}$-$C_{36}$ alkyl. In some embodiments, $R^1$ is $R^{10}$-substituted or unsubstituted $C_{16}$-$C_{36}$ alkyl. In some embodiments, $R^1$ is $R^{10}$-substituted or unsubstituted $C_{18}$-$C_{36}$ alkyl. In some embodiments, $R^1$ is $R^{10}$-substituted or unsubstituted $C_{20}$-$C_{36}$ alkyl. In some embodiments, $R^1$ is $R^{10}$-substituted or unsubstituted $C_{22}$-$C_{36}$ alkyl. In some embodiments, $R^1$ is $R^{10}$-substituted or unsubstituted $C_{24}$-$C_{36}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is $R^{10}$-substituted or unsubstituted $C_{10}$-$C_{28}$ alkyl. In some embodiments, $R^1$ is $R^{10}$-substituted or unsubstituted $C_{12}$-$C_{28}$ alkyl. In some embodiments, $R^1$ is $R^{10}$-substituted or unsubstituted $C_{14}$-$C_{28}$ alkyl. In some embodiments, $R^1$ is $R^{10}$-substituted or unsubstituted $C_{16}$-$C_{28}$ alkyl. In some embodiments, $R^1$ is $R^{10}$-substituted or unsubstituted $C_{18}$-$C_{28}$ alkyl. In some embodiments, $R^1$ is $R^{10}$-substituted or unsubstituted $C_{20}$-$C_{28}$ alkyl. In some embodiments, $R^1$ is $R^{10}$-substituted or unsubstituted $C_{22}$-$C_{28}$ alkyl. In some embodiments, $R^1$ is $R^{10}$-substituted or unsubstituted $C_{24}$-$C_{28}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{100}$ alkyl. In other embodiments, $R^1$ is linear unsubstituted $C_{12}$-$C_{100}$ alkyl. In some embodiments, $R^1$ is branched unsubstituted $C_{16}$-$C_{100}$ alkyl. In other embodiments, $R^1$ is linear unsubstituted $C_{16}$-$C_{100}$ alkyl. In some embodiments, $R^1$ is branched unsubstituted $C_{18}$-$C_{100}$ alkyl. In other embodiments, $R^1$ is linear unsubstituted $C_{18}$-$C_{100}$ alkyl. In some embodiments, $R^1$ is branched unsubstituted $C_{20}$-$C_{100}$ alkyl. In other embodiments, $R^1$ is linear unsubstituted $C_{20}$-$C_{100}$ alkyl. In some embodiments, $R^1$ is branched unsubstituted $C_{22}$-$C_{100}$ alkyl. In other embodiments, $R^1$ is linear unsubstituted $C_{22}$-$C_{100}$ alkyl. In some embodiments, $R^1$ is branched unsubstituted $C_{24}$-$C_{100}$ alkyl. In other embodiments, $R^1$ is linear unsubstituted $C_{24}$-$C_{100}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{50}$ alkyl. In other embodiments, $R^1$ is linear unsubstituted $C_{12}$-$C_{50}$ alkyl. In some embodiments, $R^1$ is branched unsubstituted $C_{16}$-$C_{50}$ alkyl. In other embodiments, $R^1$ is linear unsubstituted $C_{16}$-$C_{50}$ alkyl. In some embodiments, $R^1$ is branched unsubstituted $C_{18}$-$C_{50}$ alkyl. In other embodiments, $R^1$ is linear unsubstituted $C_{18}$-$C_{50}$ alkyl. In some embodiments, $R^1$ is branched unsubstituted $C_{20}$-$C_{50}$ alkyl. In other embodiments, $R^1$ is linear unsubstituted $C_{20}$-$C_{50}$ alkyl. In some embodiments, $R^1$ is branched unsubstituted $C_{22}$-$C_{50}$ alkyl. In other embodiments, $R^1$ is linear unsubstituted $C_{22}$-$C_{50}$ alkyl. In some embodiments, $R^1$ is branched unsubstituted $C_{24}$-$C_{50}$ alkyl. In other embodiments, $R^1$ is linear unsubstituted $C_{24}$-$C_{50}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{40}$ alkyl. In other embodiments, $R^1$ is linear unsubstituted $C_{12}$-$C_{40}$ alkyl. In some embodiments, $R^1$ is branched unsubstituted $C_{16}$-$C_{40}$ alkyl. In other embodiments, $R^1$ is linear unsubstituted $C_{16}$-$C_{40}$ alkyl. In some embodiments, $R^1$ is branched unsubstituted $C_{18}$-$C_{40}$ alkyl. In other embodiments, $R^1$ is linear unsubstituted $C_{18}$-$C_{40}$ alkyl. In some embodiments, $R^1$ is branched unsubstituted $C_{20}$-$C_{40}$ alkyl. In other embodiments, $R^1$ is linear unsubstituted $C_{20}$-$C_{40}$ alkyl. In some embodiments, $R^1$ is branched unsubstituted $C_{22}$-$C_{40}$ alkyl. In other embodiments, $R^1$ is linear unsubstituted $C_{22}$-$C_{40}$ alkyl. In some embodiments, $R^1$ is branched unsubstituted $C_{24}$-$C_{40}$ alkyl. In other embodiments, $R^1$ is linear unsubstituted $C_{24}$-$C_{40}$ alkyl. In some related embodiments, the alkyl is a saturated alkyl. In other related embodiments, n is as defined in an embodiment above (e.g. n is at least 25; or at least 35, e.g. 35 to 100).

In some embodiments, $R^1$ is branched unsubstituted $C_{12}$-$C_{36}$ alkyl. In other embodiments, $R^1$ is linear unsubstituted $C_{12}$-$C_{36}$ alkyl. In some embodiments, $R^1$ is branched unsubstituted $C_{16}$-$C_{36}$ alkyl. In other embodiments, $R^1$ is linear unsubstituted $C_{16}$-$C_{36}$ alkyl. In some embodiments, $R^1$ is branched unsubstituted $C_{18}$-$C_{36}$ alkyl. In other embodiments, $R^1$ is linear unsubstituted $C_{18}$-$C_{36}$ alkyl. In some embodiments, $R^1$ is branched unsubstituted $C_{20}$-$C_{36}$ alkyl. In other embodiments, $R^1$ is linear unsubstituted $C_{20}$-$C_{36}$ alkyl. In some embodiments, $R^1$ is branched unsubstituted $C_{22}$-$C_{36}$ alkyl. In other embodiments, $R^1$ is linear unsubstituted $C_{22}$-$C_{36}$ alkyl. In some embodiments, $R^1$ is branched unsubstituted $C_{24}$-$C_{36}$ alkyl. In other embodiments, $R^1$ is linear unsubstituted $C_{24}$-$C_{36}$ alkyl. In some related embodiments, the alkyl is a saturated alkyl. In other related embodiments, n is as defined in an embodiment above (e.g. n is at least 25; or at least 35, e.g. 35 to 100).

n some embodiments, $R^1$ is branched unsubstituted $C_{12}$-$C_{28}$ alkyl. In other embodiments, $R^1$ is linear unsubstituted $C_{12}$-$C_{28}$ alkyl. In some embodiments, $R^1$ is branched unsubstituted $C_{16}$-$C_{28}$ alkyl. In other embodiments, $R^1$ is linear unsubstituted $C_{16}$-$C_{28}$ alkyl. In some embodiments, $R^1$ is branched unsubstituted $C_{18}$-$C_{28}$ alkyl. In other embodiments, $R^1$ is linear unsubstituted $C_{18}$-$C_{28}$ alkyl. In some embodiments, $R^1$ is branched unsubstituted $C_{20}$-$C_{28}$ alkyl. In other embodiments, $R^1$ is linear unsubstituted $C_{20}$-$C_{28}$ alkyl. In some embodiments, $R^1$ is branched unsubstituted $C_{22}$-$C_{28}$ alkyl. In other embodiments, $R^1$ is linear unsubstituted $C_{22}$-$C_{28}$ alkyl. In some embodiments, $R^1$ is branched unsubstituted $C_{24}$-$C_{28}$ alkyl. In other embodiments, $R^1$ is linear unsubstituted $C_{24}$-$C_{28}$ alkyl. In some related embodiments, the alkyl is a saturated alkyl. In other related embodiments, n is as defined in an embodiment above (e.g. n is at least 25; or at least 35, e.g. 35 to 100).

In some embodiments, where $R^1$ is a linear or branched unsubstituted alkyl (e.g. branched unsubstituted $C_{12}$-$C_{100}$ alkyl), the alkyl is a saturated alkyl (e.g. a linear or branched unsubstituted saturated alkyl or branched unsubstituted $C_{12}$-$C_{100}$ saturated alkyl). A "saturated alkyl," as used herein, refers to an alkyl consisting only of hydrogen and carbon atoms and are boded exclusively by single bonds. Thus, in some embodiments, $R^1$ may be linear or branched unsubstituted saturated alkyl. In some embodiments, $R^1$ is branched unsubstituted $C_{12}$-$C_{100}$ saturated alkyl. In other embodiments, $R^1$ is linear unsubstituted $C_{12}$-$C_{100}$ saturated alkyl. In some embodiments, $R^1$ is branched unsubstituted $C_{16}$-$C_{100}$ saturated alkyl. In other embodiments, $R^1$ is linear unsubstituted $C_{16}$-$C_{100}$ saturated alkyl. In some embodiments, $R^1$ is branched unsubstituted $C_{24}$-$C_{36}$ saturated alkyl. In other embodiments, $R^1$ is linear unsubstituted $C_{24}$-$C_{36}$ saturated alkyl. In other embodiments, $R^1$ is linear unsubstituted $C_{24}$-$C_{28}$ saturated alkyl. In other embodiments, $R^1$ is branched unsubstituted $C_{24}$-$C_{28}$ saturated alkyl.

In some embodiments, $R^1$ is formed using the Guerbet reaction.

In some embodiments, $R^2$ is independently hydrogen or unsubstituted $C_1$-$C_5$ alkyl. In some embodiments, $R^2$ is a branched unsubstituted $C_1$-$C_5$ saturated alkyl. In some embodiments, $R^2$ is hydrogen or a branched unsubstituted $C_1$ or $C_2$ saturated alkyl. In some embodiments, $R^2$ is hydrogen or a branched unsubstituted $C_1$ saturated alkyl. In other embodiments, $R^2$ is $C_2$-$C_6$ alkyl. In some embodiments, $R^2$ is a branched unsubstituted $C_2$-$C_6$ saturated alkyl. In some embodiments, $R^2$ is not $C_2$ alkyl. In other embodiments, $R^2$ is $C_1$ alkyl or $C_3$-$C_6$ alkyl. In some embodiments, $R^2$ is a branched unsubstituted $C_3$-$C_6$ saturated alkyl. In other embodiments, $R^3$ is hydrogen.

In some embodiments, z is 1. $M^+$ may be a monovalent, divalent or trivalent cation. In some embodiments, $M^+$ is a monovalent, divalent or trivalent metal cation. In some embodiments, $M^+$ is a monovalent or divalent cation (e.g. metal cation). In some embodiments, $M^+$ is a monovalent cation (e.g. metal cation). In some embodiments, $M^+$ is a divalent cation (e.g. metal cation). In some embodiments, $M^+$ is $Na^+$, $K^+$, $NH_4^+$, $Ca^{+2}$, $Mg^{+2}$ or $Ba^{+2}$.

In some embodiments the compound of formula (Ia) or (Ib), or embodiments thereof disclosed herein (e.g. formula, the compound has a molecular weight of at least about 1500 g/mol. In some embodiments of the compound of formula (Ia) or (Ib), or embodiments thereof disclosed herein, the compound has a molecular weight of at least 1 about 600 g/mol. In some embodiments of the compound of formula (Ia) or (Ib), or embodiments thereof disclosed herein, the compound has a molecular weight of at least about 1700 g/mol. In some embodiments of the compound of formula (Ia) or (Ib), or embodiments thereof disclosed herein, the compound has a molecular weight of at least about 1800 g/mol. In some embodiments of the compound of formula (Ia) or (Ib), or embodiments thereof disclosed herein, the compound has a molecular weight of at least about 1900 g/mol. In some embodiments of the compound of formula (Ia) or (Ib), or embodiments thereof disclosed herein, the compound has a molecular weight of at least about 2000 g/mol. In some embodiments of the compound of formula (Ia) or (Ib), or embodiments thereof disclosed herein, the compound has a molecular weight of at least about 2100 g/mol. In some embodiments of the compound of formula (Ia) or (Ib), or embodiments thereof disclosed herein, the compound has a molecular weight of at least about 2200 g/mol. In some embodiments of the compound of formula (Ia) or (Ib), or embodiments thereof disclosed herein, the compound has a molecular weight of at least about 2300 g/mol. In some embodiments of the compound of formula (Ia) or (Ib), or embodiments thereof disclosed herein, the compound has a molecular weight of at least about 2400 g/mol. In some embodiments of the compound of formula (Ia) or (Ib), or embodiments thereof disclosed herein, the compound has a molecular weight of at least about 2500 g/mol. In some embodiments of the compound of formula (Ia) or (Ib), or embodiments thereof disclosed herein, the compound has a molecular weight of at least about 2600 g/mol. In some embodiments of the compound of formula (Ia) or (Ib), or embodiments thereof disclosed herein, the compound has a molecular weight of at least about 2700 g/mol. In some embodiments of the compound of formula (Ia) or (Ib), or embodiments thereof disclosed herein, the compound has a molecular weight of at least about 2800 g/mol. In some embodiments of the compound of formula (Ia) or (Ib), or embodiments thereof disclosed herein, the compound has a molecular weight of at least about 2900 g/mol. In some embodiments of the compound of formula (Ia) or (Ib), or embodiments thereof disclosed herein, the compound has a molecular weight of at least about 3000 g/mol.

In some embodiments, where multiple $R^2$ substituents are present and at least two $R^2$ substituents are different, $R^2$ substituents with the fewest number of carbons are present to the carboxyl or carboxylate side of the compound of formula (Ia) or (Ib), respectively. In this embodiment, the compound of formula (Ia) or (Ib) will be increasingly hydrophilic in progressing from the $R^1$ substituent to the carboxyl or carboxylate side of the compound of formula (Ia) or (Ib), respectively. The term "carboxyl or carboxylate side of the compound of formula (Ia) or (Ib), respectively" refers to the side of the compound indicated by asterisks in the below structures:

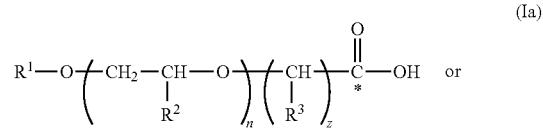

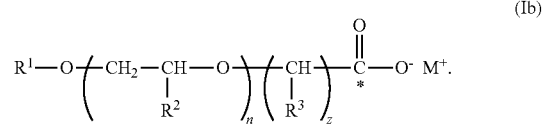

In some embodiments of the compound of formula (Ia) or (Ib), or embodiments thereof disclosed herein, where $R^1$ is unsubstituted $C_8$-$C_{18}$ alkyl, the symbol n is an integer from 21 to 210. In other embodiments, where $R^1$ is unsubstituted $C_8$-$C_{18}$ alkyl, the symbol n is an integer from 25 to 210. In other embodiments, where $R^1$ is unsubstituted $C_8$-$C_{18}$ alkyl, the symbol n is an integer from 30 to 210. In other embodiments, where $R^1$ is unsubstituted $C_8$-$C_{18}$ alkyl, the symbol n is an integer from 35 to 210. In other embodiments, where $R^1$ is unsubstituted $C_8$-$C_{18}$ alkyl, the symbol n is an integer from 40 to 210. In other embodiments, where $R^1$ is unsubstituted $C_8$-$C_{18}$ alkyl, the symbol n is an integer from 45 to 210. In other embodiments, where $R^1$ is unsubstituted $C_8$-$C_{18}$ alkyl, the symbol n is an integer from 50 to 210. In other embodiments, where $R^1$ is unsubstituted $C_8$-$C_{18}$ alkyl, the symbol n is an integer from 55 to 210. In other embodiments, where $R^1$ is unsubstituted $C_8$-$C_{18}$ alkyl, the symbol n is an integer from 60 to 210. In other embodiments, where $R^1$ is unsubstituted $C_8$-$C_{18}$ alkyl, the symbol n is an integer from 25 to 100. In other embodiments, where $R^1$ is unsubstituted $C_8$-$C_{18}$ alkyl, the symbol n is an integer from 30 to 100. In other embodiments, where $R^1$ is unsubstituted $C_8$-$C_{18}$ alkyl, the symbol n is an integer from 35 to 100. In other embodiments, where $R^1$ is unsubstituted $C_8$-$C_{18}$ alkyl, the symbol n is an integer from 40 to 100. In other embodiments, where $R^1$ is unsubstituted $C_8$-$C_{18}$ alkyl, the symbol n is an integer from 45 to 100. In other embodiments, where $R^1$ is unsubstituted $C_8$-$C_{18}$ alkyl, the symbol n is an integer from 50 to 100. In other embodiments, where $R^1$ is unsubstituted $C_8$-$C_{18}$ alkyl, the symbol n is an integer from 55 to 100. In other embodiments, where $R^1$ is unsubstituted $C_8$-$C_{18}$ alkyl, the symbol n is an integer from 60 to 100.

In some embodiments, the compound has the formula

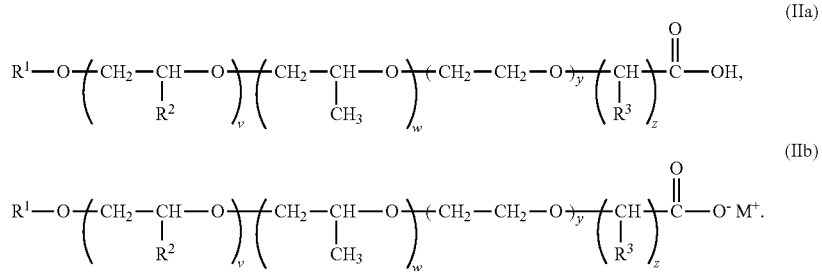

In formula (IIa) or (IIb) $M^+$, $R^1$, $R^2$, $R^3$ and z are as defined above. The symbol y is an integer from 1 to 100, w is an integer from 1 to 70, v is an integer from 0 to 40. In some embodiments, $R^2$ is unsubstituted $C_2$-$C_6$ alkyl (e.g. ethyl). In some embodiments, $R^2$ is unsubstituted $C_3$-$C_6$ alkyl. In some embodiments, $R^2$ is ethyl. In some embodiments, y is an integer from 10 to 50, w is an integer from 5 to 50 and v is an integer from 0 to 30. In other embodiments, y is an integer from 10 to 40. In certain embodiments, y is 10 to 60. In certain embodiments, y is 10 to 56. The symbol w may be an integer from 5 to 40. In certain embodiments, w is 25 to 35. The symbol v may be an integer from 0 to 20. The symbol v may be an integer from 0 to 10. The symbol v may also be 0.

In some embodiments, y is 10 to 100. In some related embodiments, y is 10 to 90. In some related embodiments, y is 10 to 80. In some related embodiments, y is 10 to 70. In some related embodiments, y is 10 to 60. In some related embodiments, y is 10 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 15 to 100. In some related embodiments, y is 15 to 90. In some related embodiments, y is 15 to 80. In some related embodiments, y is 15 to 70. In some related embodiments, y is 15 to 60. In some related embodiments, y is 15 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 20 to 100. In some related embodiments, y is 20 to 90. In some related embodiments, y is 20 to 80. In some related embodiments, y is 20 to 70. In some related embodiments, y is 20 to 60. In some related embodiments, y is 20 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 25 to 100. In some related embodiments, y is 25 to 90. In some related embodiments, y is 25 to 80. In some related embodiments, y is 25 to 70. In some related embodiments, y is 25 to 60. In some related embodiments, y is 25 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 30 to 100. In some related embodiments, y is 30 to 90. In some related embodiments, y is 30 to 80. In some related embodiments, y is 30 to 70. In some related embodiments, y is 30 to 60. In some related embodiments, y is 30 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 35 to 100. In some related embodiments, y is 35 to 90. In some related embodiments, y is 35 to 80. In some related embodiments, y is 35 to 70. In some related embodiments, y is 35 to 60. In some related embodiments, y is 35 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 40 to 100. In some related embodiments, y is 40 to 90. In some related embodiments, y is 40 to 80. In some related embodiments, y is 40 to 70. In some related embodiments, y is 40 to 60. In some related embodiments, y is 40 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 45 to 100. In some related embodiments, y is 45 to 90. In some related embodiments, y is 45 to 80. In some related embodiments, y is 45 to 70. In some related embodiments, y is 45 to 60. In some related embodiments, y is 45 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In some embodiments, y is 50 to 100. In some related embodiments, y is 50 to 90. In some related embodiments, y is 50 to 80. In some related embodiments, y is 50 to 70. In some related embodiments, y is 50 to 60. In some related embodiments, y is 50 to 56. In some further related embodiments, w is 5 to 60. In other further related embodiments, w is 10 to 50. In other further related embodiments, w is 15 to 40. In other further related embodiments, w is 20 to 40. In other further related embodiments, w is 25 to 35. In other further related embodiments, w is more than 10, 15, or 20. Moreover, in still further related embodiments, v is 0. In other still further related embodiments, v is 0 to 20. In other still further related embodiments, v is 0 to 10. In other still further related embodiments, v is 0 to 5. In other still further related embodiments, v is 0 to 3. In other still further related embodiments, v is 0 to 2. In other still further related embodiments, v is 1. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl).

In other embodiments, the compound has the formula

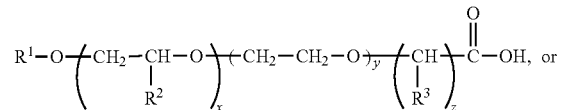

(IIIa)

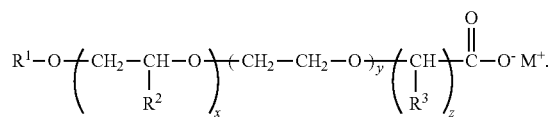

(IIIb)

In formula (IIIa) or (IIIb), $M^+$, $R^1$, $R^2$, $R^3$ and z are as defined above (e.g. in formula (Ia), (Ib), (IIa), and (IIb)). The symbols x and y are independently integers from 1 to 100, and $R^2$ is unsubstituted $C_1$-$C_6$ alkyl. In some embodiments, $R^2$ is $C_3$-$C_6$. In some embodiments, $R^2$ is ethyl. In some embodiments, $R^2$ is methyl. In some embodiments, y is an integer from 10 to 50 and x is an integer from 5 to 50. In other embodiments, y is an integer from 10 to 40. In certain embodiments, y is 10 to 60. In certain embodiments, y is 10 to 56. The symbol x may be an integer from 5 to 40. In certain embodiments, x is 25 to 35. In some embodiments, z is 1. As stated above, $R^3$ may be hydrogen.

In some embodiments, y is 10 to 100. In some related embodiments, y is 10 to 90. In some related embodiments, y is 10 to 80. In some related embodiments, y is 10 to 70. In some related embodiments, y is 10 to 60. In some related embodiments, y is 10 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 15 to 100. In some related embodiments, y is 15 to 90. In some related embodiments, y is 15 to 80. In some related embodiments, y is 15 to 70. In some related embodiments, y is 15 to 60. In some related embodiments, y is 15 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 20 to 100. In some related embodiments, y is 20 to 90. In some related embodiments, y is 20 to 80. In some related embodiments, y is 20 to 70. In some related embodiments, y is 20 to 60. In some related embodiments, y is 20 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 25 to 100. In some related embodiments, y is 25 to 90. In some related embodiments, y is 25 to 80. In some related embodiments, y is 25 to 70. In some related embodiments, y is 25 to 60. In some related embodiments, y is 25 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 30 to 100. In some related embodiments, y is 30 to 90. In some related embodiments, y is 30 to 80. In some related embodiments, y is 30 to 70. In some related embodiments, y is 30 to 60. In some related embodiments, y is 30 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 35 to 100. In some related embodiments, y is 35 to 90. In some related embodiments, y is 35 to 80. In some related embodiments, y is 35 to 70. In some related embodiments, y is 35 to 60. In some related embodiments, y is 35 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 40 to 100. In some related embodiments, y is 40 to 90. In some related embodiments, y is 40 to 80. In some related embodiments, y is 40 to 70. In some related embodiments, y is 40 to 60. In some related embodiments, y is 40 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 45 to 100. In some related embodiments, y is 45 to 90. In some related embodiments, y is 45 to 80. In some related embodiments, y is 45 to 70. In some related embodiments, y is 45 to 60. In some related embodiments, y is 45 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 50 to 100. In some related embodiments, y is 50 to 90. In some related embodiments, y is 50 to 80. In some related embodiments, y is 50 to 70. In some related embodiments, y is 50 to 60. In some related embodiments, y is 50 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, the compound has the formula:

(IVa)

$$R^1-O-\left(CH_2-\underset{CH_3}{CH}-O\right)_x-\left(CH_2-CH_2-O\right)_y-\left(\underset{R^3}{CH}\right)_z-\overset{O}{\underset{\|}{C}}-OH,$$

-continued

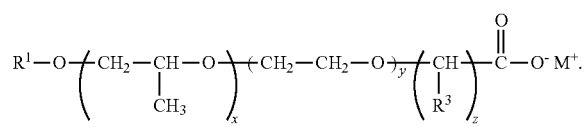
((IVb))

In formula (IVa) or ((IVb)), $M^+$, $R^1$, x, y and z are as defined above (e.g. in formula (Ia), (Ib), (IIa), and (IIb)). For example, in some embodiments, z is 1, $R^3$ is hydrogen, x and y are independently 5 to 100, and $R^1$ is unsubstituted $C_{16}$-$C_{50}$ alkyl or unsubstituted tristyrylphenyl. In some embodiments, y is an integer from 10 to 50 and x is an integer from 5 to 50. In other embodiments, y is an integer from 10 to 40. In certain embodiments, y is 10 to 60. In certain embodiments, y is 10 to 56. The symbol x may be an integer from 5 to 40. In certain embodiments, x is 25 to 35.

In some embodiments, y is 10 to 100. In some related embodiments, y is 10 to 90. In some related embodiments, y is 10 to 80. In some related embodiments, y is 10 to 70. In some related embodiments, y is 10 to 60. In some related embodiments, y is 10 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 15 to 100. In some related embodiments, y is 15 to 90. In some related embodiments, y is 15 to 80. In some related embodiments, y is 15 to 70. In some related embodiments, y is 15 to 60. In some related embodiments, y is 15 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 20 to 100. In some related embodiments, y is 20 to 90. In some related embodiments, y is 20 to 80. In some related embodiments, y is 20 to 70. In some related embodiments, y is 20 to 60. In some related embodiments, y is 20 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 25 to 100. In some related embodiments, y is 25 to 90. In some related embodiments, y is 25 to 80. In some related embodiments, y is 25 to 70. In some related embodiments, y is 25 to 60. In some related embodiments, y is 25 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 30 to 100. In some related embodiments, y is 30 to 90. In some related embodiments, y is 30 to 80. In some related embodiments, y is 30 to 70. In some related embodiments, y is 30 to 60. In some related embodiments, y is 30 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 35 to 100. In some related embodiments, y is 35 to 90. In some related embodiments, y is 35 to 80. In some related embodiments, y is 35 to 70. In some related embodiments, y is 35 to 60. In some related embodiments, y is 35 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 40 to 100. In some related embodiments, y is 40 to 90. In some related embodiments, y is 40 to 80. In some related embodiments, y is 40 to 70. In some related embodiments, y is 40 to 60. In some related embodiments, y is 40 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 45 to 100. In some related embodiments, y is 45 to 90. In some related embodiments, y is 45 to 80. In some related embodiments, y is 45 to 70. In some related embodiments, y is 45 to 60. In some related embodiments, y is 45 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, y is 50 to 100. In some related embodiments, y is 50 to 90. In some related embodiments, y is 50 to 80. In some related embodiments, y is 50 to 70. In some related embodiments, y is 50 to 60. In some related embodiments, y is 50 to 56. In some further related embodiments, x is 5 to 60. In other further related embodiments, x is 10 to 50. In other further related embodiments, x is 15 to 40. In other further related embodiments, x is 20 to 40. In other further related embodiments, x is 25 to 35. In other further related embodiments, x is more than 10, 15, or 20. $R^1$ may be any of the embodiments described above (e.g. an $C_{20}$-$C_{50}$ alkyl such as a $C_{20}$-$C_{40}$ alkyl, $C_{20}$-$C_{36}$ alkyl or $C_{24}$-$C_{28}$ alkyl). In some embodiments, z is 1. As stated above, $R^3$ may be hydrogen.

In some embodiments, the compound of formula (Ia), (Ib), (IIa), (IIb), (IIIa), (IIIb), (IVa), ((IVb)) or (V) is a surfactant. More particularly, in certain embodiments, the compound of formula (Ia), (Ib), (IIa), (IIb), (IIIa), (IIIb), (IVa), ((IVb)) or (V) functions to lower the surface tension and/or interfacial tension of an oil such as a crude oil (i.e. unrefined petroleum). The compounds of formula (Ia), (Ib), (IIa), (IIb), (IIIa), (IIIb), (IVa), ((IVb)) or (V) may also be referred to herein as "compounds provided herein" or "the compound of the present invention." In some embodiments, the compounds provided herein tend to not adsorb to rock surfaces (e.g. clastics or carbonates). In certain embodiments, the compounds provided herein adsorb to rock surfaces less than compounds having a sulfate group (or salt thereof with a metal cation) in place of the carboxyl groups (or salt thereof with a metal cation). Any one or combination of a compound of formulas (Ia), (Ib), (IIa), (IIb), (IIIa), (IIIb), (IVa), ((IVb)) or (V) is useful in the methods and compositions provided herein.

In some embodiments, the compound has the formula:

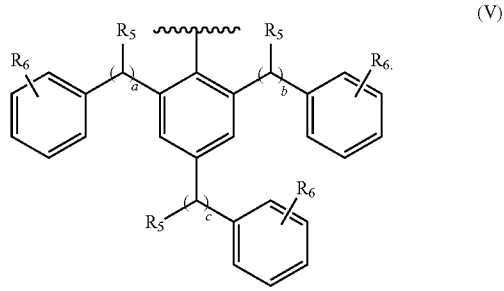

(V)

In formula (V), $R^5$ and $R^6$ are as defined above. For example, in some embodiments, $R^5$ is $R^6$-substituted or unsubstituted $C_1$-$C_{50}$ alkyl (e.g. a branched and/or saturated alkyl), $R^6$-substituted or unsubstituted aryl or $R^6$-substituted or unsubstituted cycloalkyl. In some embodiments, $R^5$ is unsubstituted $C_1$-$C_{25}$ alkyl (e.g. a branched and/or saturated alkyl). In other embodiments, $R^5$ is branched unsubstituted $C_1$-$C_{25}$ saturated alkyl. $R^6$ is $R^7$-substituted or unsubstituted $C_1$-$C_{50}$ alkyl (e.g. a branched and/or saturated alkyl), $R^7$-substituted or unsubstituted aryl or $R^7$-substituted or unsubstituted cycloalkyl. In some embodiments, $R^6$ is $C_1$-$C_{25}$ alkyl. In other embodiments, $R^6$ is branched unsubstituted $C_1$-$C_{25}$ saturated alkyl. The symbols a, b, and c are independently integers from 1 to 15. In some embodiments, a, b, and c are independently integers from 1 to 10. In some embodiments, a, b, and c are independently integers from 1 to 10. In some embodiments, a, b, and c are 1.

In another aspect, an aqueous composition is provided including a co-surfactant and a compound described above (e.g. a compound of formula (Ia), (Ib), (IIa), (IIb), (IIIa), (IIIb), (IVa), ((IVb)) or (V)). A co-surfactant, as used herein, is a compound within the aqueous composition that functions as a surface active agent when the aqueous composition is in contact with a crude oil (e.g. an unrefined petroleum). The co-surfactant, along with the compound of formula (Ia), (Ib), (IIa), (IIb), (IIIa), (IIIb), (IVa), ((IVb)) or (V), may act to lower the interfacial tension and/or surface tension of the unrefined petroleum. In some embodiments, the co-surfactant and the compound of formula (Ia), (Ib), (IIa), (IIb), (IIIa), (IIIb), (IVa), ((IVb)) or (V) are present in synergistic surface active amounts. A "synergistic surface active amount," as used herein, means that a compound of formula (Ia), (Ib), (IIa), (IIb), (IIIa), (IIIb), (IVa), ((IVb)) or (V) and the co-surfactant are present in amounts in which the oil surface activity (interfacial tension lowering effect and/or surface tension lowering effect on crude oil when the aqueous composition is added to the crude oil) of the compound and co-surfactant combined is greater than the additive oil surface activity of the co-surfactant individually and the compound individually. In some cases, the oil surface activity of the compound and co-surfactant combination is 10%, 20%, 30%, 40%, 50%, 60%, 70%, 80%, 90% or 100% more than the additive oil surface activity of the co-surfactant individually and the compound individually. In some embodiments, the oil surface activity of the compound and co-surfactant combination is 2, 3, 4, 5, 6, 7, 8, 9 or 10 times more than the additive oil surface activity of the co-surfactant individually and the compound individually.

In another embodiment, the compound and co-surfactant are present in a surfactant stabilizing amount. A "surfactant stabilizing amount" means that the compound and the co-surfactant are present in an amount in which the co-surfactant degrades at a slower rate in the presence of the compound than in the absence of the compound, and/or the compound degrades at a slower rate in the presence of the co-surfactant than in the absence of the compound. The rate of degradation may be 10%, 20%, 30%, 40%, 50%, 60%, 70%, 80%, 90% or 100% slower. In some embodiments, the rate of degradation is 2, 3, 4, 5, 6, 7, 8, 9 or 10 times slower.

In another embodiment, the compound and co-surfactant are present in a synergistic solubilizing amount. A "synergistic solubilizing amount" means that the compound and the co-surfactant are present in an amount in which the compound is more soluble in the presence of the co-surfactant than in the absence of the surfactant, and/or the co-surfactant is more soluble in the presence of the compound than in the absence of the compound. The solubilization may be 10%, 20%, 30%, 40%, 50%, 60%, 70%, 80%, 90% or 100% higher. In some embodiment, the solubilization is 2, 3, 4, 5, 6, 7, 8, 9 or 10 times higher. In some embodiments, the compound is present in an amount sufficient to increase the solubility of the co-surfactant in the aqueous composition relative to the absence of the compound. In other words, in the presence of a sufficient amount of the compound, the solubility of the co-surfactant in the aqueous composition is higher than in the absence of the compound. In other embodiments, the co-surfactant is present in an amount sufficient to increase the solubility of the compound in the aqueous composition relative to the absence of the co-surfactant. Thus, in the presence of a sufficient amount of the co-surfactant the solubility of the compound in the aqueous solution is higher than in the absence of the co-surfactant.

In some embodiments, a single type of co-surfactant is in the aqueous composition. In other embodiments, a plurality of co-surfactant types of in the aqueous composition. In some embodiments, the co-surfactant is an anionic surfactant, a non-ionic surfactant, a zwitterionic surfactant or a cationic surfactant. In some embodiments, the co-surfactant is an anionic surfactant, a non-ionic surfactant or a cationic surfactant. In other embodiments, the co-surfactant is an zwitterionic co-surfactant. "Zwitterionic" or "zwitterion" as used herein refers to a neutral molecule with a positive (or cationic) and a negative (or anionic) electrical charge at different locations within the same molecule. Examples for zwitterionics are without limitation betains and sultains.

The co-surfactant as provided herein may be a combination of one or more anionic, non-ionic, cationic or zwitterionic co-surfactants. In some embodiments, the co-surfactant is an internal olefin sulfonate (IOS), an alfa olefin sulfonate (AOS), an alkyl aryl sulfonate (ARS), an alkane sulfonate, a petroleum sulfonate, an alkyl diphenyl oxide (di)sulfonate, an alcohol sulfate, an alkoxy sulfate, an alkoxy sulfonate, an alcohol phosphate, an alkoxy phosphate, a sulfosuccinate ester, an alcohol ethoxylate, an alkyl phenol ethoxylate, a quaternary ammonium salt, a betain or sultain. The co-surfactant as provided herein, may also be a soap.

Without limitation, the co-surfactant may be a combination of two or more of the following compounds: an internal olefin sulfonate (IOS), an alfa olefin sulfonate (AOS), an alkyl aryl sulfonate (ARS) (e.g. an alkyl benzene sulfonate (ABS)), an alkane sulfonate, a petroleum sulfonate, an alkyl diphenyl oxide (di)sulfonate, an alcohol sulfate, an alkoxy sulfate (e.g. an alkyl alkoxy sulfate) an alkoxy sulfonate, an alcohol phosphate, an alkoxy phosphate, a sulfosuccinate ester, an alcohol ethoxylate, an alkyl phenol ethoxylate, a quaternary ammonium salt, a betain, a sultain and a soap (or its carboxylic acid). A person having ordinary skill in the art will immediately recognize that many surfactants are commercially available as blends of related molecules (e.g. IOS and ABS surfactants). Thus, where a co-surfactant is present within a composition provided herein, a person of ordinary skill would understand that the co-surfactant may be a blend of a plurality of related surfactant molecules (as described herein and as generally known in the art). In some embodiments, the co-surfactant is a $C_{10}$-$C_{30}$ internal olefin sulfate (IOS) or a $C_8$-$C_{30}$ alkyl benzene sulfonate (ABS). In other embodiments, the co-surfactant is a combination of a $C_{10}$-$C_{30}$ internal olefin sulfate (IOS) and a $C_8$-$C_{30}$ alkyl benzene sulfonate (ABS). In some embodiments, the $C_{10}$-$C_{30}$ of IOS is a branched unsubstituted $C_{10}$-$C_{30}$ saturated alkyl. In some embodiment, the IOS is a $C_{15}$-$C_{18}$ internal olefin sulfate. In some embodiment, the IOS is a $C_{19}$-$C_{23}$ internal olefin sulfate. In some embodiment, the IOS is a $C_{20}$-$C_{24}$ internal olefin sulfate. In some embodiment, the IOS is a $C_{15}$-$C_{18}$ internal olefin sulfate. In other embodiments, the $C_8$-$C_{30}$ of ABS is a branched unsubstituted $C_8$-$C_{30}$ saturated alkyl.

In some embodiments, the surfactant is an unsubstituted alkyl alkoxy sulfate having an alkyl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkyl alkoxy sulfate has the formula $R^4$—(BO)$_e$—(PO)$_f$-(EO)$_g$—$SO_3^-$ or acid or salt (including metal cations such as sodium) thereof, wherein BO is —$CH_2$—CH(ethyl)-O—, PO is —$CH_2$—CH(methyl)-O—, and —$CH_2$—$CH_2$—O—. The symbols e, f and g are integers from 0 to 25 wherein at least one is not zero. In some embodiment, the alkyl alkoxy sulfate is $C_{15}$-13PO-Sulfate (i.e. an unsubstituted $C_{15}$ alkyl attached to 13 —$CH_2$—CH(methyl)-O— linkers, in turn attached to —$SO_3^-$ or acid or salt thereof including metal cations such as sodium. In some embodiments, the surfactant is an unsubstituted alkyl sulfate.

Useful co-surfactants are disclosed, for example, in U.S. Pat. Nos. 3,811,504, 3,811,505, 3,811,507, 3,890,239, 4,463, 806, 6,022,843, 6,225,267, 7,629,299; WIPO Patent Application WO/2008/079855; as well as U.S. Patent Application Nos. 2005/0199395, 2006/0185845, 2006/018486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, and 2010/0292110. Additional useful co-surfactants are surfactants known to be used in enhanced oil recovery methods, including those discussed in D. B. Levitt, A. C. Jackson, L. Britton and G. A. Pope, "Identification and Evaluation of High-Performance EOR Surfactants," SPE 100089, conference contribution for the SPE Symposium on Improved Oil Recovery Annual Meeting, Tulsa, Okla., Apr. 24-26, 2006.

In some embodiment, the total surfactant concentration (i.e. the compound of formula (Ia), (Ib), (IIa), (IIb), (IIIa), (IIIb), (IVa), ((IVb)) or (V) and one or more co-surfactants) in the aqueous composition is from about 0.05% w/w to about 10% w/w. In other embodiments, the total surfactant concentration in the aqueous composition is from about 0.25% to about 10%. In other embodiments, the total surfactant concentration in the aqueous composition is about 0.5%. In other embodiments, the total surfactant concentration in the aqueous composition is about 1.0%. In other embodiments, the total surfactant concentration in the aqueous composition is from about 1.25%. In other embodiments, the total surfactant concentration in the aqueous composition is from about 1.5%. In other embodiments, the total surfactant concentration in the aqueous composition is from about 1.75%. In other embodiments, the total surfactant concentration in the aqueous composition is from about 2.0%. In other embodiments, the total surfactant concentration in the aqueous composition is from about 2.5%. In other embodiments, the total surfactant concentration in the aqueous composition is from about 3.0%. In other embodiments, the total surfactant concentration in the aqueous composition is from about 3.5%. In other embodiments, the total surfactant concentration in the aqueous composition is from about 4.0%. In other embodiments, the total surfactant concentration in the aqueous composition is from about 4.5%. In other embodiments, the total surfactant concentration in the aqueous composition is from about 5.0%. In other embodiments, the total surfactant concentration in the aqueous composition is from about 5.5%. In other embodiments, the total surfactant concentration in the aqueous composition is from about 6.0%. In other embodiments, the total surfactant concentration in the aqueous composition is from about 6.5%. In other embodiments, the total surfactant concentration in the aqueous composition is from about 7.0%. In other embodiments, the total surfactant concentration in the aqueous composition is from about 7.5%. In other embodiments, the total surfactant concentration in the aqueous composition is from about 8.0%. In other embodiments, the total surfactant concentration in the aqueous composition is from about 9.0%. In other embodiments, the total surfactant concentration in the aqueous composition is from about 10%.

In some embodiments, the concentration of the compound of formula (Ia), (Ib), (IIa), (IIb), (IIIa), (IIIb), (IVa), ((IVb)) or (V) is about 0.05% (all percentages of the compounds of formula (Ia), (Ib), (IIa), (IIb), (IIIa), (IIIb), (IVa), ((IVb)) or (V), so-solvents ad co-surfactants within the aqueous compositions and emulsion compositions here are w/w percentages). In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.1%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.15%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.20%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.25%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.30%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.35%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.40%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.45%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.50%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.55%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.60%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.65%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.70%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.75%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.80%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.85%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.90%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 0.95%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 1.0%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 1.25%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 1.50%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 1.75%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 2%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 3%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 4%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

In some embodiments, the concentration of the compound of formula (Ia), (Ib), (IIa), (IIb), (IIIa), (IIIb), (IVa), ((IVb)) or (V) is about 5%. In some further embodiments, the concentration of the co-surfactant is about 0.05%. In some further embodiments, the concentration of the co-surfactant is about 0.10%. In some further embodiments, the concentration of the co-surfactant is about 0.15%. In some further embodiments, the concentration of the co-surfactant is about 0.20%. In some further embodiments, the concentration of the co-surfactant is about 0.25%. In some further embodiments, the concentration of the co-surfactant is about 0.30%. In some further embodiments, the concentration of the co-surfactant is about 0.35%. In some further embodiments, the concentration of the co-surfactant is about 0.40%. In some further embodiments, the concentration of the co-surfactant is about 0.45%. In some further embodiments, the concentration of the co-surfactant is about 0.50%. In some further embodiments, the concentration of the co-surfactant is about 0.55%. In some further embodiments, the concentration of the co-surfactant is about 0.60%. In some further embodiments, the concentration of the co-surfactant is about 0.65%. In some further embodiments, the concentration of the co-surfactant is about 0.70%. In some further embodiments, the concentration of the co-surfactant is about 0.75%. In some further embodiments, the concentration of the co-surfactant is about 0.80%. In some further embodiments, the concentration of the co-surfactant is about 0.85%. In some further embodiments, the concentration of the co-surfactant is about 0.90%. In some further embodiments, the concentration of the co-surfactant is about 0.95%. In some further embodiments, the concentration of the co-surfactant is about 1.0%. In some further embodiments, the concentration of the co-surfactant is about 1.25%. In some further embodiments, the concentration of the co-surfactant is about 1.5%. In some further embodiments, the concentration of the co-surfactant is about 1.75%. In some further embodiments, the concentration of the co-surfactant is about 2%. In some further embodiments, the concentration of the co-surfactant is about 3%. In some further embodiments, the concentration of the co-surfactant is about 4%. In some further embodiments, the concentration of the co-surfactant is about 5%.

As described above, the aqueous composition may include the compound of formula (IVa) and (IV b) and a co-surfactant. In some embodiments, the compound is C28-25PO-25EO carboxylate (i.e. a compound as described herein for example in formula (IVa) and ((IVb)), wherein $R_1$ is a saturated branched unsubstituted $C_{28}$ alkyl (produced from a Guerbet reaction), x is 25, y is 25, z is 1, and $R_3$ is H) and the co-surfactant is C15-18 IOS (as described in Example 1). A person of ordinary skill in the are would immediately recognize that the C15-18 IOS encompasses a blend of IOS surfactants as described herein. Therefore, the C15-18 IOS and similar IOS blends described herein may be alternatively referred to as a plurality of co-surfactants or a plurality of IOS surfactants. In some embodiments, the C28-25PO-25EO carboxylate is present at a concentration from about 0.1% to about 1% and the C15-18 IOS is present at a concentration from about 0.1% to about 1%. In some embodiments, the C28-25PO-25EO carboxylate is present at a concentration from about 0.2% to about 0.9% and the C15-18 IOS is present at a concentration from about 0.2% to about 0.9%. In some embodiments, the C28-25PO-25EO carboxylate is present at a concentration from about 0.3% to about 0.8% and the C15-18 IOS is present at a concentration from about 0.3% to about 0.8%. In some embodiments, the C28-25PO-25EO carboxylate is present at a concentration from about 0.4% to about 0.7% and the C15-18 IOS is present at a concentration from about 0.4% to about 0.7%. In some embodiments, the C28-25PO-25EO carboxylate is present at a concentration from about 0.5% to about 0.6% and the C15-18 IOS is present at a concentration from about 0.5% to about 0.6%. In some embodiments, the C28-25PO-25EO carboxylate is present at a concentration of about 0.5% and the C15-18 IOS is present at a concentration of about 0.5%. In some embodiments, the C28-25PO-25EO carboxylate is present at a concentration of about 0.1, 0.2, 0.3, 0.4, 0.5, 0.6, 0.7, 0.8, 0.9 or 1.0% and the C15-18 IOS is present at a concentration of about 0.1, 0.2, 0.3, 0.4, 0.5, 0.6, 0.7, 0.8, 0.9 or 1.0%.

In some embodiments, the compound is C24-25PO-56EO carboxylate (i.e. a compound as described herein for example in formula (IVa) and (IVb), wherein $R_1$ is a saturated branched unsubstituted $C_{24}$ alkyl (produced from a Guerbet reaction), x is 25, y is 56, z is 1, and $R_3$ is H) and the co-surfactant is C19-23 IOS (as described in Example 2). In some embodiments, the C24-25PO-56EO carboxylate is present at a concentration from about 0.1% to about 1% and the C19-23 IOS is present at a concentration from about 0.1% to about 1%. In some embodiments, the C24-25PO-56EO carboxylate is present at a concentration from about 0.2% to about 0.9% and the C19-23 IOS is present at a concentration from about 0.2% to about 0.9%. In some embodiments, the C24-25PO-56EO carboxylate is present at a concentration from about 0.3% to about 0.8% and the C19-23 IOS is present at a concentration from about 0.3% to about 0.8%. In some embodiments, the C24-25PO-56EO carboxylate is present at a concentration from about 0.4% to about 0.7% and the C19-23 IOS is present at a concentration from about 0.4% to about 0.7%. In some embodiments, the C24-25PO-56EO carboxylate is present at a concentration from about 0.5% to about 0.6% and the C19-23 IOS is present at a concentration from about 0.5% to about 0.6%. In some embodiments, the C24-25PO-56EO carboxylate is present at a concentration of about 0.5% and the C19-23 IOS is present at a concentration of about 0.5%. In some embodiments, the C24-25PO-56EO carboxylate is present at a concentration of about 0.1, 0.2, 0.3, 0.4, 0.5, 0.6, 0.7, 0.8, 0.9 or 1.0% and the C19-23 IOS is present at a concentration of about 0.1, 0.2, 0.3, 0.4, 0.5, 0.6, 0.7, 0.8, 0.9 or 1.0%.

In some embodiments, the compound is C28-25PO-55EO carboxylate (i.e. a compound as described herein for example in formula (IVa) and (IVb), wherein $R_1$ is a saturated branched unsubstituted $C_{28}$ alkyl (produced from a Guerbet reaction), x is 25, y is 55, z is 1, and $R_3$ is H) and the co-surfactant is C11 ABS (as described in Example 3). In some embodiments, the C28-25PO-55EO carboxylate is present at a concentration from about 0.3% to about 1% and the C11 ABS is present at a concentration from about 0.1% to about 0.8%. In some embodiments, the C28-25PO-55EO carboxylate is present at a concentration from about 0.4% to about 0.9% and the C11 ABS is present at a concentration from about 0.2% to about 0.7%. In some embodiments, the C28-25PO-55EO carboxylate is present at a concentration from about 0.5% to about 0.8% and the C11 ABS is present at a concentration from about 0.3% to about 0.6%. In some embodiments, the C28-25PO-55EO carboxylate is present at a concentration from about 0.6% to about 0.7% and the C11 ABS is present at a concentration from about 0.4% to about 0.5%. In some embodiments, the C28-25PO-55EO carboxylate is present at a concentration of about 0.7% and the C11 ABS is present at a concentration of about 0.3%. In some embodiments, the C28-25PO-55EO carboxylate is present at a concentration of about 0.3, 0.4, 0.5, 0.6, 0.7, 0.8, 0.9 or 1.0% and the C11 ABS is present at a concentration of about 0.1, 0.2, 0.3, 0.4, 0.5, 0.6, 0.7, or 0.8%.

In some embodiments, the compound is C24-35PO-20EO carboxylate (i.e. a compound as described herein for example in formula (IVa) and (IVb), wherein $R_1$ is a saturated branched unsubstituted $C_{24}$ alkyl (produced from a Guerbet reaction), x is 35, y is 20, z is 1, and $R_3$ is H) and the co-surfactant is C20-24 IOS (as described in Example 4). In some embodiments, the C24-35PO-20EO carboxylate is present at a concentration from about 0.1% to about 0.6% and the C20-24 IOS is present at a concentration from about 0.1% to about 0.6%. In some embodiments, the C24-35PO-20EO carboxylate is present at a concentration from about 0.15% to about 0.55% and the C20-24 IOS is present at a concentration from about 0.15% to about 0.55%. In some embodiments, the C24-35PO-20EO carboxylate is present at a concentration from about 0.20% to about 0.50% and the C20-24 IOS is present at a concentration from about 0.20% to about 0.50%. In some embodiments, the C24-35PO-20EO carboxylate is present at a concentration from about 0.25% to about 0.45% and the C20-24 IOS is present at a concentration from about 0.25% to about 0.45%. In some embodiments, the C24-35PO-20EO carboxylate is present at a concentration from about 0.30% to about 0.40% and the C20-24 IOS is present at a concentration from about 0.30% to about 0.40%. In some embodiments, the C24-35PO-20EO carboxylate is present at a concentration of about 0.25% and the C20-24 IOS is present at a concentration of about 0.25%. In some embodiments, the C24-35PO-20EO carboxylate is present at a concentration of about 0.1, 0.15, 0.20, 0.25, 0.30, 0.35, 0.40, 0.45, 0.50, 0.55 or 0.60% and the C20-24 IOS is present at a concentration of about 0.1, 0.15, 0.20, 0.25, 0.30, 0.35, 0.40, 0.45, 0.50, 0.55 or 0.60%.

In some embodiments, the compound is C28-25PO-15EO carboxylate (i.e. a compound as described herein for example in formula (IVa) and (IVb), wherein $R_1$ is a saturated branched unsubstituted $C_{28}$ alkyl (produced from a Guerbet reaction), x is 25, y is 15, z is 1, and $R_3$ is H) and the co-surfactant is C15-18 IOS and C20-24 IOS (as described in Example 5). In some embodiments, the C28-25PO-15EO carboxylate is present at a concentration from about 0.1% to about 0.55%, the C15-18 IOS is present at a concentration from about 0.01% to about 0.09% and the C20-24 IOS is present at a concentration from about 0.01% to about 0.4%. In some embodiments, the C28-25PO-15EO carboxylate is present at a concentration from about 0.15% to about 0.50%, the C15-18 IOS is present at a concentration from about 0.02% to about 0.08% and the C20-24 IOS is present at a concentration from about 0.05% to about 0.35%. In some embodiments, the C28-25PO-15EO carboxylate is present at a concentration from about 0.20% to about 0.45%, the C15-18 IOS is present at a concentration from about 0.03% to about 0.07% and the C20-24 IOS is present at a concentration from about 0.1% to about 0.3%. In some embodiments, the C28-25PO-15EO carboxylate is present at a concentration from about 0.25% to about 0.40%, the C15-18 IOS is present at a concentration from about 0.04% to about 0.06% and the C20-24 IOS is present at a concentration from about 0.15% to about 0.25%. In some embodiments, the C28-25PO-15EO carboxylate is present at a concentration of about 0.35%, the C15-18 IOS is present at a concentration of about 0.05% and the C20-24 IOS is present at a concentration of about 0.20%. In some embodiments, the C28-25PO-15EO carboxylate is present at a concentration of about 0.1, 0.15, 0.20, 0.25, 0.30, 0.35, 0.40, 0.45, 0.50, or 0.55%, the C15-18 IOS is present at a concentration of about 0.01, 0.02, 0.03, 0.04, 0.05, 0.06, 0.07, 0.08, or 0.09%, and the C20-24 IOS is present at a concentration of about 0.01, 0.05, 0.1, 0.15, 0.20, 0.25, 0.30, 0.35, or 0.40%.

In some embodiments, the compound is C28-25PO-15EO carboxylate (i.e. a compound as described herein for example in formula (IVa) and (IVb), wherein $R_1$ is a saturated branched unsubstituted $C_{28}$ alkyl (produced from a Guerbet reaction), x is 25, y is 15, z is 1, and $R_3$ is H) and the co-surfactant is C15-18 IOS and C20-24 IOS (as described in Example 6). In some embodiments, the C28-25PO-15EO carboxylate is present at a concentration from about 0.15% to about 0.40%, the C15-18 IOS is present at a concentration from about 0.01% to about 0.3% and the C20-24 IOS is present at a concentration from about 0.01% to about 0.4%. In some embodiments, the C28-25PO-15EO carboxylate is present at a concentration from about 0.20% to about 0.35%, the C15-18 IOS is present at a concentration from about 0.05% to about 0.25% and the C20-24 IOS is present at a concentration from about 0.025% to about 0.30%. In some embodiments, the C28-25PO-15EO carboxylate is present at a concentration from about 0.25% to about 0.30%, the C15-18 IOS is present at a concentration from about 0.1% to about 0.2% and the C20-24 IOS is present at a concentration from about 0.05% to about 0.2%. In some embodiments, the C28-25PO-15EO carboxylate is present at a concentration of about 0.25%, the C15-18 IOS is present at a concentration of about 0.15% and the C20-24 IOS is present at a concentration of about 0.1%. In some embodiments, the C28-25PO-15EO carboxylate is present at a concentration of about 0.15, 0.20, 0.25, 0.30, 0.35, or 0.40%, the C15-18 IOS is present at a concentration of about 0.01, 0.05, 0.1, 0.15, 0.20, 0.25, or 30%, and the C20-24 IOS is present at a concentration of about 0.01, 0.025, 0.05, 0.1, 0.20, 0.30, or 0.40%.

In some embodiments, the compound is C28-25PO-15EO carboxylate (i.e. a compound as described herein for example in formula (IVa) and (IVb), wherein $R_1$ is a saturated branched unsubstituted $C_{28}$ alkyl (produced from a Guerbet reaction), x is 25, y is 15, z is 1, and $R_3$ is H) and the co-surfactant is C15-18 IOS and C20-24 IOS (as described in Example 7). In some embodiments, the C28-25PO-15EO carboxylate is present at a concentration from about 0.05% to about 0.45%, the C15-18 IOS is present at a concentration from about 0.002% to about 0.25% and the C20-24 IOS is present at a concentration from about 0.01% to about 0.4%. In some embodiments, the C28-25PO-15EO carboxylate is present at a concentration from about 0.10% to about 0.40%, the C15-18 IOS is present at a concentration from about 0.005% to about 0.20% and the C20-24 IOS is present at a concentration from about 0.05% to about 0.35%. In some embodiments, the C28-25PO-15EO carboxylate is present at a concentration from about 0.15% to about 0.35%, the C15-18 IOS is present at a concentration from about 0.01% to about 0.15% and the C20-24 IOS is present at a concentration from about 0.1% to about 0.3%. In some embodiments, the C28-25PO-15EO carboxylate is present at a concentration from about 0.20% to about 0.3%, the C15-18 IOS is present at a concentration from about 0.02% to about 0.1% and the C20-24 IOS is present at a concentration from about 0.15% to about 0.25%. In some embodiments, the C28-25PO-15EO carboxylate is present at a concentration of about 0.25%, the C15-18 IOS is present at a concentration of about 0.05% and the C20-24 IOS is present at a concentration of about 0.2%. In some embodiments, the C28-25PO-15EO carboxylate is present at a concentration of about 0.05, 0.10, 0.15, 0.25, 0.30, 0.35, 0.40 or 45%, the C15-18 IOS is present at a concentration of about 0.002, 0.005, 0.01, 0.02, 0.05, 0.1, 0.15, 0.20 or 25%, and the C20-24 IOS is present at a concentration of about 0.01, 0.05, 0.1, 0.15, 0.20, 0.25, 0.30, 0.35 or 0.40%.

In some embodiments, the compound is C28-35PO-10EO carboxylate (i.e. a compound as described herein for example in formula (IVa) and (IVb), wherein $R_1$ is a saturated branched unsubstituted $C_{28}$ alkyl (produced from a Guerbet reaction), x is 35, y is 10, z is 1, and $R_3$ is H) and the co-surfactant is C12 ABS and C13-13PO-sulfate (as described in Example 8). In some embodiments, the C28-35PO-10EO carboxylate is present at a concentration from about 0.05% to about 0.45%, the C12 ABS is present at a concentration from about 0.05% to about 0.45% and the C13-13PO-sulfate is present at a concentration from about 0.05% to about 0.45%. In some embodiments, the C28-35PO-10EO carboxylate is present at a concentration from about 0.10% to about 0.40%, the C12 ABS is present at a concentration from about 0.10% to about 0.40% and the C13-13PO-sulfate is present at a concentration from about 0.10% to about 0.40%. In some embodiments, the C28-35PO-10EO carboxylate is present at a concentration from about 0.15% to about 0.35%, the C12 ABS is present at a concentration from about 0.15% to about 0.35% and the C13-13PO-sulfate is present at a concentration from about 0.15% to about 0.35%. In some embodiments, the C28-35PO-10EO carboxylate is present at a concentration from about 0.20% to about 0.3%, the C12 ABS is present at a concentration from about 0.20% to about 0.3% and the C13-13PO-sulfate is present at a concentration from about 0.20% to about 0.3%. In some embodiments, the C28-35PO-10EO carboxylate is present at a concentration of about 0.25%, the C12 ABS is present at a concentration of about 0.25% and the C13-13PO-sulfate is present at a concentration of about 0.25%. In some embodiments, the C28-35PO-10EO carboxylate is present at a concentration of about 0.05, 0.10, 0.15, 0.25, 0.30, 0.35, 0.40 or 45%, the C12 ABS is present at a concentration of about 0.05, 0.10, 0.15, 0.25, 0.30, 0.35, 0.40 or 45%, and the C13-13PO-sulfate is present at a concentration of about 0.05, 0.10, 0.15, 0.25, 0.30, 0.35, 0.40 or 45%.

In some embodiments, the compound is C28-35PO-10EO carboxylate (i.e. a compound as described herein for example in formula (IVa) and (IVb), wherein $R_1$ is a saturated branched unsubstituted $C_{28}$ alkyl (produced from a Guerbet reaction), x is 35, y is 10, z is 1, and $R_3$ is H) and the co-surfactant is C20-24 IOS and C13-13PO-sulfate (as described in Example 9). In some embodiments, the C28-35PO-10EO carboxylate is present at a concentration from about 0.25% to about 0.65%, the C20-24 IOS is present at a concentration from about 0.20% to about 0.60% and the C13-13PO-sulfate is present at a concentration from about 0.01% to about 0.35%. In some embodiments, the C28-35PO-10EO carboxylate is present at a concentration from about 0.30% to about 0.60%, the C20-24 IOS is present at a concentration from about 0.25% to about 0.55% and the C13-13PO-sulfate is present at a concentration from about 0.02% to about 0.30%. In some embodiments, the C28-35PO-10EO carboxylate is present at a concentration from about 0.35% to about 0.55%, the C20-24 IOS is present at a concentration from about 0.30% to about 0.50% and the C13-13PO-sulfate is present at a concentration from about 0.05% to about 0.25%. In some embodiments, the C28-35PO-10EO carboxylate is present at a concentration from about 0.40% to about 0.50%, the C20-24 IOS is present at a concentration from about 0.35% to about 0.45% and the C13-13PO-sulfate is present at a concentration from about 0.1% to about 0.2%. In some embodiments, the C28-35PO-10EO carboxylate is present at a concentration of about 0.45%, the C20-24 IOS is present at a concentration of about 0.4% and the C13-13PO-sulfate is present at a concentration of about 0.15%. In some embodiments, the C28-35PO-10EO carboxylate is present at a concentration of about 0.25, 0.30, 0.35, 0.40, 0.45, 0.50, 0.55, 0.60 or 65%, the C20-24 IOS is present at a concentration of about 0.20, 0.25, 0.30, 0.35, 0.40, 0.45, 0.50, 0.55, or 60%, and the C13-13PO-sulfate is present at a concentration of about 0.01, 0.02, 0.05, 0.1, 0.15, 0.20, 0.25, or 35%.

In some embodiments, the compound is C24-25PO-18EO carboxylate (i.e. a compound as described herein for example in formula (IVa) and (IVb), wherein $R_1$ is a saturated branched unsubstituted $C_{24}$ alkyl (produced from a Guerbet reaction), x is 25, y is 18, z is 1, and $R_3$ is H. having the formula) and the co-surfactant is C12 ABS and C13-13PO-sulfate (as described in Example 10). In some embodiments, the C24-25PO-18EO carboxylate is present at a concentration from about 0.05% to about 0.45%, the C12 ABS is present at a concentration from about 0.05% to about 0.45% and the C13-13PO-sulfate is present at a concentration from about 0.05% to about 0.45%. In some embodiments, the C24-25PO-18EO carboxylate is present at a concentration from about 0.10% to about 0.40%, the C12 ABS is present at a concentration from about 0.10% to about 0.40% and the C13-13PO-sulfate is present at a concentration from about 0.10% to about 0.40%. In some embodiments, the C24-25PO-18EO carboxylate is present at a concentration from about 0.15% to about 0.35%, the C12 ABS is present at a concentration from about 0.15% to about 0.35% and the C13-13PO-sulfate is present at a concentration from about 0.15% to about 0.35%. In some embodiments, the C24-25PO-18EO carboxylate is present at a concentration from about 0.20% to about 0.3%, the C12 ABS is present at a concentration from about 0.20% to about 0.3% and the C13-13PO-sulfate is present at a concentration from about 0.20% to about 0.3%. In some embodiments, the C24-25PO-18EO carboxylate is present at a concentration of about 0.25%, the C12 ABS is present at a concentration of about 0.25% and the C13-13PO-sulfate is present at a concentration of about 0.25%. In some embodiments, the C24-25PO-18EO carboxylate is present at a concentration of about 0.05, 0.10, 0.15, 0.25, 0.30, 0.35, 0.40 or 45%, the C12 ABS is present at a concentration of about 0.05, 0.10, 0.15, 0.25, 0.30, 0.35, 0.40 or 45%, and the C13-13PO-sulfate is present at a concentration of about 0.05, 0.10, 0.15, 0.25, 0.30, 0.35, 0.40 or 45%.

In some embodiments, the compound is C28-25PO-15EO carboxylate (i.e. a compound as described herein for example in formula (IVa) and (IVb), wherein $R_1$ is a saturated branched unsubstituted $C_{28}$ alkyl (produced from a Guerbet reaction), x is 25, y is 15, z is 1, and $R_3$ is H) and the co-surfactant is C15-18 IOS and C20-24 IOS (as described in Example 11). In some embodiments, the C28-25PO-15EO carboxylate is present at a concentration from about 0.05% to about 0.45%, the C15-18 IOS is present at a concentration from about 0.01% to about 0.35% and the C20-24 IOS is present at a concentration from about 0.01% to about 0.5%. In some embodiments, the C28-25PO-15EO carboxylate is present at a concentration from about 0.1% to about 0.40%, the C15-18 IOS is present at a concentration from about 0.02% to about 0.3% and the C20-24 IOS is present at a concentration from about 0.015% to about 0.40%. In some embodiments, the C28-25PO-15EO carboxylate is present at a concentration from about 0.15% to about 0.35%, the C15-18 IOS is present at a concentration from about 0.05% to about 0.25% and the C20-24 IOS is present at a concentration from about 0.025% to about 0.3%. In some embodiments, the C28-25PO-15EO carboxylate is present at a concentration from about 0.20% to about 0.30%, the C15-18 IOS is present at a concentration from about 0.1% to about 0.2% and the C20-24 IOS is present at a concentration from about 0.05% to about 0.2%. In some embodiments, the C28-25PO-15EO carboxylate is present at a concentration of about 0.25%, the C15-18 IOS is present at a concentration of about 0.15% and the C20-24 IOS is present at a concentration of about 0.10%. In some embodiments, the C28-25PO-15EO carboxylate is present at a concentration of about 0.05, 0.1, 0.15, 0.25, 0.30, 0.35, 0.40, or 0.45%, the C15-18 IOS is present at a concentration of about 0.01, 0.02, 0.05, 0.1, 0.15, 0.2, 0.25, 0.30, or 0.35%, and the C20-24 IOS is present at a concentration of about 0.01, 0.015, 0.025, 0.05, 0.1, 0.2, 0.30, 0.4, or 0.5%.

In some embodiments, the aqueous composition includes a surfactant, a co-surfactant and a co-solvent. In some embodiments, the co-solvent is TEGBE (triethylene glycol mono butyl ether). In some embodiments, TEGBE is present at a concentration from about 0.01% to about 2%. In some embodiments, TEGBE is present at a concentration from about 0.05% to about 1.5%. In some embodiments, TEGBE is present at a concentration from about 0.2% to about 1.25%. In some embodiments, TEGBE is present at a concentration from about 0.25% to about 1%. In some embodiments, TEGBE is present at a concentration from about 0.5% to about 0.75%. In some embodiments, TEGBE is present at a concentration of about 0.25%. In other embodiments, TEGBE is present at a concentration of about 1%.

In some embodiments, the aqueous composition includes a viscosity enhancing water-soluble polymer. In some embodiments, the water-soluble polymer may be a biopolymer such as xanthan gum or scleroglucan, a synthetic polymer such as polyacryamide, hydrolyzed polyarcrylamide or co-polymers of acrylamide and acrylic acid, 2-acrylamido 2-methyl propane sulfonate or N-vinyl pyrrolidone, a synthetic polymer such as polyethylene oxide, or any other high molecular weight polymer soluble in water or brine. In some embodiments, the polymer is polyacrylamide (PAM), partially hydrolyzed polyacrylamides (HPAM), and copolymers of 2-acrylamido-2-methylpropane sulfonic acid or sodium salt or mixtures thereof, and polyacrylamide (PAM) commonly referred to as AMPS copolymer and mixtures of the copolymers thereof. Molecular weights of the polymers may range from about 10,000 daltons to about 20,000,000 daltons. In some embodiments, the viscosity enhancing water-soluble polymer is used in the range of about 500 to about 5000 ppm concentration, such as from about 1000 to 2000 ppm (e.g. in order to match or exceed the reservoir oil viscosity under the reservoir conditions of temperature and pressure).

In other embodiments, the aqueous composition includes a co-solvent. In some embodiments, the co-solvent is an alcohol, alcohol ethoxylate, glycol ether, glycols, or glycerol.

In some embodiments, the aqueous composition includes a gas. For instance, the gas may be combined with the aqueous composition to reduce its mobility by decreasing the liquid flow in the pores of the solid material (e.g. rock). In some embodiments, the gas may be supercritical carbon dioxide, nitrogen, natural gas or mixtures of these and other gases.

The aqueous composition may include more than 10 ppm of divalent cations combined. In some embodiments, the aqueous composition includes more than 10 ppm of $Ca^{2+}$ and $Mg^{2+}$ combined. The aqueous composition may include more than 100 ppm of divalent cations combined. In some embodiments, the aqueous composition includes more than 1000 ppm of $Ca^{2+}$ and $Mg^{2+}$ combined. In some embodiments, the aqueous composition includes more than 3000 ppm of $Ca^{2+}$ and $Mg^{2+}$ combined.

In some embodiments, the aqueous composition includes more than 10 ppm of cations such as divalent cations. In other embodiments, the aqueous composition includes more than 100 ppm of cations such as divalent cations. In some embodiments, the aqueous composition includes more than 1000 ppm of cations such as divalent cations. In some embodiments, the divalent cations are $Ba^{2+}$, $Fe^{2+}$, $Ca^{2+}$ and $Mg^{2+}$.

In some embodiments, the aqueous composition has a pH of less than about 8.0. In other embodiments, the aqueous composition has a pH of less than about 7.5. In other embodiments, the aqueous composition has a pH of less than about 7.0. In other embodiments, the aqueous composition has a pH of less than about 9.0. In other embodiments, the aqueous composition has a pH of less than about 10.0. In other embodiments, the aqueous composition has a pH of less than about 11.0. In other embodiments, the aqueous composition has a pH of less than about 12.0. Thus, in some embodiments, the aqueous composition contains no, or very low amounts (e.g. trace amounts) of alkali.

In some embodiments, the aqueous composition has a salinity of at least 40,000 ppm. In other embodiments, the aqueous composition has a salinity of at least 50,000 ppm. In other embodiments, the aqueous composition has a salinity of at least 200,000 ppm. The total range of salinity (total dissolved solids in the brine) is 100 ppm to saturated brine (about 260,000 ppm). The aqueous composition may include seawater, brine or fresh water from an aquifer, river or lake. The aqueous combination may further include salt to increase the salinity. In some embodiments, the salt is NaCl, KCl, $CaCl_2$, $MgCl_2$, $CaSO_4$ or $Na_2CO_3$.

In some embodiments, the temperature of the aqueous composition is at least 100° C. In other embodiments, the temperature of the aqueous composition is at least 130° C. In some embodiments, the aqueous composition has a viscosity of between 20 mPa·s and 100 mPa·s. The viscosity of the aqueous solution may be increased from 0.3 mPa·s to 1, 2, 10, 20, 100 or even 1000 mPa·s by including a water-soluble polymer. As mentioned above, the apparent viscosity of the aqueous composition may be increased with a gas (e.g. a foam forming gas) as an alternative to the water-soluble polymer.

In another aspect, an emulsion composition is provided including an unrefined petroleum phase and an aqueous phase. The aqueous phase includes a compound provided herein (e.g. a compound of formula (Ia), (Ib), (IIa), (IIb), (IIIa), (IIIb), (IVa), ((IVb)) or (V)). In some embodiments, the aqueous phase includes the components set forth in the aqueous composition provided above. For example, in some embodiments, the aqueous phase further includes a co-surfactant (e.g. wherein the compound and the co-surfactant are present in synergistic surface active amount, a surfactant stabilizing amount, and/or a synergistic solubilizing amount). In some embodiments, the aqueous phase includes a co-surfactant and a co-solvent. The aqueous phase may include a combination of one or more co-surfactants and one or more co-solvents.

In some embodiments, the temperature of the emulsion composition is at least 100° C. In other embodiments, the temperature of the emulsion composition is at least 130° C. In some embodiments, the emulsion composition is present within a crude oil reservoir.

In some embodiments, the viscosity of the emulsion composition is less than the viscosity in the absence of the co-surfactant. In some embodiments, the viscosity of the emulsion composition is less than 3 times the viscosity of an unrefined petroleum (e.g. the unrefined petroleum which makes up the unrefined petroleum phase of the emulsion composition). In other embodiments, the viscosity of the emulsion composition is less than 30 mPa s. In other embodiments, the viscosity of the emulsion composition is less than 200 mPa s. In some embodiments, the emulsion composition is a microemulsion. A "microemulsion" as referred to herein is a thermodynamically stable mixture of oil, water and surfactants that may also include additional components such as co-solvents, electrolytes, alkali and polymers. In contrast, a "macroemulsion" as referred to herein is a thermodynamically unstable mixture of oil and water that may also include additional components.

In other embodiments, the oil and water solubilization ratios are insensitive to the combined concentration of divalent metal cations (e.g. $Ca^{+2}$ and $Mg^{+2}$) within the aqueous phase. In other embodiments, the oil and water solubilization ratios are insensitive to the salinity of the water or to all of the specific electrolytes contained in the water. The term "insensitive" used in the context of this paragraph means that the solubilization ratio tends not to change (e.g. tends to remain constant) as the concentration of divalent metal cations and/or salinity of water changes. In some embodiments, the change in the solubilization ratios are less than 5%, 10%, 20%, 30%, 40%, or 50% over a divalent metal cation concentration range of 10 ppm, 100 ppm, 1000 ppm or 10,000 ppm. In another embodiment, the change in the solubilization ratios are less than 5%, 10%, 20%, 30%, 40%, or 50% over a salinity concentration range of 10 ppm, 100 ppm, 1000 ppm or 10,000 ppm.

In another aspect, a method of displacing a hydrocarbon material in contact with a solid material is provided. The method includes, contacting a hydrocarbon material with a compound provided herein (e.g. a compound of formula (Ia), (Ib), (IIa), (IIb), (IIIa), (IIIb), (IVa), ((IVb)) or (V)), wherein the hydrocarbon material is in contact with the solid material. The hydrocarbon material is allowed to separate from the solid material thereby displacing the hydrocarbon material in contact with the solid material. In some embodiments, the solid material is contacted with the compound. A "hydrocarbon material," as provided herein, is a hydrophobic material containing alkyl chains. The compound may be present in an aqueous composition or an emulsion composition as described above.

In other embodiments, the hydrocarbon material is unrefined petroleum (e.g. in a petroleum reservoir). The solid material may be a natural solid material (i.e. a solid found in nature such as rock). The natural solid material may be found in a petroleum reservoir. In some embodiments, the method is an enhanced oil recovery method. Enhanced oil recovery methods are well known in the art. A general treatise on enhanced oil recovery methods is *Basic Concepts in Enhanced Oil Recovery Processes* edited by M. Baviere (published for SCI by Elsevier Applied Science, London and New York, 1991). For example, in an enhanced oil recovery method, the displacing of the unrefined petroleum in contact with the solid material is accomplished by contacting the unrefined with a compound provided herein (e.g. a compound of formula (Ia), (Ib), (IIa), (IIb), (IIIa), (IIIb), (IVa), ((IVb)) or (V)), wherein the unrefined petroleum is in contact with the solid material. The unrefined petroleum may be in an oil reservoir. The compound provided herein (e.g. a compound of formula (Ia), (Ib), (IIa), (IIb), (IIIa), (IIIb), (IVa), ((IVb)) or (V)) is pumped into the reservoir in accordance with known enhanced oil recovery parameters. The compound may be pumped into the reservoir as part of the aqueous compositions provided herein and, upon contacting the unrefined petroleum, form an emulsion composition provided herein.

In some embodiments, the natural solid material is rock or regolith. The natural solid material may be a geological formation such as clastics or carbonates. The natural solid material may be either consolidated or unconsolidated material or mixtures thereof. The hydrocarbon material may be trapped or confined by "bedrock" above or below the natural solid material. The hydrocarbon material may be found in fractured bedrock or porous natural solid material. In other embodiments, the regolith is soil. In some embodiments, the compound forms part of an aqueous composition comprising a co-surfactant and the hydrocarbon material is an unrefined petroleum material.

In some embodiments, an emulsion forms after the contacting. The emulsion thus formed may be the emulsion composition as described above. In some embodiments, the method includes allowing an unrefined petroleum acid within the unrefined petroleum material to enter into the emulsion (e.g. emulsion composition), thereby converting the unrefined petroleum acid into a surfactant. In other words, where the unrefined petroleum acid converts into a surfactant it is mobilized and therefore separates from the solid material.

In another aspect, a method of converting (e.g. mobilizing) an unrefined petroleum acid by the surfactant is provided. The method includes contacting a petroleum material with an aqueous composition thereby forming an emulsion in contact with the petroleum material, wherein the aqueous composition includes a compound provided herein (e.g. a compound of formula (Ia), (Ib), (IIa), (IIb), (IIIa), (IIIb), (IVa), ((IVb)) or (V)). The aqueous composition may further include a co-surfactant. Thus, in some embodiments, the aqueous composition is the aqueous composition described above. And in some embodiments, the emulsion is the emulsion composition described above. An unrefined petroleum acid within the unrefined petroleum material is allowed to enter the emulsion, thereby converting (e.g. mobilizing) the unrefined petroleum acid into a surfactant. In some embodiments, the reactive petroleum material is in a petroleum reservoir. In some embodiments, as described above and as is generally known in the art, the unrefined petroleum acid is a naphthenic acid. In some embodiments, as described above and as is generally known in the art, the unrefined petroleum acid is a mixture of naphthenic acid.

In some embodiments, a method of designing a surfactant for use in enhanced oil recovery is provided. The method includes, determining a temperature of a candidate oil reservoir (i.e. a reservoir that is a candidate for use with a compound of formula Ia, Ib, IIa, IIb, IIIa, IIIb, IVa, IVb and V, aqueous compositions having the compound or emulsions compositions having the compound), an optimum salinity of an aqueous composition or emulsions composition including a compound of formula Ia, Ib, IIa, IIb, IIIa, IIIb, IVa, IVb or V, and an oil EACN of the oil within said candidate oil reservoir. The method also includes, using the equation, $N_c = a_1 Npo + a_2 N_{EO} + a_3(T-T_{ref}) + a_4 \log S^* + a_5 E_o$, determining the mole average number of carbons in $R^1$ of the compound of formula Ia, Ib, IIa, IIb, IIIa, IIIb, IVa, IVb or V (wherein $R^1$ is a saturated unsubstituted branched alkyl), determining the mole average of —$CH_2$—$CH(CH_3)$— moieties in the compound described herein (e.g. formula Ia, Ib, IIa, IIb, IIIa, IIIb, IVa, IVb and V), and/or determining the mole average of —$CH_2$—$CH_2$—O moieties in the compound described herein (e.g. Formula Ia, Ib, IIa, IIb, IIIa, IIIb, IVa, IVb and V). Details of the equation set forth above is provided in Equation 8 and in the Examples section. In some embodiments, the method further includes determining the mole average of —$CH_2$—$CH(CH_3)$—O moieties in the compound described herein (e.g. formula Ia, Ib, IIa, IIb, IIIa, IIIb, IVa, IVb and V), and/or determining the mole average of —$CH_2$—$CH_2$— moieties in the compound described herein (e.g. formula Ia, Ib, IIa, IIb, IIIa, IIIb, IVa, IVb and V) and then, using the equation $N_c = a_1 Npo + a_2 N_{EO} + a_3(T-T_{ref}) + a_4 \log S^* + a_5 E_o$, determining the mole average number of carbons in $R^1$ of the compound of formula Ia, Ib, IIa, IIb, IIIa, IIIb, IVa, IVb or V (wherein $R^1$ is an saturated unsubstituted branched alkyl).

A person having ordinary skill in the art will immediately recognize that embodiments described within a particular context herein are applicable to any other aspect, context or embodiment described herein as appropriate. For example, the component of the compounds described herein are equally applicable to the aqueous compositions and emulsion compositions provided. All documents cited herein are incorporated by reference for all purposes. A person having ordinary skill in the art would also immediately recognize that aspects of elements and embodiments generally known in the art not described herein (e.g. the details of enhanced oil recovery) may be combined or incorporated into the present disclosure.

EXAMPLES

The following examples are meant to provide detailed embodiments only and are not meant to limit the scope of the disclosure provided herein in any way.
Examples of Surfactant/Co-Surfactant Combinations FIG. 16 discloses examples of surfactant formulations useful for the recovery of active and non-active oils. Depending, inter alia, on the conditions in the reservoir (e.g. temperature) or the nature of the oil (e.g. viscosity) the aqueous composition may include different combinations of surfactant and co-surfactant at various concentrations.

1) 0.5% C28-25PO-25EO carboxylate, 0.5% C15-18 IOS

The formulation includes 0.5% w/w C28-25PO-25EO carboxylate as a surfactant and 0.5% w/w C15-18 IOS as a co-surfactant. C28-25PO-25EO carboxylate refers to a compound as described in formula (IVa) and (IVb), wherein $R_1$ is a saturated branched unsubstituted $C_{28}$ alkyl generated by the Guerbet reaction, x is 25, y is 25, z is 1, and $R_3$ is H. The Guerbet reaction is well know in the art to dimerize linear alcohols through base catalysis at high temperatures (i.e. 230° C.), thereby producing large hydrophobes with near midpoint branching. Therefore, $R_1$ in the C28-25PO-25EO carboxylate is a branched hydrophobe with 28 carbons having the formula:

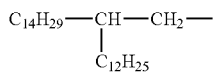

And the C28-25PO-25EO carboxylate compound has the formula:

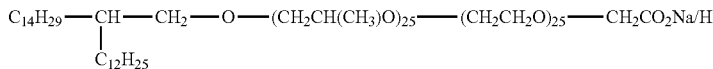

C15-18 IOS is used as a co-surfactant in this formulation. IOS refers to internal olefin sulfonate and C15-18 IOS refers to a blend of C15, C16, C17, and C18 alkene sulfonates and C15, C16, C17, and C18 hydroxyalkane sulfonate, which is commercially available from the Stepan Company (Northfield, Ill., US).

2) 0.5% C24-25PO-56EO carboxylate, 0.5% C19-23 IOS

The formulation includes 0.5% w/w C24-25PO-56EO carboxylate as a surfactant and 0.5% w/w C19-23 IOS as a co-surfactant. C24-25PO-56EO carboxylate refers to a compound as described in formula (IVa) and (IVb), wherein $R_1$ is a saturated branched unsubstituted $C_{24}$ alkyl generated by the Guerbet reaction, x is 25, y is 56, z is 1, and $R_3$ is H. having the formula:

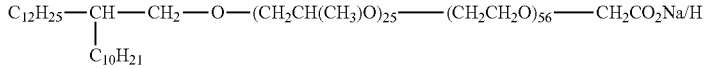

C19-23 IOS is used as a co-surfactant in this formulation. IOS refers to internal olefin sulfonate and C19-23 IOS refers to a blend of C19, C20, C21, C22, and C23 alkene sulfonates and C19, C20, C21, C22 and C23 hydroxyalkane sulfonate, which is commercially available from the Shell Company.

3) 0.7% C28-25PO-55EO carboxylate, 0.3% C11 ABS

The formulation includes 0.7% w/w C28-25PO-55EO carboxylate as a surfactant and 0.3% w/w C11 ABS as a co-surfactant. C28-25PO-55EO carboxylate refers to a compound as described in formula (IVa) and (IVb), wherein $R_1$ is a saturated branched unsubstituted $C_{28}$ alkyl generated by the Guerbet reaction, x is 25, y is 55, z is 1, and $R_3$ is H. having the formula:

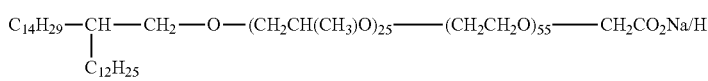

The alkyl benzene sulfonate (ABS) contains an aromatic ring sulfonated at the para position and attached to a linear alkyl chain at any position except the terminal carbons. Thus, the ABS compounds are a blend of compounds having the designated number of carbons in a linear alkyl. The C12 ABS and the C11 ABS compounds may be represented by the structures below, wherein the aromatic ring sulfonated at the para position is attached to a linear alkyl chain at any position except the terminal carbons.

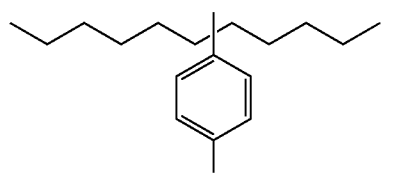

C11 ABS

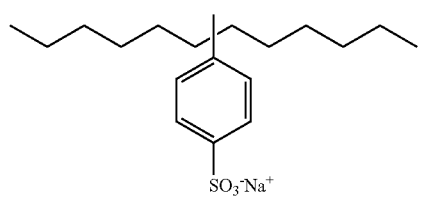

C12 ABS 4) 0.25% C24-35PO-20EO carboxylate, 0.25% w/w C20-24 IOS

The formulation includes 0.25% w/w C24-35PO-20EO carboxylate as a surfactant and 0.25% w/w C20-24 IOS as a co-surfactant. C24-35PO-20EO carboxylate refers to a compound as described in formula (IVa) and (IVb), wherein $R_1$ is a saturated branched unsubstituted $C_{24}$ alkyl generated by the Guerbet reaction, x is 35, y is 20, z is 1, and $R_3$ is H. having the formula:

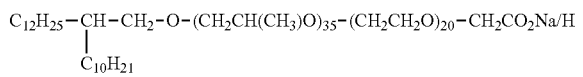

C20-24 IOS is used as a co-surfactant in this formulation. IOS refers to internal olefin sulfonate and C20-24 IOS refers to a blend of C20-24 alkene sulfonates and C20-24 hydroxyalkane sulfonate, which is commercially available from the Stepan Company (Northfield, Ill., US).

5) 0.35% C28-25PO-15EO carboxylate, 0.05% C15-18 IOS, 0.2% C20-24 IOS

The formulation includes 0.35% w/w C28-25PO-15EO carboxylate as a surfactant and 0.05% w/w C15-18 IOS, 0.2% C20-24 IOS as a co-surfactant. C28-25PO-15EO carboxylate refers to a compound as described in formula (IVa) and (IVb), wherein $R_1$ is a saturated branched unsubstituted $C_{28}$ alkyl generated by the Guerbet reaction, x is 25, y is 15, z is 1, and $R_3$ is H. having the formula:

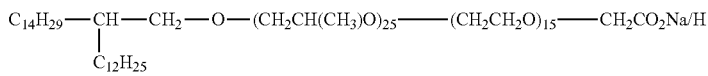

C15-18 IOS and C20-24 IOS are used as a co-surfactant in this formulation. IOS refers to internal olefin sulfonate and C15-18 IOS and C20-24 IOS refer to a blend of C15-18 alkene sulfonates with C15-18 hydroxyalkane sulfonate and a blend of C20-24 alkene sulfonates with C20-24 hydroxyalkane sulfonate, respectively. Both of these blends are commercially available from the Stepan Company (Northfield, Ill., US).

6) 0.25% C28-25PO-15EO carboxylate, 0.15% C15-18 IOS, 0.1% C20-24 IOS

The formulation includes 0.25% w/w C28-25PO-15EO carboxylate as a surfactant and 0.15% w/w C15-18 IOS, 0.1% C20-24 IOS as a co-surfactant. The formula for the surfactant compound and definition for C15-18 IOS and C20-24 IOS are provided above.

7) 0.25% C28-25PO-15EO carboxylate, 0.2% C20-24 IOS, 0.05% C15-18 IOS

The formulation includes 0.25% w/w C28-25PO-15EO carboxylate as a surfactant and 0.05% w/w C15-18 IOS, 0.2% C20-24 IOS as a co-surfactant. The formula for the surfactant compound and definition for C15-18 IOS and C20-24 IOS are provided above.

8) 0.25% C28-35PO-10EO carboxylate, 0.25% C12 ABS, 0.25% C13-13PO-sulfate, 1% TEGBE The formulation includes 0.25% w/w C28-35PO-10EO carboxylate as a surfactant and 0.25% w/w C12 ABS, 0.25% C13-13PO-sulfate as a co-surfactant and 1% TEGBE as co-solvent. C28-35PO-10EO carboxylate refers to a compound as described in formula (IVa) and (IVb), wherein $R_1$ is a saturated branched unsubstituted $C_{28}$ alkyl generated by the Guerbet reaction, x is 35, y is 10, z is 1, and $R_3$ is H. having the formula:

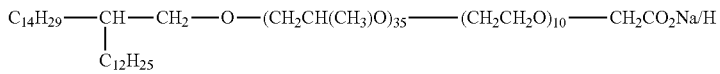

C12 ABS, C13-13PO-sulfate are used as a co-surfactant and TEGBE as co-solvent in this formulation. C12 ABS is described above and C13-13PO is an alkoxy sulfate having the formula: $C_{13}H_{27}$—O—$(CH_2CH(CH_3)O)_{13}$—$SO_3^-$. TEGBE stands for triethylene glycol mono butyl ether and is a commercially available co-solvent (e.g. Aldrich Chemicals).

9) 0.45% C28-35PO-10EO carboxylate, 0.4% C20-24 IOS, 0.15% C13-13PO-sulfate, 1% TEGBE The formulation includes 0.45% w/w C28-35PO-10EO carboxylate as a surfactant and 0.4% w/w C20-24 IOS, 0.15% w/w C13-13PO sulfate as a co-surfactant and 1% w/w TEGBE as co-solvent. The formula for C28-35PO-10EO carboxylate and C13-13PO sulfate are provided above.

10) 0.25% C24-25PO-18EO carboxylate, 0.25% C12 ABS, 0.25% C13-13PO Sulfate, 0.25% TEGBE The formulation includes 0.25% w/w C24-25PO-18EO carboxylate as a surfactant, 0.25% w/w C12 ABS and 0.25% w/w C13-13PO sulfate as a co-surfactant and 0.25% w/w TEGBE as a co-solvent. C24-25PO-18EO carboxylate refers to a compound as described in formula (IVa) and (IVb), wherein $R_1$ is a saturated branched unsubstituted $C_{24}$ alkyl generated by the Guerbet reaction, x is 25, y is 18, z is 1, and $R_3$ is H. having the formula:

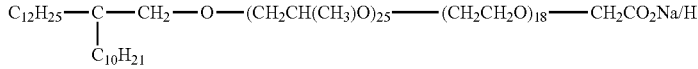

Formulas for C12ABS and C13-13PO Sulfate are provided above.

11) 0.25% C28-25PO-15EO carboxylate, 0.15% C15-18 IOS, 0.10% C20-24 IOS

The formulation includes 0.25% w/w C28-25PO-15EO carboxylate as a surfactant and 0.15% w/w C15-18 IOS and 0.10% w/w C20-24 IOS as a co-surfactant. The formula for C28-25PO-15EO carboxylate and definitions for C15-18 IOS and C20-24 IOS are provided above.

Hydrophobe Carbon Number Equation

Figure 10:
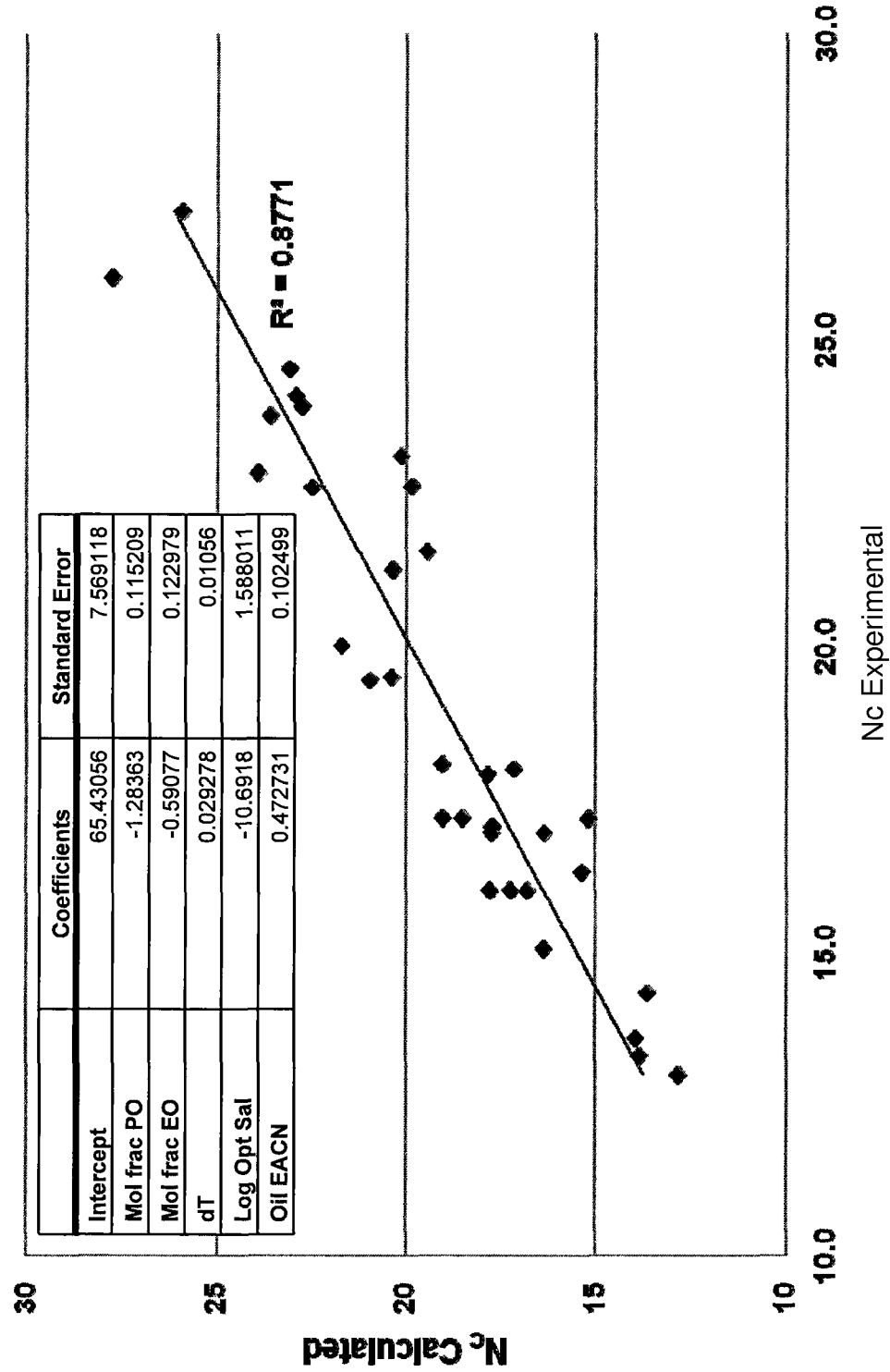
FIG. 10. Comparison of experimental and calculated optimum value of the mole average number of carbons in surfactant hydrophobe.
Figure 11:
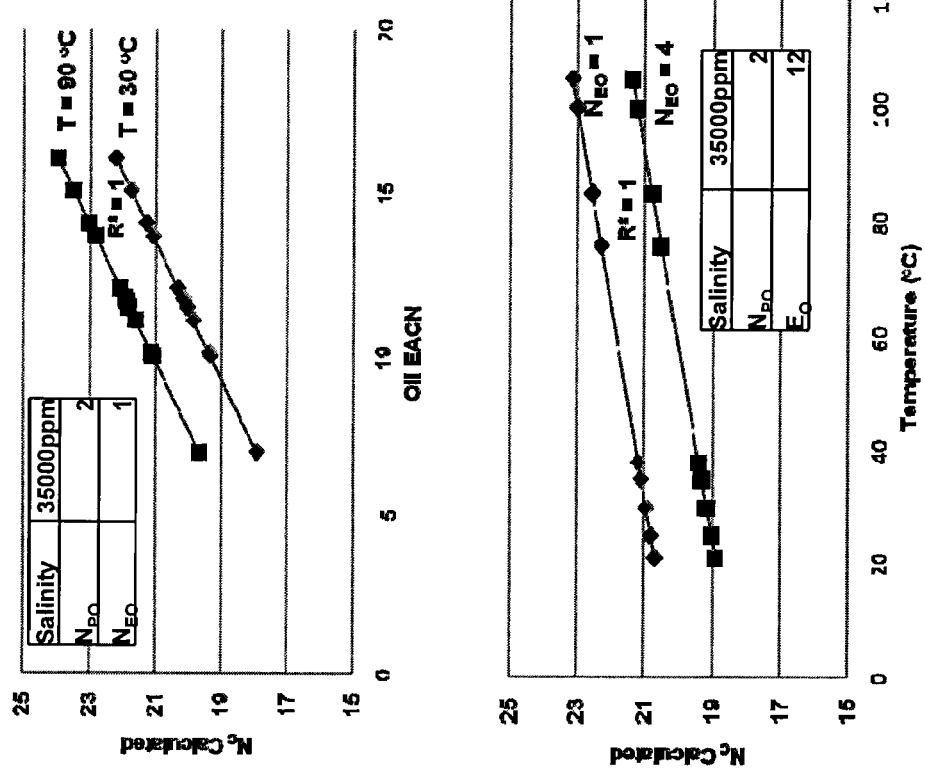
FIG. 11. Regression data showing the optimum size of the hydrocarbon chain length increases with both oil EACN and temperature.
Figure 12:
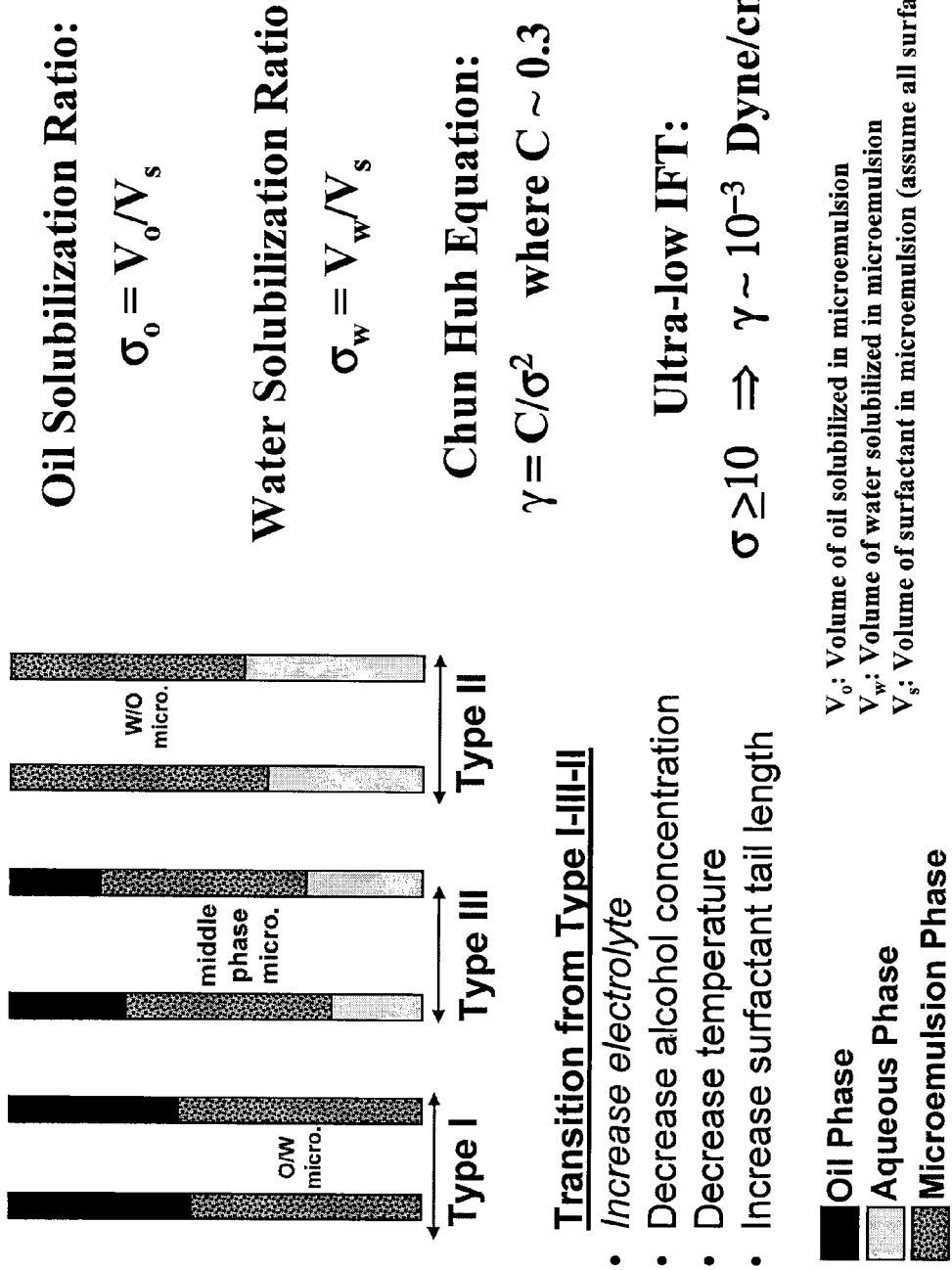
FIG. 12. Schematic representation of surfactant phase behavior and IFT correlation.
Figure 13:
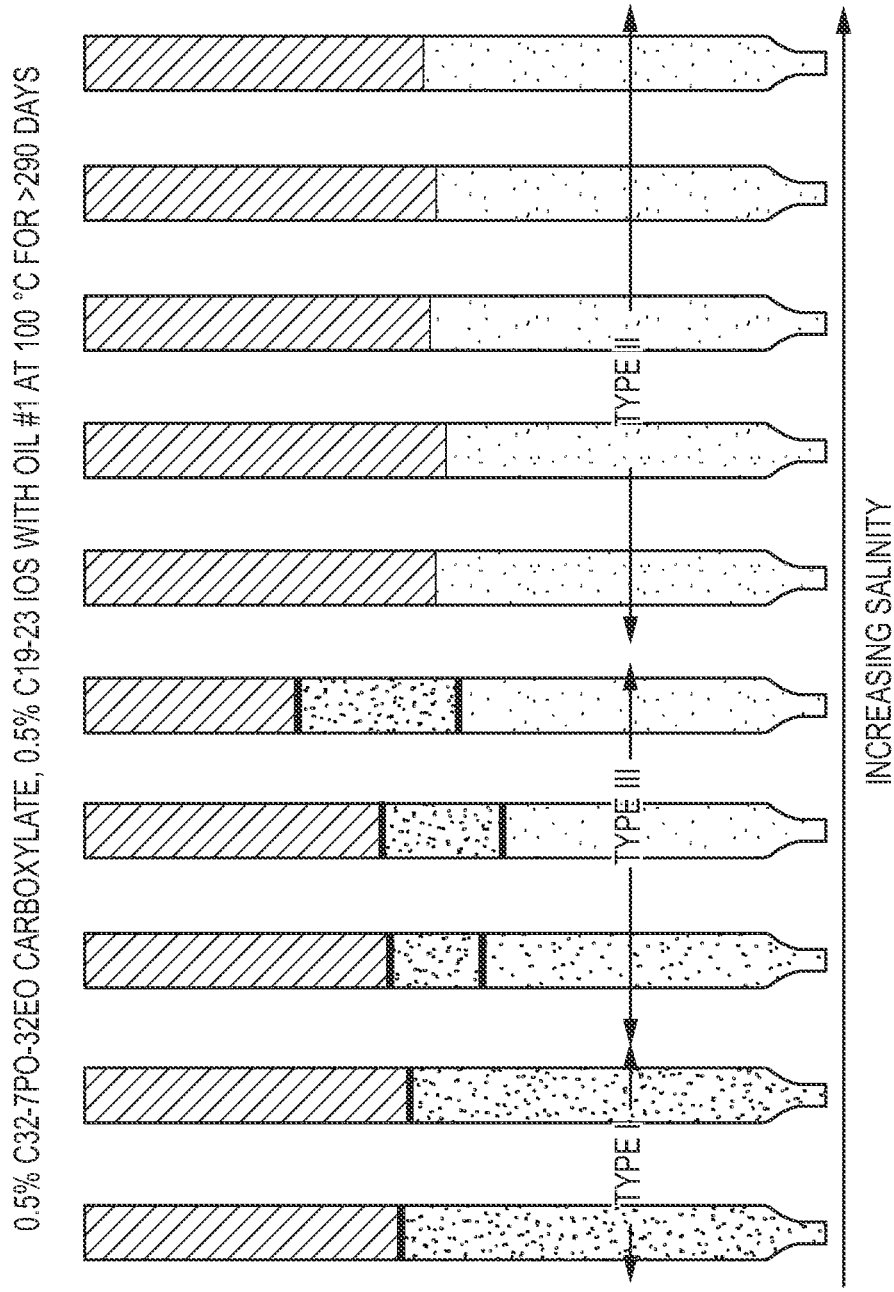
FIG. 13. Photographs of phase behavior salinity scan for Oil #1 using formulation 0.5% C32-7PO-32EO-carboxylate, 0.5% C19-23 IOS showing stable microemulsions after 290 days at 100° C. Properties of Oil #1: API gravity: 32.6; viscosity: 2.1 cP at 100° C.; total acid number: ~0.05 mg KOH/g oil.
Figure 14:
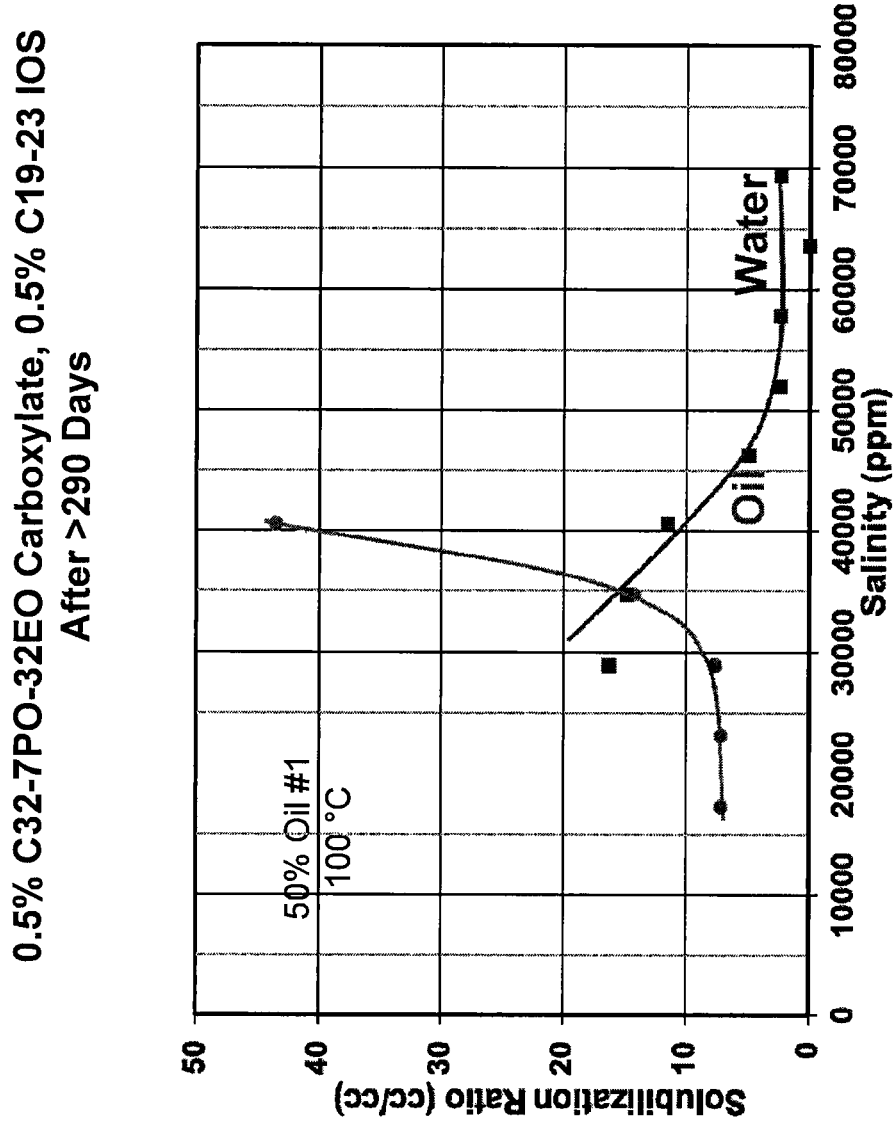
FIG. 14. Solubilization ratios for Oil #1 using formulation 0.5% C32-7PO-32EO-Carboxylate, 0.5% C19-23 IOS after 290 days.
Figure 15:
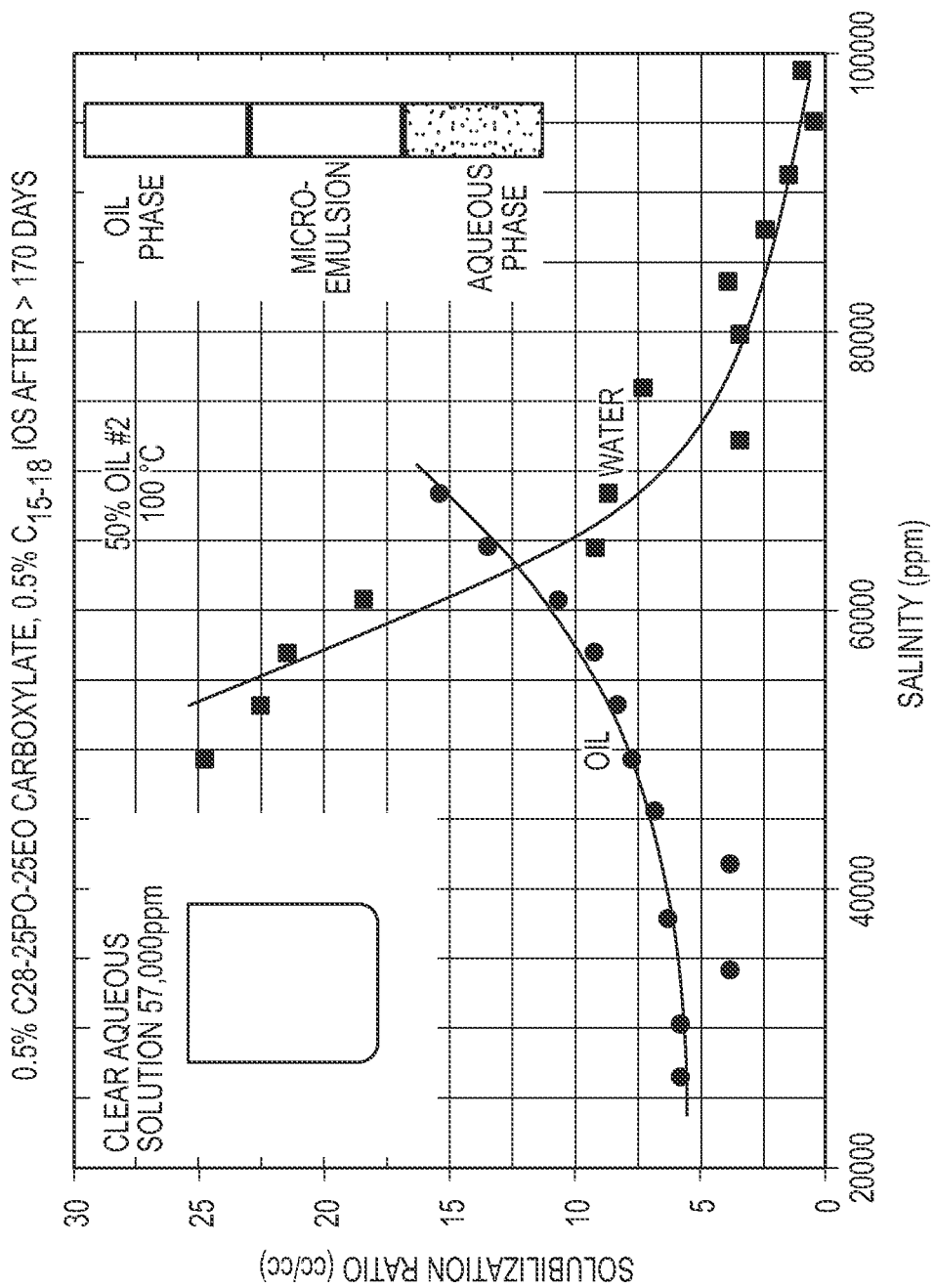
FIG. 15. Solubilization Ratios for Oil #2 using formulation 0.5% C28-25PO-25EO-carboxylate, 0.5% C15-18 IOS showing stable aqueous solution (photograph on left) and stable microemulsion (photograph on right) after 170 days at 100 C. Properties of Oil #2: API gravity: 22; viscosity: 2.1 cP at 100° C.
Figure 17:
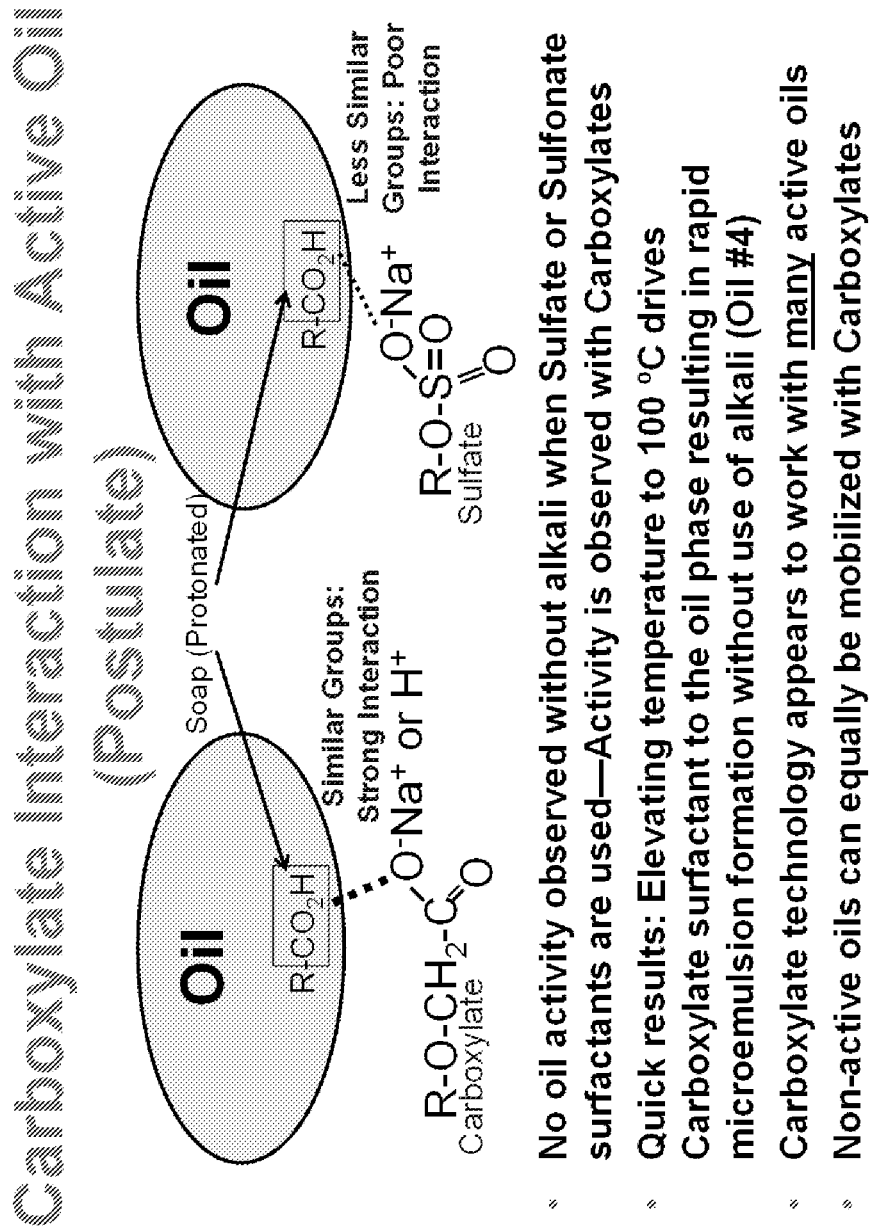
FIG. 17. Schematic representation of the interaction between carboxylic acids in active oil and carboxylate, sulfate and sulfonate surfactants.
Figure 18:
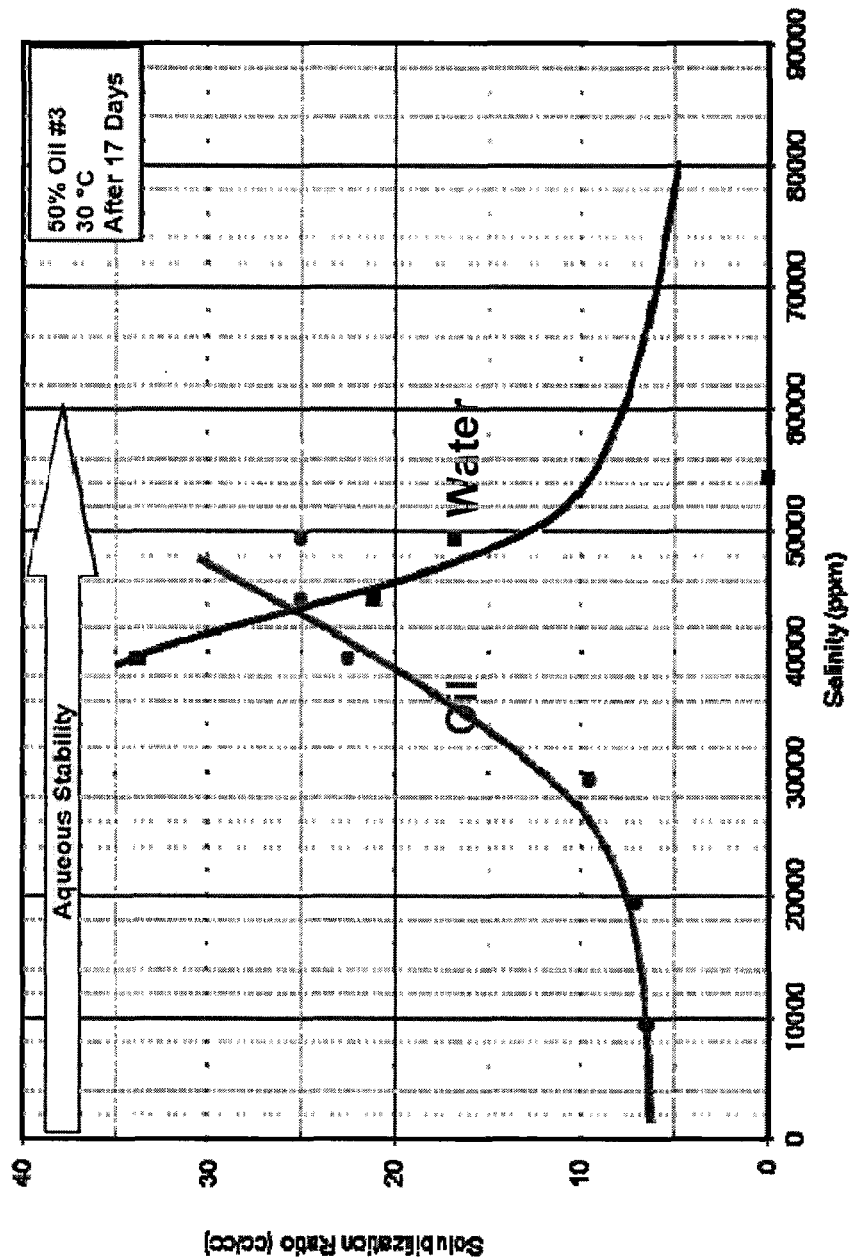
FIG. 18. Solubilization ratios for active Oil #3 using formulation 0.25% C24-25PO-18EO-Carboxylate, 0.25% C12-ABS, 0.25% C13-13PO-sulfate, 0.25% TEGBE. Properties of Oil #3: viscosity: 20 cP at 21° C.; total acid number: 0.7-0.8 mg KOH/g oil.
Figure 19:
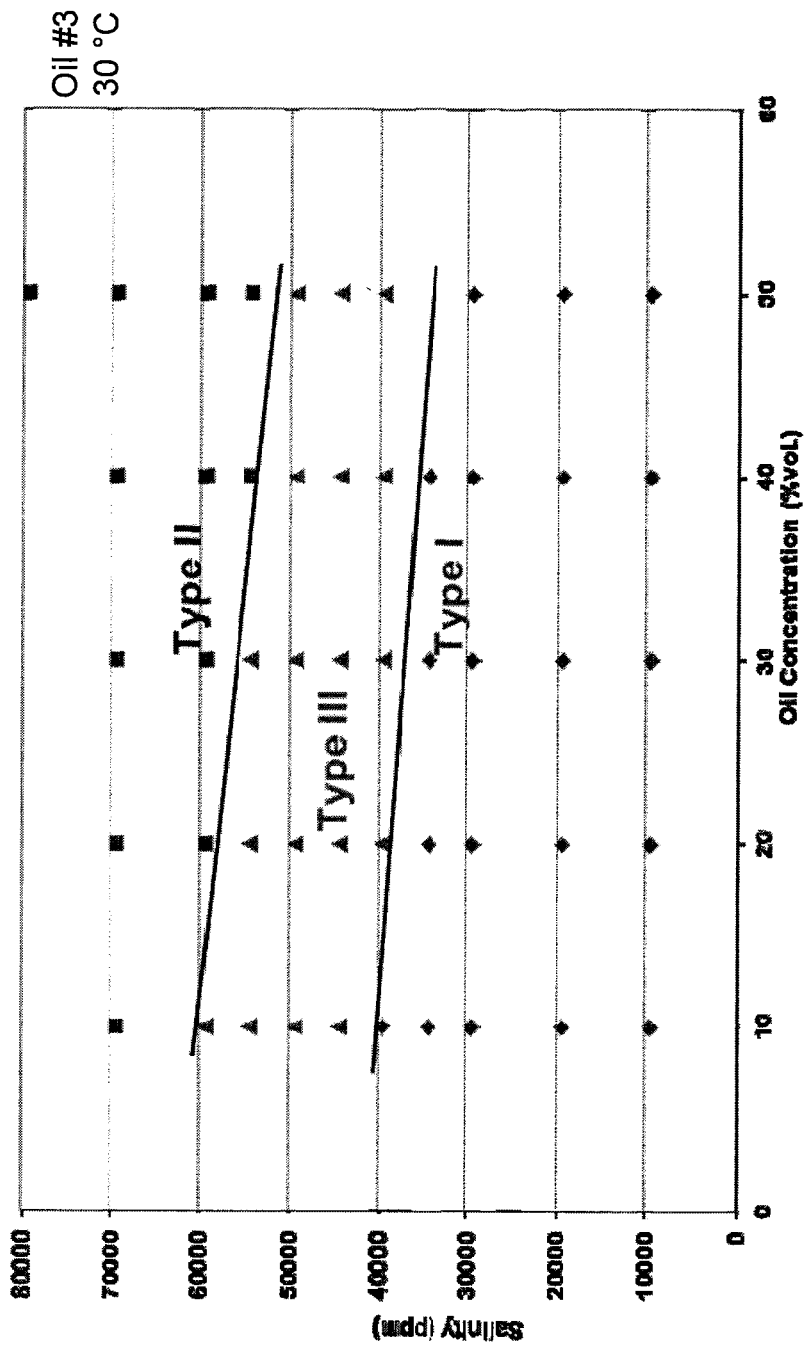
FIG. 19. Activity map for active Oil #3 using formulation 0.25% C24-25PO-18EO-carboxylate, 0.25% C12-ABS, 0.25% C13-13PO-sulfate, 0.25% TEGBE indicating carboxylate surfactant is interacting with acids from oil.
Figure 20:
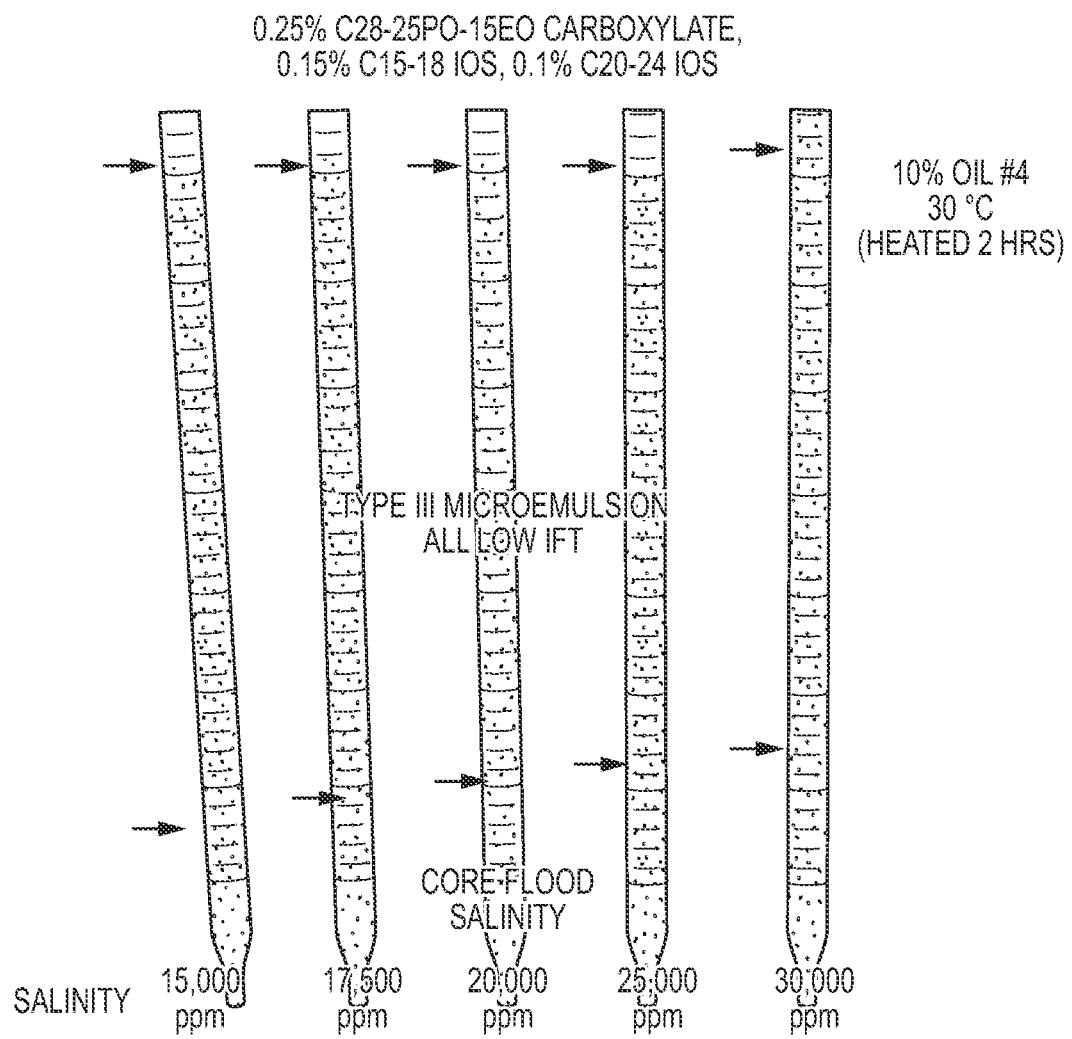
FIG. 20. Microemulsion phase behavior for active Oil #4 using formulation 0.25% C28-25PO-15EO-carboxylate, 0.15% C15-18 IOS, 0.1% C20-24 IOS at salinities close to optimum salinity for 10% oil. Properties of Oil #4: API gravity: 19; viscosity: 83 cP at 30° C.; total acid number: 2.36 mg KOH/g oil.
Figure 21:
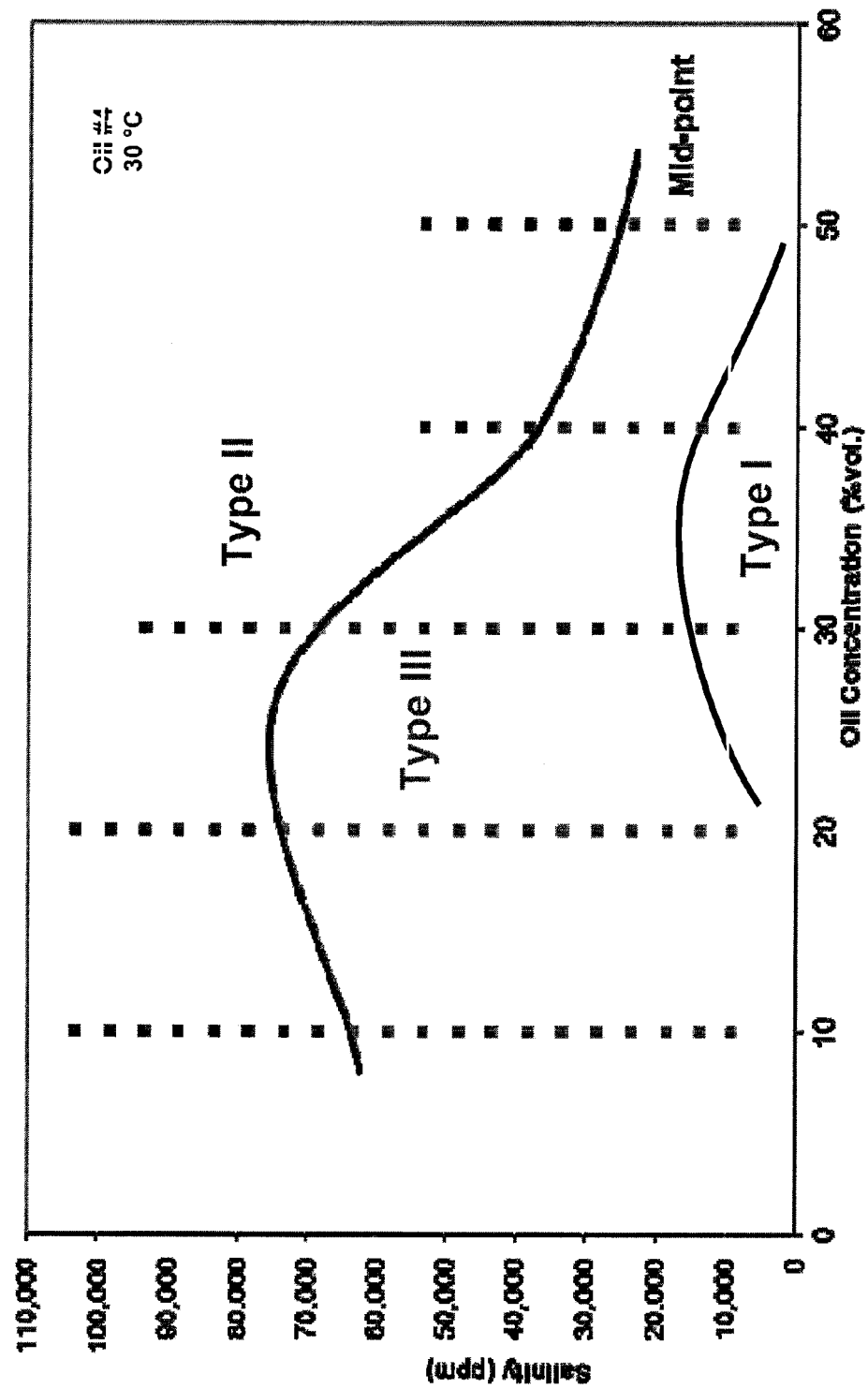
FIG. 21. Activity map for active Oil #4 using formulation 0.25% C28-25PO-15EO-carboxylate, 0.15% C15-18 IOS, 0.1% C20-24 IOS.
Figure 23:
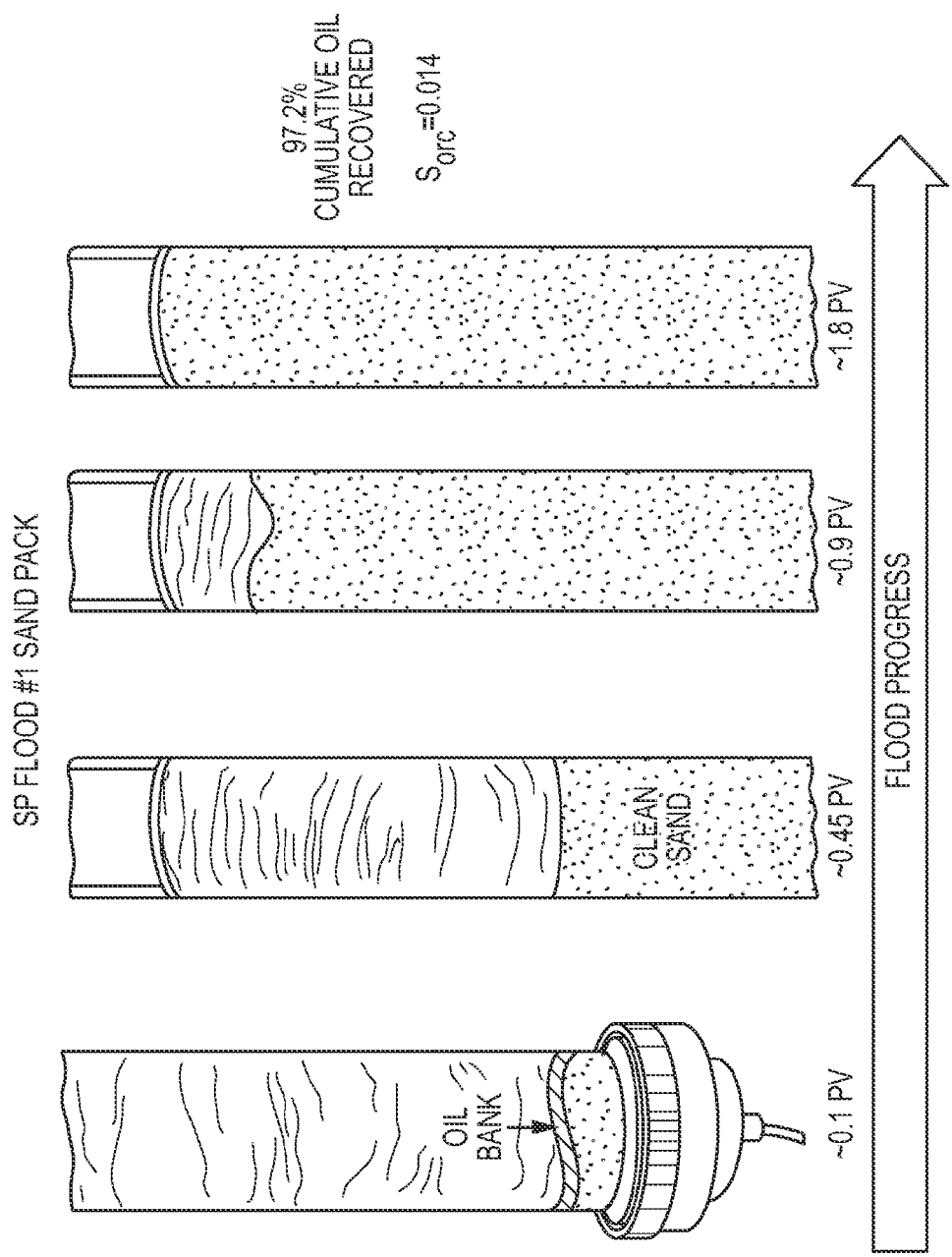
FIG. 23. Photographs of surfactant-polymer solution displacing Oil #4 from sand (early times on left and later times on right).
Figure 25:
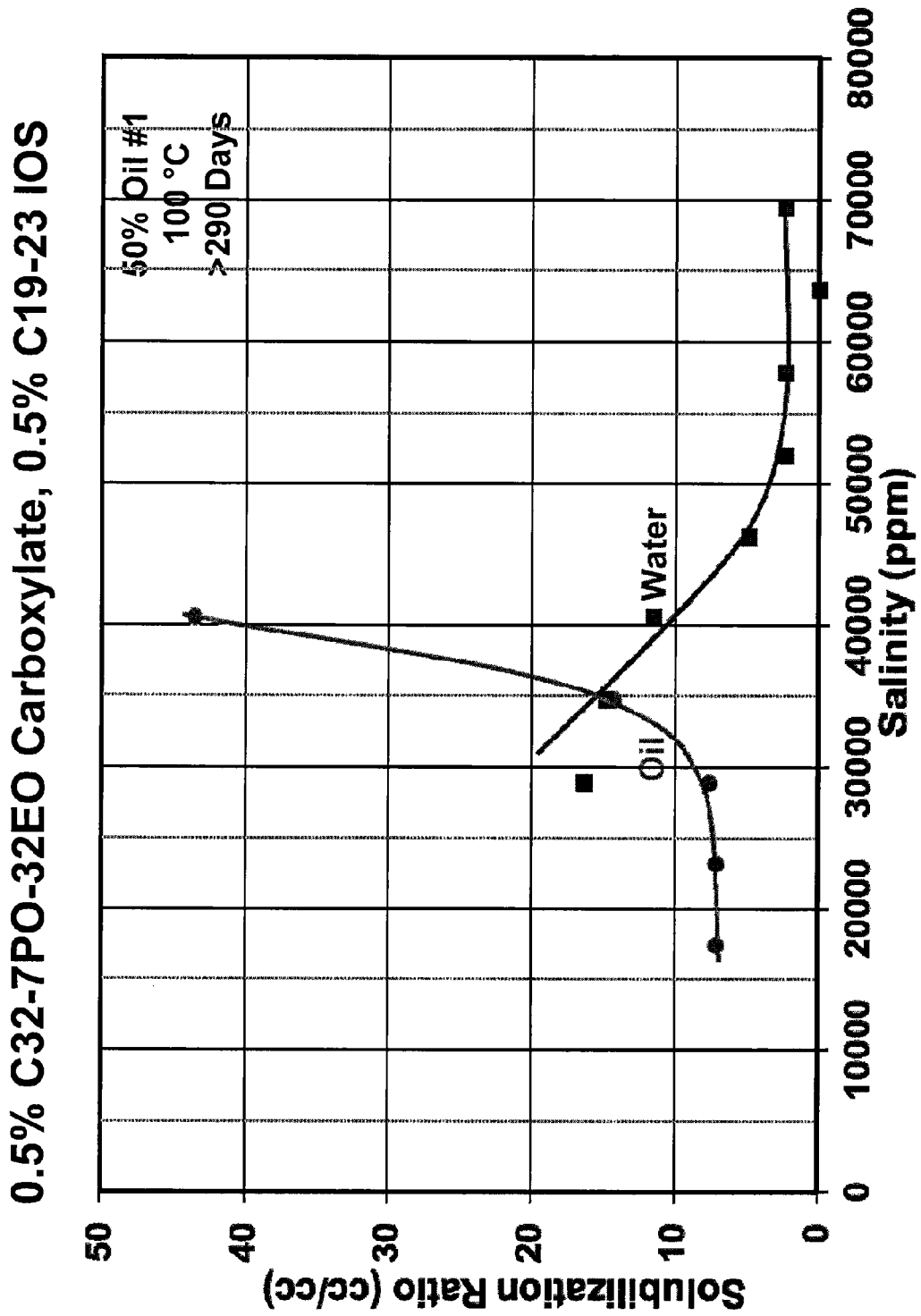
FIG. 25. Solubilization ratios for non-active Oil #1 using formulation 0.5% C32-7PO-32EO-carboxylate, 0.5% C19-23 IOS.
Figure 27:
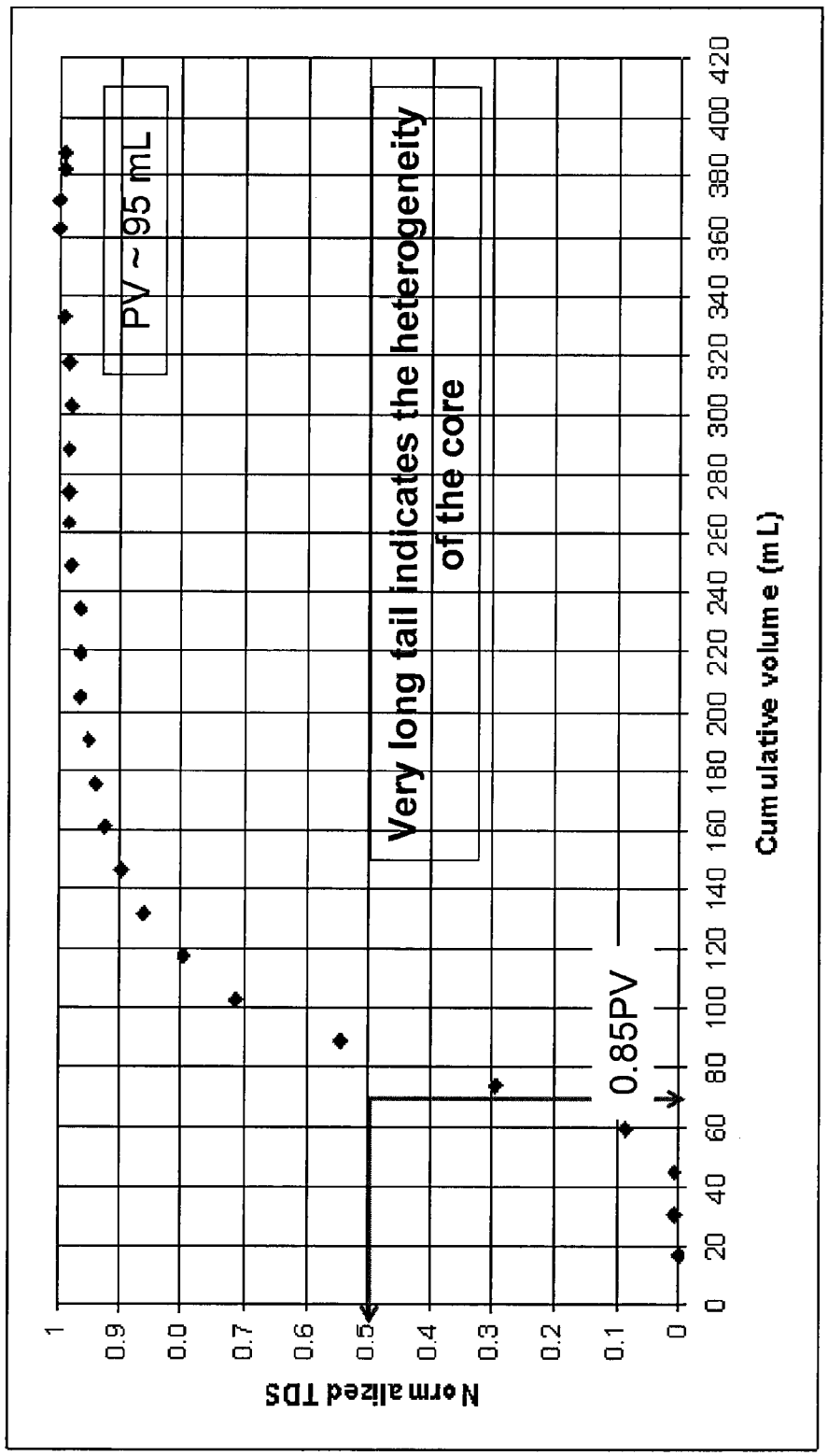
FIG. 27. Salinity gradient tracer test in heterogeneous Silurian dolomite rock at 100° C.
Figure 28:
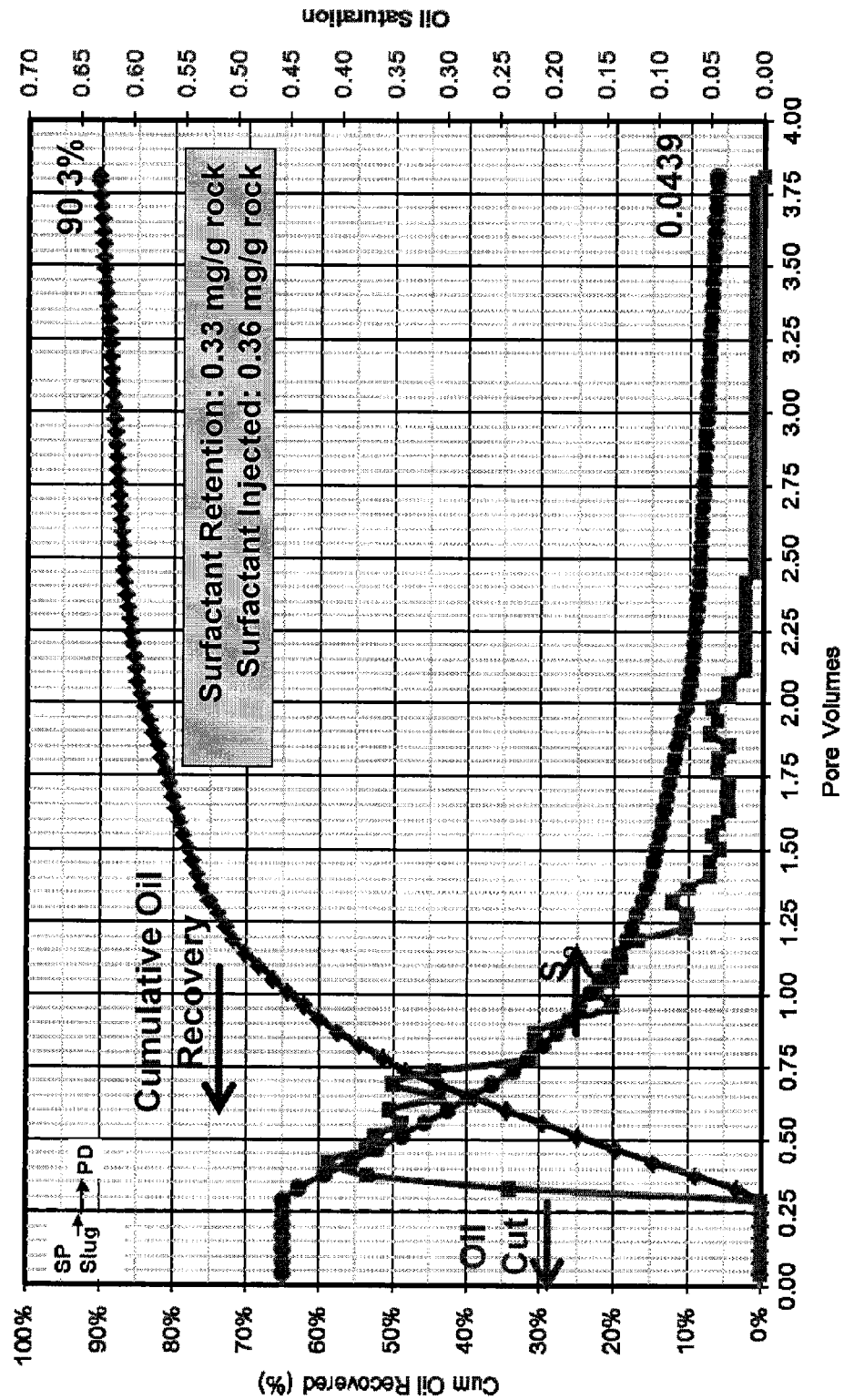
FIG. 28. Recovery of Oil #1 from Silurian dolomite rock during injection of surfactant-polymer solution containing large-hydrophobe carboxylate.
Figure 29:
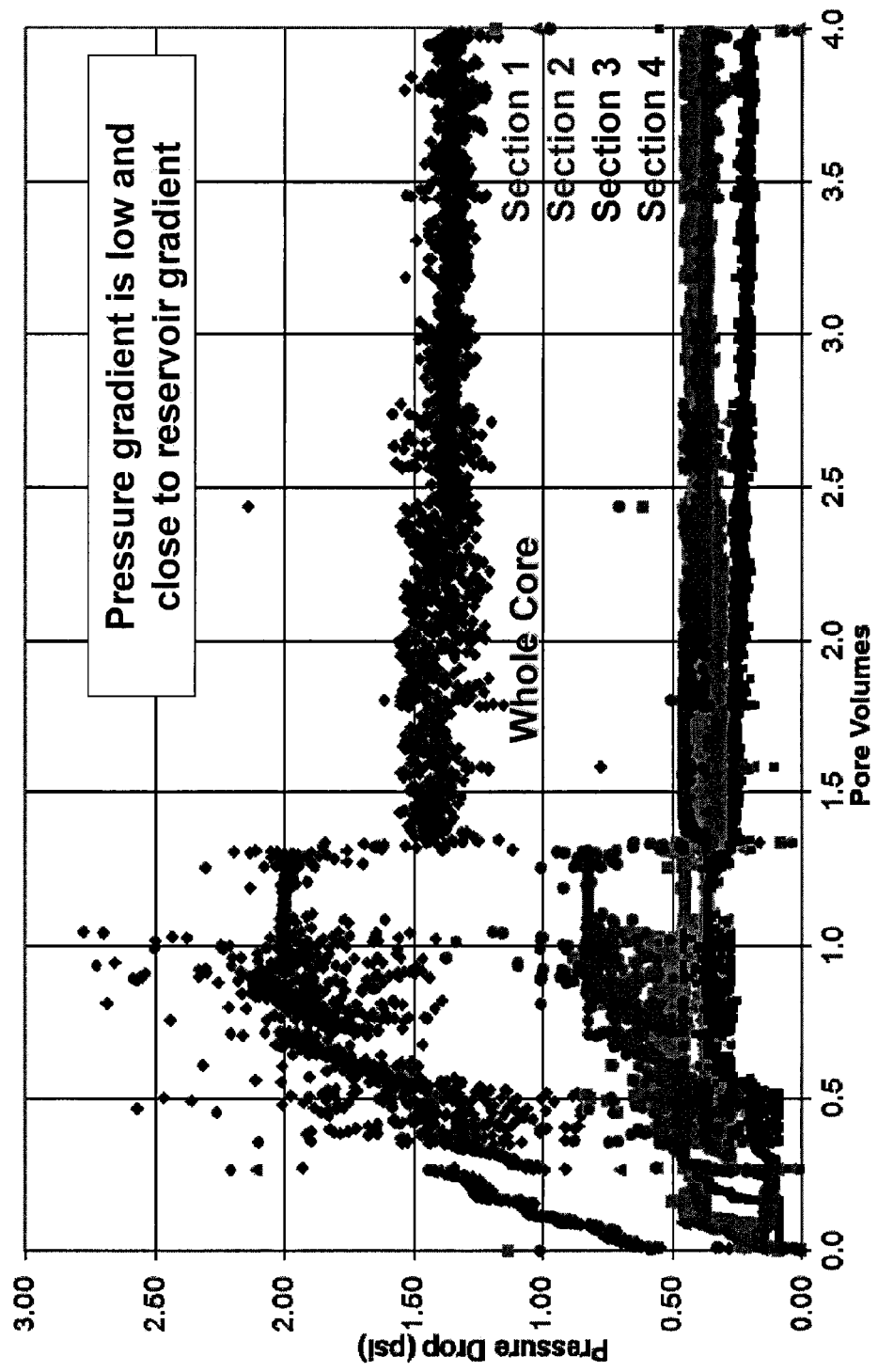
FIG. 29. Pressure drop during recovery of Oil #1 shows favorable behavior of carboxylate formulation.
Figure 30:
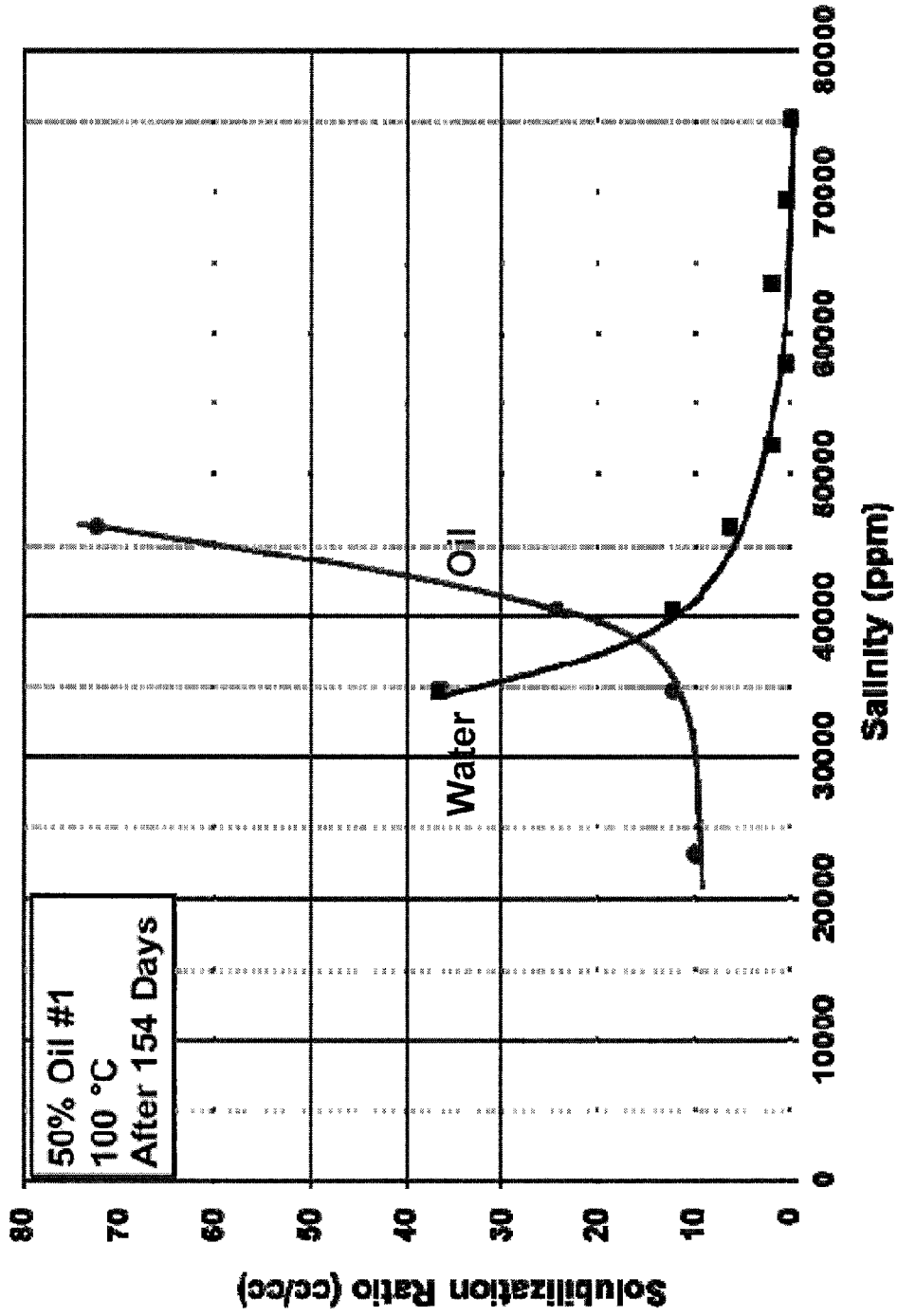
FIG. 30. Solubilization ratios for non-active Oil #1 using formulation 0.50% C28-25PO-45EO-carboxylate, 0.50% C15-18 IOS after 154 days at 100 C.
Figure 32:
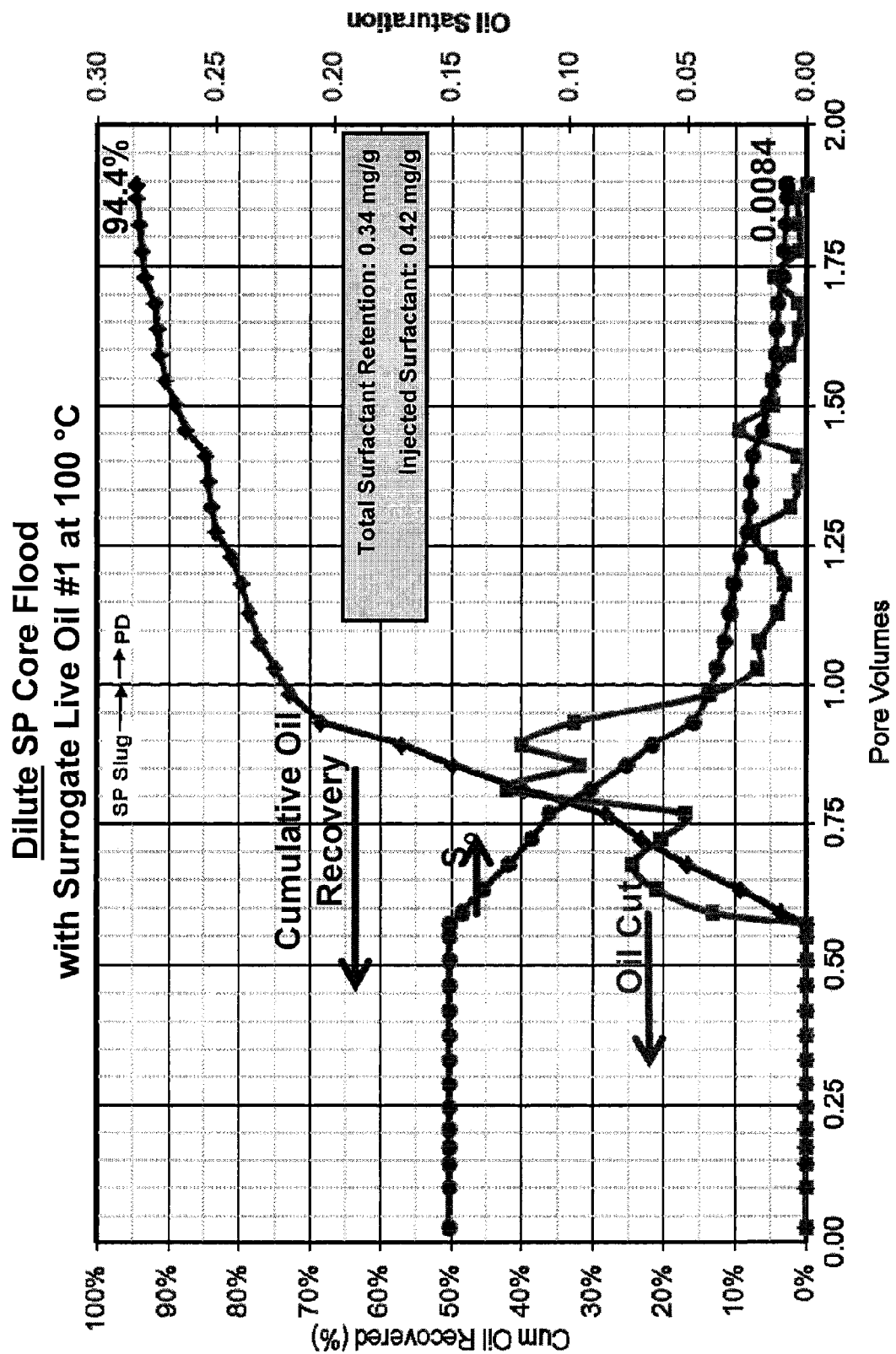
FIG. 32. Recovery of non-active Oil #1 using dilute surfactant solution at 100° C.

FIG. 8 provides the equation: $N_c = a_1 N_{PO} + a_2 N_{EO} + a_3(T-T_{ref}) + a_4 \log S^* + a_5 E_o$. Nc is the mole average number of carbons in the hydrophobe (i.e. $R^1$ in the formulas described herein, e.g. Formula Ia, Ib, IIa, IIb, IIIa, IIIb, IVa, IVb and V); $N_{PO}$ is the mole average of —$CH_2$—$CH(CH_3)$—O moieties in the compound described herein (e.g. Formula Ia, Ib, IIa, IIb, IIIa, IIIb, IVa, IVb and V); $N_{EO}$ is the mole average of —$CH_2$—$CH_2$—O moieties in the compound described herein (e.g. Formula Ia, Ib, IIa, IIb, IIIa, IIIb, IVa, IVb and V); T is the reservoir temperature and $T_{ref}$ is 21° C.; S* is the optimum salinity of the aqueous composition or aqueous emulsion that includes the compound described herein (e.g. Formula Ia, Ib, IIa, IIb, IIIa, IIIb, IVa, IVb and V); and $E_O$ is the oil EACN (equivalent alkane carbon number). Based on this formula (in FIG. 8) and the data in FIG. 10 a person of ordinary skill in the art would be able to use the formula to design specific compounds having the appropriate number of carbons in $R^1$ (in the formulas set forth herein) for the specific condition in a particular oil reservoir (e.g. characteristics of the oil, the brine and the temperature).

Phase Behavior Procedures

Phase Behavior Screening: Phase behavior studies have been used to characterize chemicals for EOR. There are many benefits in using phase behavior as a screening method. Phase Behavior studies are used to determine, measure or observe characteristics related to chemical performance such as the following examples but are not limited to these examples: (1) the effect of electrolytes; (2) oil solubilization and IFT reduction, (3) microemulsion densities; (4) microemulsion viscosities; (5) coalescence times; (6) optimal surfactant-co-solvent formulations; and/or (7) optimal properties for recovering oil from cores and reservoirs.

Thermodynamically stable phases can form with oil, water and surfactant mixtures. Surfactants form micellar structures at concentrations at or above the critical micelle concentration (CMC). The emulsion coalesces into a separate phase at the oil-water interface and is referred to as a microemulsion. A microemulsion is a surfactant-rich distinct phase consisting of surfactant, oil and water and possibly co-solvents and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition is examined by keeping all variables fixed except for the scanning variable. The scan variable is changed over a series of pipettes and may include, but is not limited to, salinity, temperature, chemical (surfactant, alcohol, electrolyte), oil, which is sometimes characterized by its equivalent alkane carbon number (EACN), and surfactant structure, which is sometimes characterized by its hydrophilic-lipophilic balance (HLB). The phase transition was first characterized by Winsor (1954) into three regions: Type I—excess oleic phase, Type III—aqueous, microemulsion and oleic phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio (σ*), and the electrolyte concentration where the optimum solubilization ratio occurs is referred to as the Optimal Salinity (S*).

Determining Interfacial Tension

Efficient use of time and lab resources can lead to valuable results when conducting phase behavior scans. A correlation between oil and water solubilization ratios and interfacial tension was suggested by Healy and Reed (1976) and a theoretical relationship was later derived by Chun Huh (1979). Lowest oil-water IFT occurs at optimum solubilization as shown by the Chun Huh theory. This is equated to an interfacial tension through the *Chun Huh equation*, where IFT varies with the inverse square of the solubilization ratio:

$$\gamma = \frac{C}{\sigma^2} \quad (1)$$

For most crude oils and microemulsions, C=0.3 is a good approximation. Therefore, a quick and convenient way to estimate IFT is to measure phase behavior and use the Chun-Huh equation to calculate IFT. The IFT between microemulsions and water and/or oil can be very difficult and time consuming to measure and is subject to larger errors, so using the phase behavior approach to screen hundreds of combinations of surfactants, co-surfactants, co-solvents, electrolytes, oil, and so forth is not only simpler and faster, but avoids the measurement problems and errors associated with measuring IFT especially of combinations that show complex behavior (gels and so forth) and will be screened out anyway. Once a good formulation has been identified, then it is still a good idea to measure IFT.

Equipment

Phase behavior experiments are created with the following materials and equipment.

Mass Balance: Mass balances are used to measure chemicals for mixtures and determine initial saturation values of cores.

Water Deionizer: Deionized (DI) water is prepared for use with all the experimental solutions using a Nanopure™ filter system. This filter uses a recirculation pump and monitors the water resistivity to indicate when the ions have been removed. Water is passed through a 0.45 micron filter to eliminate undesired particles and microorganisms prior to use.

Borosilicate Pipettes: Standard 5 mL borosilicate pipettes with 0.1 mL markings are used to create phase behavior scans as well as run dilution experiments with aqueous solutions. Ends are sealed using a propane and oxygen flame.

Pipette Repeater: An Eppendorf Repeater Plus® instrument is used for most of the pipetting. This is a handheld dispenser calibrated to deliver between 25 microliter and 1 ml increments. Disposable tips are used to avoid contamination between stocks and allow for ease of operation and consistency.

Propane-oxygen Torch: A mixture of propane and oxygen gas is directed through a Bernz-O-Matic flame nozzle to create a hot flame about ½ inch long. This torch is used to flame-seal the glass pipettes used in phase behavior experiments.

Convection Ovens: Several convection ovens are used to incubate the phase behaviors and core flood experiments at the reservoir temperatures. The phase behavior pipettes are primarily kept in Blue M and Memmert ovens that are monitored with mercury thermometers and oven temperature gauges to ensure temperature fluctuations are kept at a minimal between recordings. A large custom built flow oven was used to house most of the core flood experiments and enabled fluid injection and collection to be done at reservoir temperature.

pH Meter: An ORION research model 701/digital ion analyzer with a pH electrode is used to measure the pH of most aqueous samples to obtain more accurate readings. This is calibrated with 4.0, 7.0 and 10.0 pH solutions. For rough measurements of pH, indicator papers are used with several drops of the sampled fluid.

Phase Behavior Calculations

The oil and water solubilization ratios are calculated from interface measurements taken from phase behavior pipettes. These interfaces are recorded over time as the mixtures approached equilibrium and the volume of any macroemulsions that initially formed decreased or disappeared.

Phase Behavior Methodology

The methods for creating, measuring and recording observations are described in this section. Scans are made using a variety of electrolyte mixtures described below. Oil is added to most aqueous surfactant solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution is clear and stable over time, becomes cloudy or separated into more than one phase.

Preparation of samples. Phase behavior samples are made by first preparing surfactant stock solutions and combining them with brine stock solutions in order to observe the behavior of the mixtures over a range of salinities. All the experiments are created at or above 0.1 wt % active surfactant concentration, which is above the typical CMC of the surfactant.

Solution Preparation. Surfactant stocks are based on active weight-percent surfactant (and co-surfactant when incorporated). The masses of surfactant, co-surfactant, co-solvent and de-ionized water (DI) are measured out on a balance and mixed in glass jars using magnetic stir bars. The order of addition is recorded on a mixing sheet along with actual masses added and the pH of the final solution. Brine solutions are created at the necessary weight percent concentrations for making the scans.

Surfactant Stock. The chemicals being tested are first mixed in a concentrated stock solution that usually consisted of a primary surfactant, co-solvent and/or co-surfactant along with de-ionized water. The quantity of chemical added is calculated based on activity and measured by weight percent of total solution. Initial experiments are at about 1-3% active surfactant so that the volume of the middle microemulsion phase would be large enough for accurate measurements assuming a solubilization ratio of at least 10 at optimum salinity.

Polymer Stock. Often these stocks were quite viscous and made pipetting difficult so they are diluted with de-ionized water accordingly to improve ease of handling. Mixtures with polymer are made only for those surfactant formulations that showed good behavior and merited additional study for possible testing in core floods. Consequently, scans including polymer are limited since they are done only as a final evaluation of compatibility with the surfactant.

Pipetting Procedure. Phase behavior components are added volumetrically into 5 ml pipettes using an Eppendorf Repeater Plus or similar pipetting instrument. Surfactant and brine stocks are mixed with DI water into labeled pipettes and brought to temperature before agitation. Almost all of the phase behavior experiments are initially created with a water oil ratio (WOR) of 1:1, which involves mixing 2 ml of the aqueous phase with 2 ml of the evaluated crude oil or hydrocarbon, and different WOR experiments are mixed accordingly. The typical phase behavior scan consisted of 10-20 pipettes, each pipette being recognized as a data point in the series.

Order of Addition. Consideration must be given to the addition of the components since the concentrations are often several folds greater than the final concentration. Therefore, an order is established to prevent any adverse effects resulting from surfactant or polymer coming into direct contact with the concentrated electrolytes. The desired sample compositions are made by combining the stocks in the following order: (1) Electrolyte stock(s); (2) De-ionized water; (3) Surfactant stock; (4) Polymer stock; and (5) Crude oil or hydrocarbon. Any air bubbles trapped in the bottom of the pipettes are tapped out (prior to the addition of surfactant to avoid bubbles from forming).

Initial Observations. Once the components are added to the pipettes, sufficient time is allotted to allow all the fluid to drain down the sides. Then aqueous fluid levels are recorded before the addition of oil. These measurements are marked on record sheets. Levels and interfaces are recorded on these documents with comments over several days and additional sheets are printed as necessary.

Sealing and Mixing. The pipettes are blanketed with argon gas to prevent the ignition of any volatile gas present by the flame sealing procedure. The tubes are then sealed with the propane-oxygen torch to prevent loss of additional volatiles when placed in the oven. Pipettes are arranged on the racks to coincide with the change in the scan variable. Once the phase behavior scan is given sufficient time to reach reservoir temperature (15-30 minutes), the pipettes are inverted several times to provide adequate mixing. Tubes are observed for low tension upon mixing by looking at droplet size and how uniform the mixture appeared. Then the solutions are allowed to equilibrate over time and interface levels are recorded to determine equilibration time and surfactant performance.

Measurements and Observations. Phase behavior experiments are allowed to equilibrate in an oven that is set to the reservoir temperature for the crude oil being tested. The fluid levels in the pipettes are recorded periodically and the trend in the phase behavior observed over time. Equilibrium behavior is assumed when fluid levels ceased to change within the margin of error for reading the samples.

Fluid Interfaces. The fluid interfaces are the most crucial element of phase behavior experiments. From them, the phase volumes are determined and the solubilization ratios are calculated. The top and bottom interfaces are recorded as the scan transitioned from an oil-in-water microemulsion to a water-in-oil microemulsion. Initial readings are taken one day after initial agitation and sometimes within hours of agitation if coalescence appeared to happen rapidly. Measurements are taken thereafter at increasing time intervals (for example, one day, four days, one week, two weeks, one month and so on) until equilibrium is reached or the experiment is deemed unessential or uninteresting for continued observation.

Figure 4:
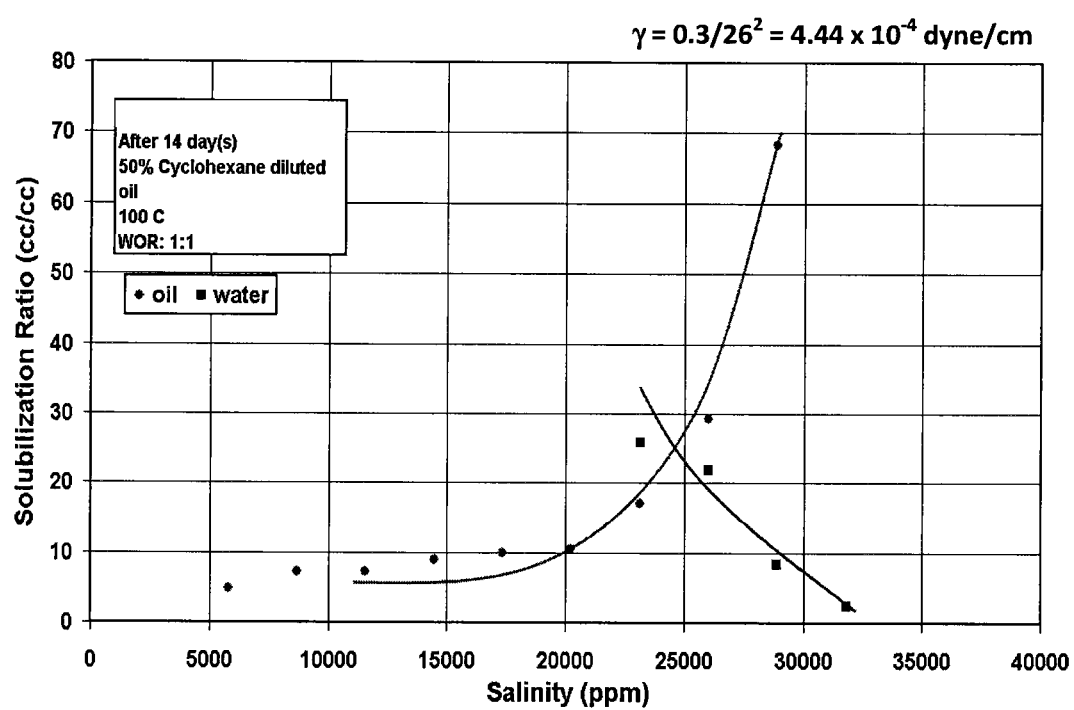
FIG. 4. Solubilization ratios using surfactant formulation 0.7% $C_{28}$-25PO-55EO Carboxylate, 0.3% C11 alkyl benzene sulfonate as a function of brine salinity.
Figure 6:
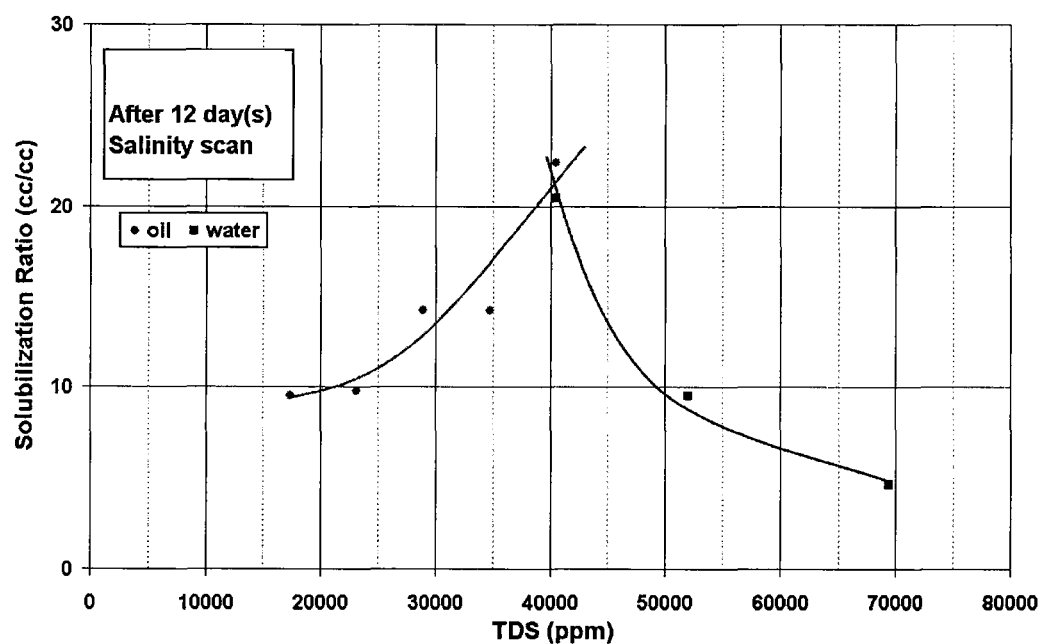
FIG. 6. Solubilization ratios using surfactant formulation 0.25% C32-7PO-32EO-carboxylate and 0.25% C19-23 IOS at 100 C as a function of total dissolved solids in the brine.
Figure 7:
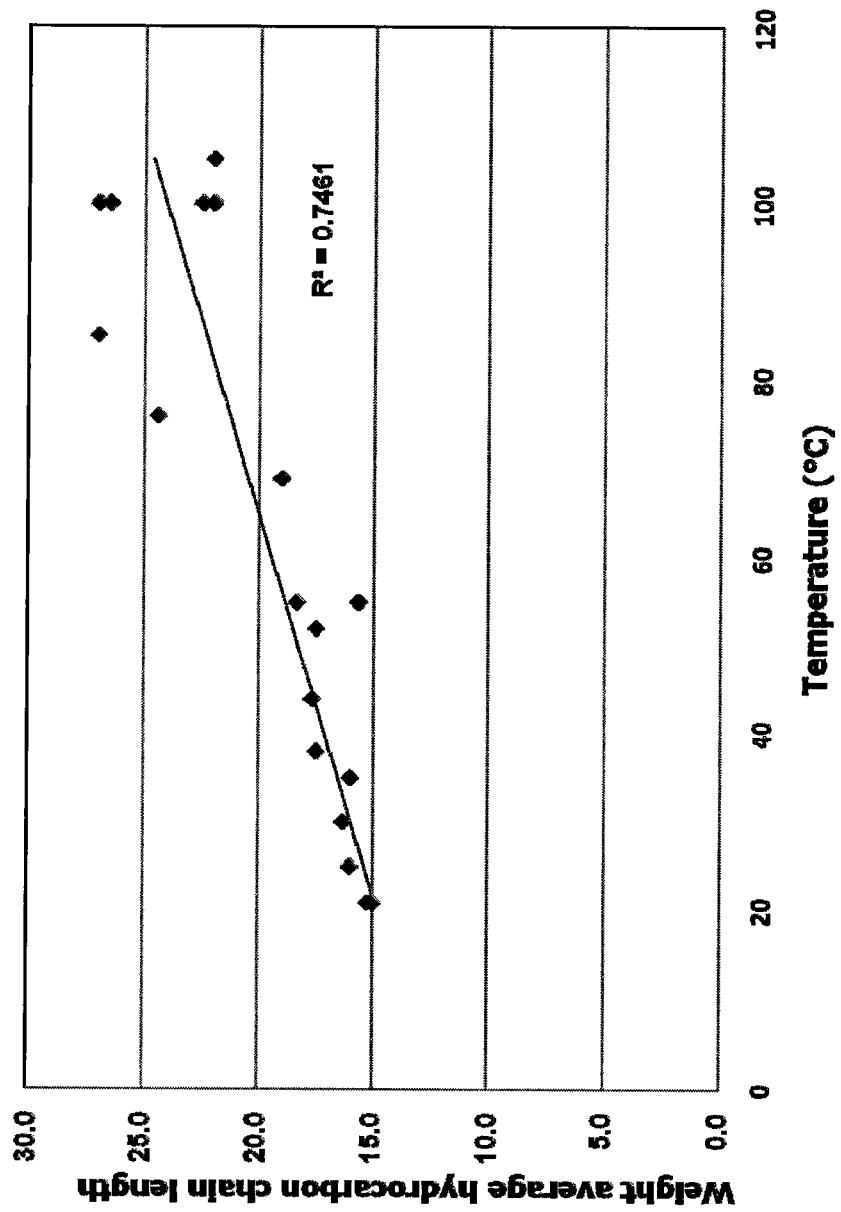
FIG. 7. Regression of data showing the optimum size of the hydrocarbon chain length of surfactants increases as the temperature increases.

FIG. 2(B) shows the phase behavior data recording sheet corresponding to the plot shown in FIG. 2(A) for the system comprising 0.5% C32-7PO-32 EO Carboxylate, 0.5% C19-23 IOS (hard injection sea brine salinity scan). Corresponding to an optimum solubilization ratio of 19 cc/cc the IFT using Eq. 1 is, $\gamma=0.3/19^2=8.31\times10^{-4}$ dynes/cm, which is regarded as ultra-low. In general, a system giving a solubilization ratio of 10 or higher is regarded as ultra low IFT. The core flood data presented in FIG. 4 was generated using a surfactant-polymer (SP) slug comprising: 1.0% C32-7PO-32EO Carboxylate, 1.0% C19-23 IOS, 4500 ppm polymer FP 3330 s, 40,000 ppm Synthetic sea brine (Frontal Velocity: ~2 ft/day, Viscosity: 45 cP @ 10 s-1 (24° C.), PV of the slug: 0.25, pH ~7.0). The Polymer Drive: 4500 ppm FP 3330 s, 25,000 ppm Synthetic sea brine (Frontal velocity: ~2 ft/day, Viscosity: 53 cP @ 10 s-1 (24° C.). FIG. 4 is an oil recovery (% residual oil) plot for the formulation using carboxylate—IOS surfactant. The surfactant-polymer (SP) results using the carboxylates of the present invention with other oils is presented in Table 1.

TABLE 1

SP Results using Carboxylates with Other Oils.

| Oil | Oil Viscosity (cP) | Temp (° C.) | SP Hard Brine TDS (ppm) (Ca++, Mg++ ppm) | TAN (mg/g) | PB | Core Flood Result | Rock Type |
|---|---|---|---|---|---|---|---|
| 1 | 75 | 55 | 30,000 (800) | 2.05 | Good | X | X |
| 2 | 9 | 55 | 18,300 (900) |  | Good | X | X |
| 3 | 12 | 46 | 18,300 (900) |  | Good | X | X |
| 4 | 20 | 62 | 5,500 (350) | 1.96 | Good | X | X |
| 5 | 8 | 38 | 18,300 (900) | 0.81 | Good | X | X |
| 6 | 15 | 46 | 6,000 (10) | 0.03 | Good | X | X |

FIG. 4 shows a phase behavior plot for a 0.7% $C_{28}$-25PO-55EO Carboxylate and 0.3% linear chain of a C11 alkyl benzene sulfonate. The corresponding phase behavior data recording sheet of the system is shown in FIG. 5. Corresponding to an optimum solubilization ratio of 26 cc/cc the IFT using Eq. 1 is, $\gamma=0.3/26^2=4.44\times10^{-4}$ dynes/cm, which is regarded as ultra-low.

REFERENCES

U.S. Pat. No. 7,629,299: Process for Recovering Residual Oil Employing Alcohol Ether Sulfonates.
U.S. Patent Publication No. 20070191633: Mixed Anionic Surfactant Composition for Oil Recovery.
U.S. Patent Application No. 20100081716: Process for Production of Ether Carboxylates.
U.S. Pat. No. 6,225,267: Sodium Sulfonate Blends as Emulsifiers for Petroleum Oils.
U.S. Patent Application No. 20100048432: Enhanced Oil Recovery using Sulfonate Mixtures.
Anton R E et al. (2008): *Practical Surfactant Mixing Rules Based on the Attainment of Microemulsion-Oil-Water Three-Phase Behavior Systems*. Adv. Polym. Sci. 218:83-113

What is claimed is:

1. A compound having the formula:

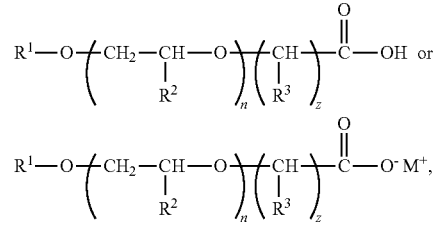

wherein
$R^1$ is unsubstituted $C_{24}$-$C_{150}$ alkyl or $R^{10}$-substituted $C_{24}$-$C_{150}$ alkyl;
$R^2$ is independently hydrogen or methyl, wherein at least one $R^2$ is a methyl and wherein the $R^2$ adjacent to the $R^3$ is a hydrogen;
$R^3$ is independently hydrogen or unsubstituted $C_1$-$C_6$ alkyl;
$R^{10}$ is independently unsubstituted aryl or unsubstituted cycloalkyl;
n is an integer from 45 to 210;
z is an integer from 1 to 6; and
$M^+$ is a monovalent, divalent or trivalent cation.

2. The compound of claim 1, wherein $R^1$ is branched unsubstituted $C_{24}$-$C_{150}$ alkyl.

3. The compound of claim 1, wherein $R^1$ is branched or linear unsubstituted $C_{24}$-$C_{100}$ alkyl.

4. The compound of claim 1, wherein $R^1$ is branched unsubstituted $C_{24}$-$C_{100}$ alkyl.

5. The compound of claim 1, wherein $R^1$ is branched unsubstituted $C_{24}$-$C_{36}$ alkyl.

6. The compound of claim 1, wherein $R^3$ is hydrogen.

7. The compound of claim 1, wherein n is 45 to 180.

8. The compound of claim 1, wherein n is 45 to 100.

9. The compound of claim 1, wherein z is 1.

10. The compound of claim 1, wherein $M^+$ is $Na^+$, $K^+$, $NH_4^+$, $Ca^{+2}$, $Mg^{+2}$ or $Ba^{+2}$.

11. A compound having the formula:

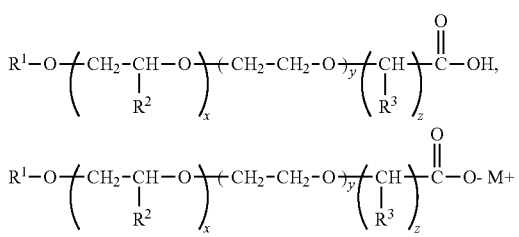

wherein
$R^1$ is unsubstituted $C_{24}$-$C_{150}$ alkyl or $R^{10}$-substituted $C_{24}$-$C_{150}$ alkyl;
$R^2$ is unsubstituted methyl;
$R^3$ is independently hydrogen or unsubstituted $C_1$-$C_6$ alkyl;
$R^{10}$ is independently unsubstituted aryl or unsubstituted cycloalkyl;
x and y are independently integers from 5 to 100;
z is an integer from 1 to 6;
$M^+$ is a monovalent, divalent or trivalent cation; and with the additional proviso for x and y,
wherein x is at least 25 or y is at least 25.

12. The compound of claim 11 having the formula:

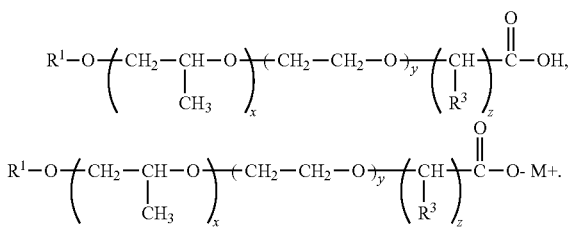

13. The compound of claim 12 wherein:
z is 1;
$R^3$ is hydrogen;
x and y are independently 5 to 100; and
$R^1$ is unsubstituted $C_{24}$-$C_{50}$ alkyl.

14. An aqueous composition comprising a co-surfactant and the compound of claim 1 or claim 11.

15. The aqueous composition of claim 11, wherein said co-surfactant is an anionic surfactant, a non-ionic surfactant, or a cationic surfactant.

16. The aqueous composition of claim 14, wherein said co-surfactant is an internal olefin sulfonate (IOS), an alfa olefin sulfonate (AOS), an alkyl aryl sulfonate (ARS), an alkane sulfonate, a petroleum sulfonate, an alkyl diphenyl oxide (di)sulfonate, an alcohol sulfate, an alkoxy sulfate, an alkoxy sulfonate, an alcohol phosphate, an alkoxy phosphate, a sulfosuccinate ester, an alcohol ethoxylate, an alkyl phenol ethoxylate, a quaternary ammonium salt, a betain or sultain.

17. The aqueous composition of claim 14, wherein said co-surfactant is a $C_{10}$-$C_{30}$ internal olefin sulfate (IOS) or a $C_8$-$C_{30}$ alkyl benzene sulfonate (ABS).

18. The aqueous composition of claim 14, further comprising a viscosity enhancing water-soluble polymer.

19. The aqueous composition of claim 14, further comprising a co-solvent.

20. The aqueous composition of claim 14, further comprising a gas.

21. The aqueous composition of claim 14, wherein said compound is present in an amount sufficient to increase the solubility of said co-surfactant in said aqueous composition relative to the absence of said compound.

22. The aqueous composition of claim 14, wherein said co-surfactant is present in an amount sufficient to increase the solubility of said compound in said aqueous composition relative to the absence of said co-surfactant.

23. The aqueous composition of claim 14 comprising more than 10 ppm of $Ca^{2+}$ and $Mg^{2+}$ combined.

24. The aqueous composition of claim 14 comprising more than 100 ppm of $Ca^{2+}$ and $Mg^{2+}$ combined.

25. The aqueous composition of claim 14 comprising more than 1000 ppm of $Ca^{2+}$ and $Mg^{2+}$ combined.

26. The aqueous composition of claim 14 having a pH of less than 8.0.

27. The aqueous composition of claim 14 having a pH of less than 7.5.

28. The aqueous composition of claim 14 having a pH of less than 7.0.

29. The aqueous composition of claim 14 having a salinity of at least 40,000 ppm.

30. The aqueous composition of claim 14 having a salinity of at least 50,000 ppm.

31. The aqueous composition of claim 14 having a salinity of at least 200,000 ppm.

32. The aqueous composition of claim 14, wherein the temperature of said aqueous composition is at least 100° C.

33. The aqueous composition of claim 14, wherein the temperature of said aqueous composition is at least 130° C.

34. The aqueous composition of claim 14 having a viscosity of between 20 mPa·s and 100 mPa·s.

35. An emulsion composition comprising an unrefined petroleum phase and an aqueous phase, wherein said aqueous phase comprises the compound of claim 1 or claim 11.

36. The emulsion composition of claim 35 further comprising a co-surfactant.

37. The emulsion composition of claim 3, wherein the viscosity of the emulsion composition is less than the viscosity in the absence of the co-surfactant.

38. The emulsion composition of claim 35, wherein the viscosity of the emulsion composition is less than 3 times the viscosity of an unrefined petroleum.

39. The emulsion composition of claim 35, wherein viscosity of the emulsion composition is less than 30 centipoise.

40. The emulsion composition of claim 35, wherein the viscosity of the emulsion composition is less than 200 centipoise.

41. The emulsion composition of claim 35, wherein the emulsion composition is a microemulsion.

42. The emulsion composition of claim 35, wherein the oil and water solubilization ratios of the aqueous phase are insensitive to the combined concentration of $Ca^{+2}$ and $Mg^{+2}$ combined within in the aqueous phase.

43. The emulsion composition of claim 35, wherein the oil and water solubilization ratios of the aqueous phase are insensitive to the salinity of the water within the aqueous phase.

44. The compound of claim 1 or claim 11, wherein n is at least 40.

45. The compound of claim 11, wherein y is at least 40 and x is at least 30.

* * * * *